US007187795B2

(12) United States Patent
Jones et al.

(10) Patent No.: US 7,187,795 B2
(45) Date of Patent: Mar. 6, 2007

(54) DOCUMENT PROCESSING SYSTEM USING FULL IMAGE SCANNING

(75) Inventors: John E. Jones, Winnetka, IL (US); William J. Jones, Barrington, IL (US); Douglas U. Mennie, Barrington, IL (US); Paul A. Jones, Glenview, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 614 days.

(21) Appl. No.: 09/965,428

(22) Filed: Sep. 27, 2001

(65) Prior Publication Data

US 2003/0059098 A1 Mar. 27, 2003

(51) Int. Cl.
*G06K 9/00* (2006.01)

(52) U.S. Cl. ...................... 382/135; 209/534; 235/379; 902/7

(58) Field of Classification Search ................ 382/100, 382/135–140; 209/534; 235/379; 902/7
See application file for complete search history.

(56) References Cited

U.S. PATENT DOCUMENTS

| | | | | |
|---|---|---|---|---|
| 446,303 | A | 2/1891 | Thompson | |
| 2,669,998 | A | 2/1954 | Buchholz | 133/8 |
| 2,750,949 | A | 6/1956 | Kulo et al. | 133/8 |
| 2,835,260 | A | 5/1958 | Buchholz | 133/8 |
| 2,936,684 | A | 5/1960 | Simjian | 95/1.1 |
| 3,104,314 | A | 9/1963 | Simjian | 235/61.9 |
| 3,148,932 | A | 9/1964 | Simjian | 346/22 |
| 3,150,912 | A | 9/1964 | Simjian | 346/22 |
| 3,246,295 | A | 4/1966 | DeClaris et al. | 382/56 |
| 3,280,974 | A | 10/1966 | Riddle et al. | 209/111.8 |
| 3,443,107 | A | 5/1969 | Modglin | 250/219 |
| 3,480,785 | A | 11/1969 | Aufderheide | 250/219 |
| 3,496,370 | A | 2/1970 | Haville et al. | 250/219 |
| 3,509,535 | A | 4/1970 | Berube | 340/149 |
| 3,612,835 | A | 10/1971 | Andrews et al. | 235/61.11 D |
| 3,618,765 | A | 11/1971 | Syoasel et al. | 209/122 |
| 3,656,615 | A | 4/1972 | Ptacek | 209/73 |
| 3,679,314 | A | 7/1972 | Mustert | 356/71 |
| 3,715,031 | A | 2/1973 | Okkonen | 209/75 |

(Continued)

FOREIGN PATENT DOCUMENTS

| | | |
|---|---|---|
| EP | 0 071 421 | 2/1983 |

(Continued)

OTHER PUBLICATIONS

International Search Report, PCT/US02/30157, dated Apr. 14, 2003.

(Continued)

*Primary Examiner*—Vikkram Bali
*Assistant Examiner*—Anand Bhatnagar
(74) *Attorney, Agent, or Firm*—Jenkens & Gilchrist, PC

(57) ABSTRACT

A system for tracking currency bills comprises a currency scanning device. The scanning device includes a sensor that retrieves currency identification characteristic information of each bill processed. The currency identification characteristic information permits the unique identification of each bill processed. The system further comprises a customer identification means and means for associating each processed bill with the customer depositing the bill. Means for identifying the customer (or customer account) associated with a particular processed bill after the deposit transaction has been completed is also included in the system.

45 Claims, 33 Drawing Sheets

U.S. PATENT DOCUMENTS

| | | | | |
|---|---|---|---|---|
| 3,725,667 | A | 4/1973 | Schwartz | 250/219 DQ |
| 3,764,899 | A | 10/1973 | Peterson | 324/61 R |
| 3,778,628 | A | 12/1973 | Novak et al. | 250/556 |
| 3,782,543 | A | 1/1974 | Martelli et al. | 209/75 |
| 3,798,603 | A | 3/1974 | Wahlberg | 340/149 |
| 3,800,078 | A | 3/1974 | Cochran et al. | 178/7.1 |
| 3,806,710 | A | 4/1974 | Shigemori et al. | 235/92 |
| 3,815,021 | A | 6/1974 | Kerr | 324/61 R |
| 3,842,281 | A | 10/1974 | Goodrich | 250/461 |
| 3,870,629 | A | 3/1975 | Carter et al. | 209/111.8 |
| 3,906,449 | A | 9/1975 | Marchak | 340/149 R |
| 3,930,582 | A | 1/1976 | Gartner et al. | 209/88 |
| 3,966,047 | A | 6/1976 | Steiner | 209/75 |
| 3,976,198 | A | 8/1976 | Carnes, Jr. et al. | 209/111.7 T |
| 4,023,011 | A | 5/1977 | Nakajima et al. | 235/61.11 R |
| 4,041,456 | A | 8/1977 | Ott et al. | 382/135 |
| 4,096,991 | A | 6/1978 | Iguchi | 235/419 |
| 4,109,238 | A | 8/1978 | Creekmore | 340/149 |
| 4,114,804 | A | 9/1978 | Jones et al. | 235/476 |
| 4,147,430 | A | 4/1979 | Gorgone et al. | 356/51 |
| 4,166,945 | A | 9/1979 | Inoyama et al. | 235/379 |
| 4,179,685 | A | 12/1979 | O'Maley | 340/146.3 H |
| 4,187,463 | A | 2/1980 | Kivenson | 324/228 |
| 4,205,780 | A | 6/1980 | Burns et al. | 235/454 |
| 4,231,014 | A | 10/1980 | Ponzio | 340/146.3 Y |
| 4,237,378 | A | 12/1980 | Jones | 250/223 R |
| 4,250,806 | A | 2/1981 | Boyson et al. | 101/2 |
| 4,255,651 | A | 3/1981 | Phillips | 235/92 |
| 4,264,808 | A | 4/1981 | Owens et al. | 235/379 |
| 4,275,874 | A | 6/1981 | DiBlasio | 271/4 |
| 4,277,774 | A | 7/1981 | Fujii et al. | 340/146.3 |
| 4,283,708 | A | 8/1981 | Lee | 340/146.3 Z |
| 4,288,781 | A | 9/1981 | Sellner et al. | 340/146.3 |
| 4,302,781 | A | 11/1981 | Ikeda et al. | 358/486 |
| 4,310,885 | A | 1/1982 | Azcua et al. | 364/405 |
| 4,311,914 | A | 1/1982 | Huber | 250/556 |
| 4,313,598 | A | 2/1982 | DiBlasio | 271/124 |
| 4,321,672 | A | 3/1982 | Braun et al. | 364/408 |
| 4,334,619 | A | 6/1982 | Horino et al. | 209/551 |
| 4,337,864 | A | 7/1982 | McLean | 209/534 |
| 4,348,656 | A | 9/1982 | Gorgone et al. | 340/146.3 R |
| 4,349,111 | A | 9/1982 | Shah et al. | 209/534 |
| 4,352,988 | A | 10/1982 | Ishida | 250/559 |
| 4,355,300 | A | 10/1982 | Weber | 340/146.3 C |
| 4,355,369 | A | 10/1982 | Garvin | 364/900 |
| 4,356,473 | A | 10/1982 | Freudenthal | 340/146.3 H |
| 4,360,034 | A | 11/1982 | Davila et al. | 133/3 |
| 4,381,447 | A | 4/1983 | Horvath et al. | 250/223 |
| 4,383,540 | A | 5/1983 | DeMeyer et al. | 133/3 H |
| 4,386,432 | A | 5/1983 | Nakamura et al. | 382/7 |
| 4,396,902 | A | 8/1983 | Warthan et al. | 382/64 |
| 4,416,299 | A | 11/1983 | Bergman | 133/1 R |
| 4,420,153 | A | 12/1983 | Winkler et al. | 271/304 |
| 4,441,205 | A | 4/1984 | Berkin et al. | 382/8 |
| 4,442,541 | A | 4/1984 | Finkel et al. | 382/7 |
| 4,449,240 | A | 5/1984 | Yoshida | 382/15 |
| 4,461,028 | A | 7/1984 | Okubo | 382/15 |
| 4,464,786 | A | 8/1984 | Nishito et al. | 382/7 |
| 4,464,787 | A | 8/1984 | Fish et al. | 382/7 |
| RE31,692 | E | 10/1984 | Tyburski et al. | 382/7 |
| 4,480,177 | A | 10/1984 | Allen | 235/379 |
| 4,487,306 | A | 12/1984 | Nao et al. | 194/4 |
| 4,490,846 | A | 12/1984 | Ishida et al. | 382/7 |
| 4,513,439 | A | 4/1985 | Gorgone et al. | 382/7 |
| 4,530,067 | A | 7/1985 | Dorr | 364/900 |
| 4,538,719 | A | 9/1985 | Gray et al. | 194/100 A |
| 4,539,702 | A | 9/1985 | Oka | 382/7 |
| 4,542,829 | A | 9/1985 | Emery et al. | 209/534 |
| 4,543,969 | A | 10/1985 | Rasmussen | 133/3 |
| 4,544,266 | A | 10/1985 | Antes | 356/71 |
| 4,547,896 | A | 10/1985 | Ohtombe et al. | 382/7 |
| 4,553,222 | A | 11/1985 | Kurland et al. | 364/900 |
| 4,553,846 | A | 11/1985 | Hilton et al. | 356/429 |
| 4,556,140 | A | 12/1985 | Okada | 194/4 |
| 4,558,224 | A | 12/1985 | Gober | 250/460.1 |
| 4,559,451 | A | 12/1985 | Curl | 250/560 |
| 4,563,771 | A | 1/1986 | Gorgone et al. | 382/7 |
| 4,567,370 | A | 1/1986 | Falls | 250/461.1 |
| 4,569,421 | A | 2/1986 | Sandstedt | 186/39 |
| 4,582,172 | A | 4/1986 | Takeuchi et al. | 186/38 |
| 4,584,529 | A | 4/1986 | Aoyama | 324/261 |
| 4,587,412 | A | 5/1986 | Apisdorf | 235/449 |
| 4,587,434 | A | 5/1986 | Roes et al. | 250/556 |
| 4,590,606 | A | 5/1986 | Rohrer | 382/7 |
| 4,592,090 | A | 5/1986 | Curl et al. | 382/7 |
| 4,593,184 | A | 6/1986 | Bryce | 235/449 |
| 4,594,664 | A | 6/1986 | Hashimoto | 364/405 |
| 4,602,332 | A | 7/1986 | Hirose et al. | 364/408 |
| 4,605,926 | A | 8/1986 | Onishi et al. | 340/825.3 |
| 4,611,345 | A | 9/1986 | Ohnishi et al. | 382/7 |
| 4,617,458 | A | 10/1986 | Bryce | 235/449 |
| 4,628,194 | A | 12/1986 | Dobbins et al. | 235/379 |
| 4,645,936 | A | 2/1987 | Gorgone | 250/556 |
| 4,653,647 | A | 3/1987 | Hashimoto | 209/534 |
| 4,658,289 | A | 4/1987 | Nagano et al. | 358/75 |
| 4,676,343 | A | 6/1987 | Humble et al. | 186/61 |
| 4,677,682 | A | 6/1987 | Miyagawa et al. | 382/7 |
| 4,678,072 | A | 7/1987 | Kobayashi et al. | 194/206 |
| 4,685,141 | A | 8/1987 | Hoque et al. | 382/7 |
| 4,686,357 | A | 8/1987 | Douno et al. | 235/379 |
| 4,694,963 | A | 9/1987 | Takesako | 209/534 |
| 4,697,071 | A | 9/1987 | Hiraoka et al. | 235/379 |
| 4,700,368 | A | 10/1987 | Munn et al. | 377/8 |
| 4,716,456 | A | 12/1987 | Hosaka | 358/75 |
| 4,733,308 | A | 3/1988 | Nakamura et al. | 358/496 |
| 4,735,289 | A | 4/1988 | Kenyon | 186/37 |
| 4,743,743 | A | 5/1988 | Fukatsu | 235/379 |
| 4,743,974 | A | 5/1988 | Lockwood | 358/285 |
| 4,748,679 | A | 5/1988 | Gold et al. | 382/61 |
| 4,749,087 | A | 6/1988 | Buttifant | 209/534 |
| 4,753,625 | A | 6/1988 | Okada | 453/32 |
| 4,764,725 | A | 8/1988 | Bryce | 324/234 |
| 4,764,976 | A | 8/1988 | Kallin et al. | 382/65 |
| 4,782,328 | A | 11/1988 | Denlinger | 340/365 |
| 4,784,274 | A | 11/1988 | Mori et al. | 209/534 |
| 4,803,347 | A | 2/1989 | Sugahara et al. | 235/379 |
| 4,806,709 | A | 2/1989 | Evans | 178/19 |
| 4,811,004 | A | 3/1989 | Person et al. | 340/712 |
| 4,817,176 | A | 3/1989 | Marshall et al. | 382/43 |
| 4,821,332 | A | 4/1989 | Durham | 382/7 |
| 4,823,393 | A | 4/1989 | Kawakami | 382/7 |
| 4,825,246 | A | 4/1989 | Fukuchi et al. | 355/4 |
| 4,827,531 | A | 5/1989 | Milford | 382/7 |
| 4,837,842 | A | 6/1989 | Holt | 382/26 |
| 4,841,358 | A | 6/1989 | Kammoto et al. | 358/75 |
| 4,851,616 | A | 7/1989 | Wales et al. | 178/18 |
| 4,877,230 | A | 10/1989 | Winkler et al. | 271/3 |
| 4,880,096 | A | 11/1989 | Kobayashi et al. | 194/206 |
| 4,881,268 | A | 11/1989 | Uchida et al. | 382/7 |
| 4,883,181 | A | 11/1989 | Yoshikawa | 209/534 |
| 4,888,812 | A | 12/1989 | Dinan et al. | 382/7 |
| 4,903,953 | A | 2/1990 | Winkler et al. | 271/4 |
| 4,905,839 | A | 3/1990 | Yuge et al. | 209/534 |
| 4,905,840 | A | 3/1990 | Yuge et al. | 209/534 |
| 4,908,516 | A | 3/1990 | West | 250/556 |
| 4,922,109 | A | 5/1990 | Bercovitz et al. | 194/207 |
| 4,928,094 | A | 5/1990 | Smith | 340/712 |
| 4,931,782 | A | 6/1990 | Jackson | 340/706 |
| 4,947,441 | A | 8/1990 | Hara et al. | 382/7 |
| 4,954,697 | A | 9/1990 | Kokubun et al. | 235/381 |
| 4,970,655 | A | 11/1990 | Winn et al. | 364/479 |
| 4,973,851 | A | 11/1990 | Lee | 250/556 |
| 4,980,543 | A | 12/1990 | Hara et al. | 209/534 |
| 4,992,860 | A | 2/1991 | Hamaguchi et al. | 358/75 |

| | | | | |
|---|---|---|---|---|
| 4,996,604 | A | 2/1991 | Ogawa et al. | 358/486 |
| 5,023,782 | A | 6/1991 | Lutz et al. | 364/405 |
| 5,027,415 | A | 6/1991 | Hara et al. | 382/7 |
| 5,047,871 | A | 9/1991 | Meyer et al. | 358/486 |
| 5,054,621 | A | 10/1991 | Murphy et al. | 209/534 |
| 5,055,834 | A | 10/1991 | Chiba | 340/825 |
| 5,063,599 | A | 11/1991 | Concannon et al. | 382/7 |
| 5,068,519 | A | 11/1991 | Bryce | 235/449 |
| 5,076,441 | A | 12/1991 | Gerlier | 209/534 |
| 5,091,961 | A | 2/1992 | Baus, Jr. | 382/7 |
| 5,105,601 | A | 4/1992 | Horiguchi et al. | 53/465 |
| 5,114,381 | A | 5/1992 | Ueda et al. | 453/57 |
| 5,120,944 | A | 6/1992 | Kern et al. | 235/379 |
| 5,122,754 | A | 6/1992 | Gotaas | 324/676 |
| 5,134,663 | A | 7/1992 | Kozlowski | 382/7 |
| 5,135,115 | A | 8/1992 | Miller et al. | 209/564 |
| 5,144,115 | A | 9/1992 | Yoshida | 235/379 |
| 5,146,512 | A | 9/1992 | Weideman et al. | 382/30 |
| 5,151,607 | A | 9/1992 | Crane | 250/556 |
| 5,154,272 | A | 10/1992 | Nishiumi et al. | 194/318 |
| 5,159,548 | A | 10/1992 | Caslavka | 364/408 |
| 5,163,672 | A | 11/1992 | Mennie | 271/187 |
| 5,163,868 | A | 11/1992 | Adams et al. | 453/11 |
| 5,167,313 | A | 12/1992 | Dobbins et al. | 194/317 |
| 5,183,142 | A | 2/1993 | Latchinian et al. | 194/206 |
| 5,184,115 | A | 2/1993 | Black et al. | 340/708 |
| 5,184,709 | A | 2/1993 | Nishiumi et al. | 194/318 |
| 5,186,334 | A | 2/1993 | Fukudome et al. | 209/534 |
| 5,187,750 | A | 2/1993 | Behera | 382/7 |
| 5,193,121 | A | 3/1993 | Elischer et al. | 382/7 |
| 5,198,976 | A | 3/1993 | Form et al. | 364/410 |
| 5,199,543 | A | 4/1993 | Kamagami et al. | 194/207 |
| 5,201,395 | A | 4/1993 | Takizawa et al. | 194/206 |
| 5,207,788 | A | 5/1993 | Geib et al. | 271/122 |
| 5,231,381 | A | 7/1993 | Duwaer | 340/712 |
| 5,237,158 | A | 8/1993 | Kern et al. | 235/379 |
| 5,239,593 | A | 8/1993 | Wittner et al. | 382/14 |
| 5,251,738 | A | 10/1993 | Dabrowski | 194/206 |
| 5,261,518 | A | 11/1993 | Bryce | 194/206 |
| 5,265,008 | A | 11/1993 | Benton et al. | 364/408 |
| 5,279,403 | A | 1/1994 | Harbaugh et al. | 194/207 |
| 5,286,954 | A | 2/1994 | Sato et al. | 235/379 |
| 5,295,196 | A | 3/1994 | Raterman et al. | 382/135 |
| 5,297,030 | A | 3/1994 | Vassigh et al. | 364/405 |
| 5,299,977 | A | 4/1994 | Mazur et al. | 453/10 |
| 5,304,813 | A | 4/1994 | DeMan | 250/556 |
| 5,308,992 | A | 5/1994 | Crane et al. | 250/556 |
| 5,309,515 | A | 5/1994 | Troung et al. | 382/7 |
| 5,317,140 | A | 5/1994 | Dunthorn | 250/221 |
| 5,321,238 | A | 6/1994 | Kamata et al. | 235/379 |
| 5,335,292 | A | 8/1994 | Lovelady et al. | 382/17 |
| 5,341,408 | A | 8/1994 | Melcher et al. | 377/8 |
| 5,342,165 | A | 8/1994 | Graef et al. | 414/788.9 |
| 5,363,949 | A | 11/1994 | Matsubayashi | 194/206 |
| 5,367,577 | A | 11/1994 | Gotaas | 382/7 |
| 5,368,147 | A | 11/1994 | Menke et al. | 194/206 |
| 5,371,345 | A | 12/1994 | LeStrange et al. | 235/380 |
| 5,371,798 | A | 12/1994 | McWhortor | 380/51 |
| 5,373,550 | A | 12/1994 | Campbell et al. | 379/100 |
| 5,379,344 | A | 1/1995 | Larson et al. | 380/23 |
| 5,381,019 | A | 1/1995 | Sato | 250/556 |
| 5,394,969 | A | 3/1995 | Harbaugh | 194/206 |
| 5,399,874 | A | 3/1995 | Gonsalves et al. | 250/556 |
| 5,402,895 | A | 4/1995 | Mikkelsen et al. | 209/534 |
| 5,417,316 | A | 5/1995 | Harbaugh | 194/206 |
| 5,418,458 | A | 5/1995 | Jeffers | 324/235 |
| 5,419,424 | A | 5/1995 | Harbaugh | 194/206 |
| 5,421,443 | A | 6/1995 | Hatamachi et al. | 194/206 |
| 5,430,664 | A | 7/1995 | Cargill et al. | 364/550 |
| 5,434,427 | A | 7/1995 | Crane et al. | 250/556 |
| 5,437,357 | A | 8/1995 | Ota et al. | 194/206 |
| 5,438,184 | A | 8/1995 | Roberts et al. | 235/380 |
| 5,444,793 | A | 8/1995 | Kelland | 382/138 |
| 5,444,794 | A | 8/1995 | Uhland, Sr. | 382/137 |
| 5,459,304 | A | 10/1995 | Eisenmann | 235/380 |
| 5,465,301 | A | 11/1995 | Jotcham et al. | 380/54 |
| 5,465,821 | A | 11/1995 | Akioka | 194/207 |
| 5,467,405 | A | 11/1995 | Raterman et al. | 382/135 |
| 5,467,406 | A | 11/1995 | Graves et al. | 382/135 |
| 5,468,971 | A | 11/1995 | Ebstein et al. | 250/556 |
| 5,476,169 | A | 12/1995 | Takarada et al. | 194/207 |
| 5,481,377 | A | 1/1996 | Udagawa et al. | 358/501 |
| 5,488,671 | A | 1/1996 | Kern | 382/138 |
| 5,504,822 | A | 4/1996 | Holt | 382/218 |
| 5,506,691 | A | 4/1996 | Bednar et al. | 358/402 |
| D369,984 | S | 5/1996 | Larsen | D10/97 |
| 5,523,575 | A | 6/1996 | Machida et al. | 250/208.1 |
| 5,530,772 | A | 6/1996 | Storey | 382/135 |
| 5,537,486 | A | 7/1996 | Stratigos et al. | 382/137 |
| 5,544,043 | A | 8/1996 | Miki et al. | 364/406 |
| 5,545,885 | A | 8/1996 | Jagielinski | 235/449 |
| 5,564,546 | A | 10/1996 | Molbak et al. | 194/216 |
| 5,586,036 | A | 12/1996 | Pintsov | 364/464 |
| 5,592,377 | A | 1/1997 | Lipkin | 395/242 |
| 5,600,732 | A | 2/1997 | Ott et al. | 382/112 |
| 5,602,933 | A | 2/1997 | Blackwell et al. | 382/116 |
| 5,602,936 | A | 2/1997 | Green et al. | 382/140 |
| 5,607,040 | A | 3/1997 | Mathurin, Sr. | |
| 5,615,280 | A | 3/1997 | Izawa et al. | 382/135 |
| 5,620,079 | A | 4/1997 | Molbak | 194/217 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,657,846 | A | 8/1997 | Schwartz | 194/206 |
| 5,678,046 | A | 10/1997 | Cahill et al. | 395/616 |
| 5,680,472 | A | 10/1997 | Conant | 382/135 |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,719,948 | A | 2/1998 | Liang | 382/112 |
| 5,724,438 | A | 3/1998 | Graves | 382/135 |
| 5,727,667 | A | 3/1998 | Nye | 382/135 |
| 5,729,623 | A | 3/1998 | Omatu et al. | 382/155 |
| 5,751,840 | A | 5/1998 | Raterman et al. | 382/135 |
| 5,751,842 | A | 5/1998 | Riach et al. | 382/137 |
| 5,754,673 | A | 5/1998 | Brooks et al. | 382/112 |
| 5,761,089 | A | 6/1998 | McInerny | 364/550 |
| 5,781,654 | A | 7/1998 | Carney | 382/137 |
| 5,790,693 | A | 8/1998 | Graves et al. | 382/135 |
| 5,790,697 | A | 8/1998 | Munro et al. | 382/135 |
| 5,799,767 | A | 9/1998 | Molbak | 194/217 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,830,054 | A | 11/1998 | Petri | 453/5 |
| 5,832,104 | A | 11/1998 | Graves et al. | 382/135 |
| 5,832,463 | A | 11/1998 | Funk | 705/35 |
| 5,852,811 | A | 12/1998 | Atkins | 705/36 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,918,748 | A | 7/1999 | Clark et al. | 209/534 |
| 5,926,550 | A | 7/1999 | Davis | 380/25 |
| 5,938,044 | A | 8/1999 | Weggesser | 209/534 |
| 5,940,623 | A | 8/1999 | Watts et al. | 395/712 |
| 5,940,844 | A | 8/1999 | Cahill et al. | 705/526 |
| 5,943,655 | A | 8/1999 | Jacobson | 705/30 |
| 5,947,255 | A | 9/1999 | Shimada et al. | 194/207 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |

| | | | | |
|---|---|---|---|---|
| 6,012,565 | A | 1/2000 | Mazur | 194/207 |
| 6,021,883 | A | 2/2000 | Casanova et al. | 194/217 |
| 6,023,684 | A | 2/2000 | Pearson | 705/35 |
| 6,026,175 | A | 2/2000 | Raterman et al. | 382/135 |
| 6,028,951 | A | 2/2000 | Raterman et al. | 382/135 |
| 6,038,553 | A | 3/2000 | Hyde, Jr. | 705/45 |
| 6,039,645 | A | 3/2000 | Mazur | 453/10 |
| 6,065,672 | A | 5/2000 | Haycock | |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| D427,623 | S | 7/2000 | Kuwada et al. | D18/3 |
| 6,119,946 | A | 9/2000 | Teicher | 235/492 |
| 6,128,402 | A | 10/2000 | Jones et al. | 382/135 |
| 6,131,718 | A | 10/2000 | Witschorik | |
| 6,141,438 | A | 10/2000 | Blanchester | 382/140 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,283,366 | B1 | 9/2001 | Hills et al. | 235/379 |
| 6,311,819 | B1 | 11/2001 | Stromme et al. | 194/207 |
| 6,318,537 | B1 | 11/2001 | Jones et al. | 914/346 |
| 6,351,551 | B1 | 2/2002 | Munro et al. | 382/135 |
| 6,354,491 | B2 | 3/2002 | Nichols et al. | 235/379 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,415,983 | B1 | 7/2002 | Ulvr et al. | 235/487 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,550,671 | B1 | 4/2003 | Brown et al. | |
| 6,560,355 | B2 | 5/2003 | Graves et al. | 382/135 |
| 6,661,910 | B2 * | 12/2003 | Jones et al. | 382/135 |
| 2001/0006557 | A1 | 7/2001 | Mennie et al. | 382/135 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2004/0131230 | A1 | 7/2004 | Paraskevakos | |
| 2006/0054454 | A1 * | 3/2006 | Oh | 194/207 |

FOREIGN PATENT DOCUMENTS

| | | |
|---|---|---|
| EP | 0 077 464 | 4/1983 |
| EP | 0 083 062 | 7/1983 |
| EP | 0 101 115 | 2/1984 |
| EP | 0 109 743 | 5/1984 |
| EP | 0 185 200 | 6/1986 |
| EP | 0 253 935 | 1/1988 |
| EP | 0 325 364 | 7/1989 |
| EP | 0 338 123 | 10/1989 |
| EP | 0 342 647 | 11/1989 |
| EP | 0 402 627 | 12/1990 |
| EP | 0 578 875 | 1/1994 |
| EP | 0 583 526 | 2/1994 |
| EP | 0 583 723 | 2/1994 |
| EP | 0 612 042 A3 | 8/1994 |
| EP | 0 613 107 | 8/1994 |
| EP | 0 633 552 | 1/1995 |
| EP | 0 633 553 | 2/1995 |
| EP | 0 671 696 | 9/1995 |
| EP | 0 718 809 A2 | 6/1996 |
| EP | 0 612 042 B1 | 6/1998 |
| EP | 0 548 142 B2 | 9/1999 |
| EP | 0 708 419 B1 | 1/2000 |
| EP | 0 824 736 B1 | 3/2000 |
| EP | 0 686 292 B1 | 7/2000 |
| EP | 0 760 987 B1 | 9/2000 |
| GB | 2 038 063 | 7/1980 |
| GB | 2 190 996 | 12/1987 |
| GB | 2 204 166 | 11/1988 |
| GB | 2 272 762 | 5/1994 |
| JP | 62-220843 | 9/1987 |
| JP | 2-12492 | 1/1990 |
| WO | WO 90/07165 | 6/1990 |
| WO | WO 91/11778 | 8/1991 |
| WO | WO 92/14221 | 8/1992 |
| WO | WO 92/17394 | 10/1992 |
| WO | WO 93/23824 | 11/1993 |
| WO | WO 94/16412 | 7/1994 |
| WO | WO 94/19773 | 9/1994 |
| WO | WO 95/24691 | 3/1995 |
| WO | WO 95/19019 | 7/1995 |
| WO | WO 96/10800 | 9/1995 |
| WO | WO 96/36933 | 11/1996 |
| WO | WO 97/29459 | 8/1997 |
| WO | WO 97/30422 | 8/1997 |
| WO | WO 98/24041 | 6/1998 |
| WO | WO 98/48383 | 10/1998 |
| WO | WO 98/48384 | 10/1998 |
| WO | WO 98/48385 | 10/1998 |
| WO | WO 98/51082 | 11/1998 |
| WO | WO 99/00776 | 1/1999 |

OTHER PUBLICATIONS

Currency Systems International, CPS 600 and CPS 900 (estimated 1994).

De La Rue Garny GmBH, Cash Depositing Systems CDS 5700 and CDS 5800 (date unknown, with translation).

Toshiba-Mosler, CF-420 (estimated 1989).

Toshiba-Mosler, Operator's Manual for CF-420 Cash Settlement System, pp. 1-C-3 (1989).

Elston, Cassius, "No More Lines . . . Self Serve Cash-Out," Drop Stream Developments, p. 3 (date prior to May 13, 1996).

AFB Currency Recognition System (1982).

Barton, Louis L., "Check Processing Operations," Chapter 8 and Appendix 2, pp. 119-140 and 225-231 (1994).

Brandt, Mach 7 High-Speed Coin Sorter/Counter, 2 pages (Apr. 1, 1993).

Brandt, Model 8904 Upfeed, High Speed 4-Denomination Currency Dispenser, 2 pages (date prior to May 1996).

Cash Depositing System CDS 5700 and CDS 5800 (Jan. 3, 1995, with translation).
Cash Receipt System CRS/6501/CRS6510, IREIS (Feb. 1995).
Contomat (date prior to May 13, 1996).
Cummins-Allison Corp., Operating Instructions for JetScan Currency Scanner/Counter, Model 4061 (Apr. 20, 1993).
Cummins-Allison Corp., Operating Instructions for JetScan Currency Scanner/Counter, Model 4062 (Nov. 28, 1994).
Cummins-Allison Corp., Operating Instructions for JetSort® High Speed Sorter/Counter (Kits I & J), 11 pages (1993).
Cummins-Allison Corp., Operator's Manual for JetScan Currency Scanner/Counter, Model 4060 (Aug. 1991).
Cummins-Allison Corp., Sale of JetScan Currency Scanner/Counter, Model 4060 (Aug. 1991).
Cummins-Allison Corp., Sale of JetScan Currency/Counter, Model 4061 (Apr. 20, 1993).
Cummins-Allison Corp., Sale of JetScan Currency Scanner/Counter, Model 4062 (Nov. 28, 1994).
Currency Systems International, Medium Speed Currency Sorting Family, CPS 600 and CPS 900, 4 pages (1994).
Currency Systems International, Mr. W. Kranister in Conversation With Richard Haycock, pp. 1-5 (estimated 1994).
Currency Systems International/Currency Processing Systems, CPS 300, 4 pages (1992).
Glory, General Catalog of Products, System 8000 at p. 5 (1996, with translation).
Glory, GFB-200/210/220/230, Desk-Top Bank Note Counter, 2 pages (estimated date prior to Aug. 9, 1994).
Glory, GSA-500 Sortmaster, 2 pages (Jan. 14, 1994).
Glory, The New CRS-8000 Cash Redemption System (date prior to May 13, 1996).
Glory, UF-1D, 2 pages (estimated date prior to Aug. 9, 1994).
ISH I2005/500 SB-Münzähler (date prior to May 13, 1996, with translation).
Mosler, Inc., "The Mosler/Toshiba CF-420" (1989).
NGZ 2100 (date prior to May 13, 1996).
PREMA 405(RE) Self Service Coin Deposit Facility (date prior to May 13, 1996).
Scan Coin CDS 600 Cash Deposit System (Jun. 15, 1994).
Scan Coin CDS 640 Cash Deposit System (Jun. 15, 1994).
Toshiba-Mosler, revised drawings of portions of CF-420 Cash Management System (FIGS. A-C) and description of same (1989).
Vector Videotape (no date).

* cited by examiner

DOCUMENT PROCESSING SYSTEM USING FULL IMAGE SCANNING

FIELD OF THE INVENTION

The field of the invention relates generally to a document processing system and, more specifically, to systems whereby information used to track and authenticate currency bills is extracted from an image obtained of the currency bills.

BACKGROUND OF THE INVENTION

In the financial banking industry, and in general, it is important that counterfeit currency bills are discovered quickly and accurately. Currently, numerous counterfeit detection devices exist that attempt to detect counterfeit bills. Some of these devices include comparing the light, visible, infrared, and/or ultraviolet, emitted from tested bills to light emitted from known genuine bills. Other security features in genuine bills include watermarks, magnetic printing, and security threads. These devices, however, do not catch all counterfeit bills. Undetected counterfeit bills are sometimes accepted for deposit into a depositor's financial account (i.e., a savings and/or checking account), often at the loss to the bank. For example, if a counterfeit bill passes through the device undetected and is later discovered to be counterfeit, there is no way to discover who deposited, gave, or otherwise disposed of the counterfeit bill. When a counterfeit bill is passed onto a bank or a company, the entity discovering that the currency bill is a counterfeit bears the loss. Thus, a bank using any of these devices would still be unable to charge customers for counterfeit currency bills once it is discovered that the bill is counterfeit.

Another drawback of some current counterfeit detection devices is speed. In some counterfeit detection devices, currency bills must be fed into the devices one by one, which requires manual operation and is quite slow. If it is the customer (a depositor at a bank or a consumer at a retail location) who must feed the bills, this may create customer dissatisfaction with the entity requiring such methods. Alternatively, if it is the entity accepting the bills that manually feeds the bills through the devices, then they must pay someone to feed the bills into the device. Also, another drawback is that customers must wait in longer lines to have their deposits processed because each deposit takes longer to process.

Therefore, there is a need for a device that provides for an improved method of tracking the movement of currency bills that may be used by entities that deal with a high volume of currency bills (such as financial institutions, retail stores, casinos). There is also a need to quickly process a deposit, so time spent in line or feeding the machine is minimized.

In addition to losses experienced by banks due to counterfeit currency bills, banks often experience losses due to forged or counterfeit checks. Currently, when a check comes into a bank for payment, the customer may provisionally be given credit for the check. The check is then routed through the Federal Reserve banking system to the bank that the check is drawn against. Once the payee bank receives the check, the check is taken to a processing center where the check is authenticated. The checking account number and check number will be checked for validity as well as to see if any stop payments have been placed on the check. Check amounts may be verified against set limits and signatures may be verified against signature cards. If a check is deemed to be a forgery or as one that should not be paid, the payee bank returns the check to the depositing bank, which will then debit the account to which the check was deposited.

There are, however, problems with the current system. First, it takes time to do all the processing, and the Federal Reserve Bank has imposed time limits as to how long a bank has to return a check. If the check is not discovered to be fraudulent until after the deadline has passed, one of the banks will bear the cost of the amount of the check. Also, because of these deadlines, some banks may only have time to verify signatures on high dollar amount checks, thus bearing the risk of low dollar amount checks. This leaves the banks open to risk on numerous low dollar amount checks. Sometimes, the customer may be overdrawn or have closed the account by the time the depositing bank returns the check, which also leaves the bank open to the possibility of bearing the loss.

Many banks allow people to cash checks drawn on that particular bank. In this case, there is no way for the teller to know prior to disbursing the money whether the check is forged or if it should not be paid for another reason. A teller may verify the signatures and check for stop payments (when a customer indicates to the bank not to pay a certain check number) on checks drawn on that bank. This is insufficient in many instances and may also be very time consuming, depending on how the signatures for the account are stored and how many the teller must look through.

Also, many banks allow their customers to cash checks that are drawn on other banks. This also carries risk for the bank, since the check may be returned and the account may have insufficient funds or the account may be closed. Another problem is that the Federal Reserve requires that a certain amount ($100) of the check become available after a certain time period, which may be before the check has been verified by the payee bank. This also opens the bank to certain risks.

Thus, there is a need for a device that can be used by a teller or a customer that can quickly verify whether a check should be paid.

SUMMARY OF THE INVENTION

According to one embodiment, a system for tracking currency bills comprising a currency scanning device is provided. The scanning device includes a sensor that retrieves currency identification characteristic information of each bill processed. The currency identification characteristic information permits the unique identification of each bill processed. The system further comprises a customer identification means and means for associating each processed bill with the customer depositing the bill. Means for identifying the customer (or customer account) associated with a particular processed bill after the deposit transaction has been completed is also included in the system.

BRIEF DESCRIPTION OF THE DRAWINGS

The foregoing and other advantages of the invention will become apparent upon reading the following detailed description and upon reference to the drawings.

Figure 1:
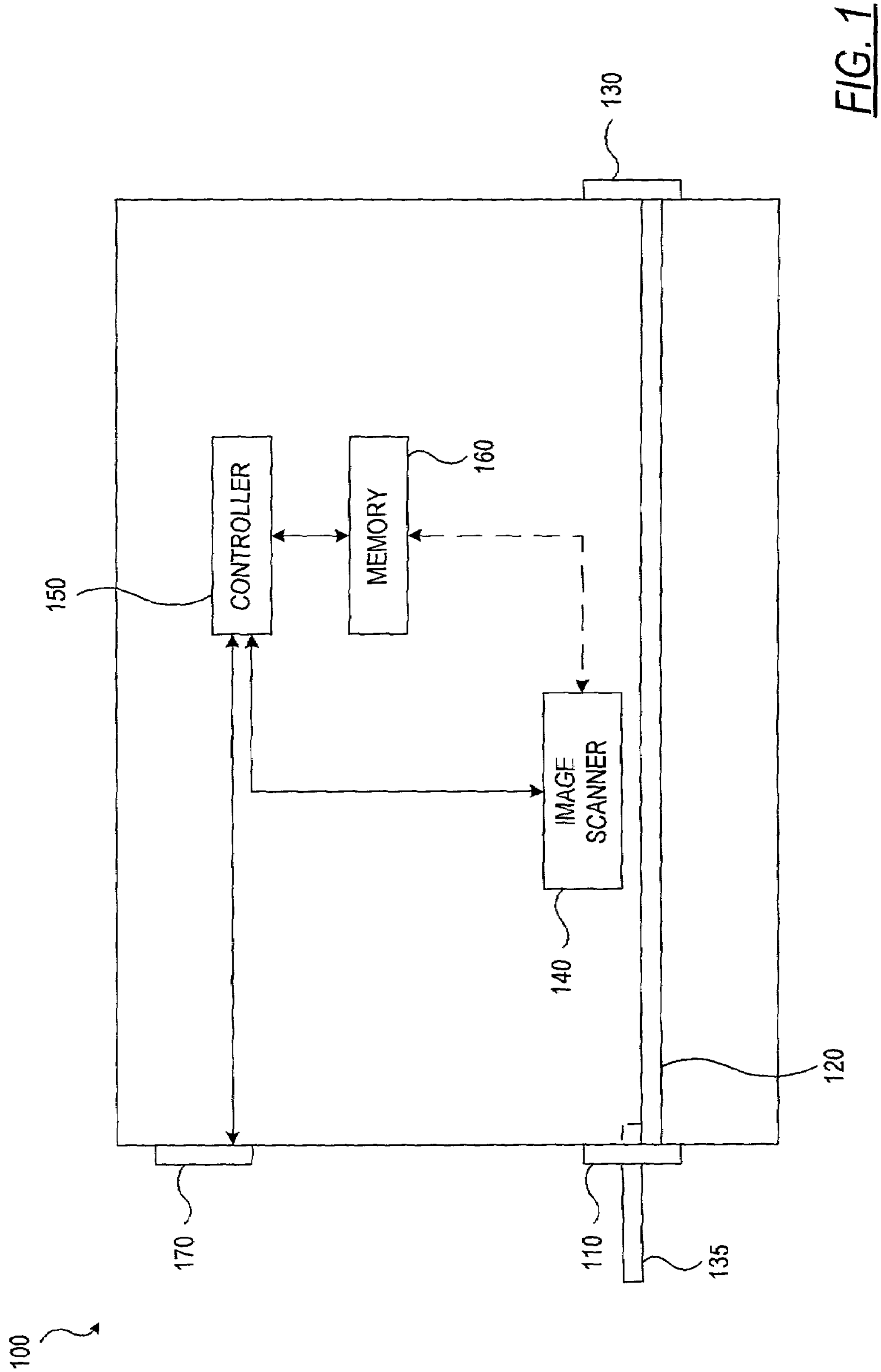
FIG. 1 is a functional block diagram of a document scanning device according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Everyday, businesses and people unknowingly accept counterfeit currency bills as genuine bills. The term "currency bills" refers to official currency bills including s both U.S. and foreign currency. It also refers to bills issued by casinos (e.g., casino script), other private entities such as "DISNEY DOLLARS®" (a registered trademark of Walt Disney Enterprises of Burbank, Calif.), and bar coded transaction records. A counterfeit currency bill is a currency bill which is not issued by an authorized maker. For example, in the case of U.S. currency bills, a counterfeit currency bill would be a document printed to look like a genuine U.S. bill but not printed by the U.S. Treasury Department's Bureau of Engraving and Printing. In terms of casino script, a counterfeit currency bill would be a script that is not issued by the casino or one that has been tampered. Bar coded transaction records include items such as those given by casinos in lieu of cash at the machine or gambling table. The bar code represents a number that is stored in a database. The number is then related to a dollar amount. When a person redeems the bar coded transaction record, the encoded number is read and the correlating amount of money is delivered to the customer. Bar coded transaction records may also be coupons or tickets. The term "businesses" refers to any business or entity accepting money from another entity or person. Throughout most of this description, the term "bank" will be used for ease of description. It should be understood, however, that this invention also applies to people, companies, corporations, other financial institutions such as savings and loans, and any other entity that receives currency bills. To reduce the costs associated with receiving counterfeit bills and to prevent the receiving entity, such as a bank, from having to assume all of the risks and costs from accepting counterfeit bills, a document processing system according to the present invention may be used.

Turning now to FIG. 1, a block diagram of a document scanning device 100 according to one embodiment of the present invention is illustrated. The document scanning device 100 includes an input receptacle 110, a transport mechanism 120, and an output receptacle 130. For ease of description, only one input receptacle 110 and one output receptacle 130 are shown in this drawing. The document scanning device 100 may, however, include any number of input receptacles 110 and output receptacles 130. For example, a device may have two input receptacles, one for currency bills and one for checks, or simply to accommodate a greater number of currency bills.

An operator inserts a currency bill 135 into the input receptacle 110. In this application, the term "operator" refers to someone who is a customer of the bank or other entity utilizing the system or to someone employed by the owner of the scanning device to ensure proper running. The document scanning device 100 may be used in a variety of situations with a variety of operators. For example, the document scanning device 100 may be used as a stand-alone device, like an Automated Teller Machine, in which the operator is a customer who uses the device to deposit currency bills into a bank account. In another embodiment, the document scanning device 100 may be a semi-attended device where both a customer and an employee of the entity are at the device. In another alternative embodiment, the document scanning device 100 may be used only by employees of the bank or other entity using it.

As stated above, the document scanning device 100 may receive one currency bill or may receive a stack of currency bills into the input receptacle 110. The transport mechanism 120 is coupled to the input receptacle 110 and is adapted to transport the currency bill 135 through the document scanning device 100, past an image scanner 140 and to the output receptacle 130. A controller 150 is linked to the image scanner 140, the transport mechanism 120, a memory 160, and an operator control panel 170. The controller is adapted to control the operation of the transport mechanism 120 and the image scanner 140, communicate information to and from the memory 160, and to communicate information to and from the operator control panel 170. For example, the controller 150 may send display information to and receive operator input from the operator control panel 170.

Once the image scanner 140 receives an instruction from the controller 150, the image scanner 140 scans the currency bill 135, and obtains an image of the currency bill. The image may be an image of substantially the entire currency bill 135 (a "full image") or of selected portions of the currency bill 135. The image scanner 140 may contain optical character recognition (OCR) software for identifying the characters printed in one or more fields of the currency bills. The OCR may also recognize certain fields within the currency bill 135. For example, the OCR may search the full image for a serial number, extract the serial number once the field is located, and transfer the determined serial number to the memory 160 through the controller 150 for storage. In an alternative embodiment, the image scanner 140 is directly linked to the memory 160 for the transfer and storage of the images and/or extracted data.

As stated above, the memory 160 is used to store the images of the currency bill 135 scanned by the image scanner 140. In one alternative embodiment, the memory 160 may store the fill image of the currency bill 135 (i.e., a picture of the entire bill 135). In another embodiment, the memory 160 may only store an image of a portion of the currency bill 135. It may be that the memory 160 only needs to store an image of half of the currency bill 135 and still have the fields needed for that bank's purposes. In another embodiment, the memory 160 may only store a strip of the currency bill 135. According to an alternative embodiment, the memory 160 also stores extracted information, such as information which may be used to uniquely identify bills, track bills, and/or assist in detecting counterfeit currency bills. For example, it is known that people who create counterfeit U.S. currency bills often reuse the same serial number on the currency bills. Therefore, once a serial number is associated with a counterfeit currency bill, this number is stored in the memory 160.

When a new currency bill is scanned, the controller 150 compares the serial number of the scanned currency bill against any serial numbers stored in the memory 160. If a match is found, the controller 150 may send a signal to the operator control panel 170 to indicate that a suspected counterfeit bill has been found. In one embodiment, the bill suspected to be counterfeit may be flagged. In some embodiments, a number of data can be used to assess whether a bill is a suspect bill, including serial number, denomination, series, issuing bank, image quality, infrared characteristics, ultraviolet characteristics, color shifting ink, watermarks, metallic threads, holograms, etc., or some combination thereof In other types of currency bills, another predetermined or encoded field may be used to check for authenticity. For example, in bar coded tickets or currency using bar codes, certain bar codes may be known to be counterfeit. Alternatively, other security features, such as certain arrangements only going with certain denominations, may be utilized to determine the authenticity of the currency bill. For example, a hologram may only be used with high denomination currency bills, a lower denomination bill that has the hologram would be recognized as being counterfeit. Other encoded fields may also be utilized in a similar fashion. In some embodiments, the fields utilized may be overt security codes, such as a series number, or they may be covert security codes that are not made public by the government to ensure maximum security.

In some embodiments, the controller 150 may cause the operation of the document scanning device 100 to halt once a counterfeit currency bill is flagged or detected so that the suspect bill may be examined. According to one embodiment, such as in a device having more than one output receptacle, the suspected counterfeit bill may be off-sorted to another output receptacle, while the document scanning device 100 continues to run. Once this occurs, the operator may be notified of the serial number of the counterfeit bill via the operator control panel 170. The operator control panel 170 may be, for example, a display screen that is capable of depicting images or it may only be an LED light that illuminates or blinks to warn of a counterfeit bill.

Figure 2:
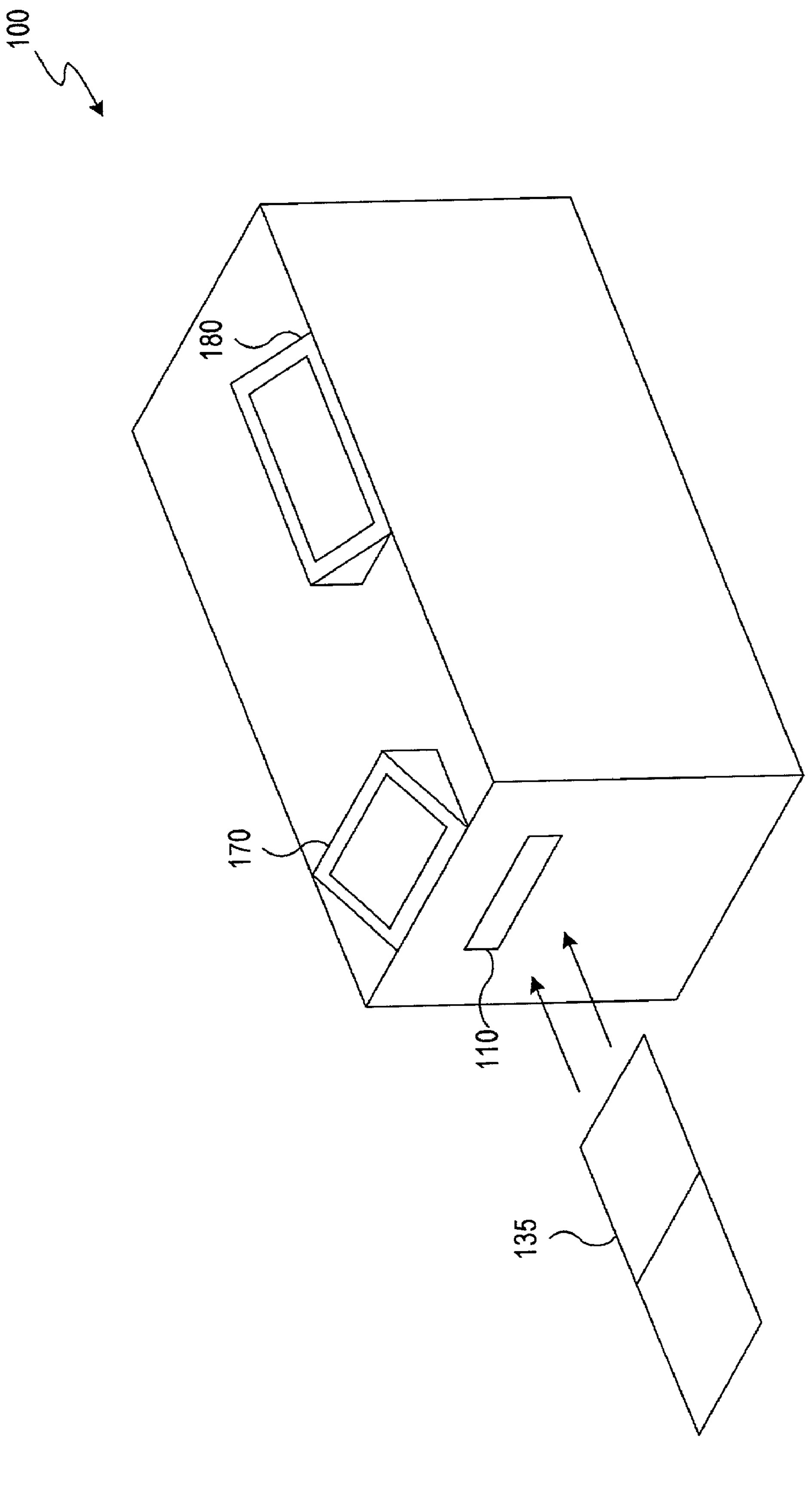
FIG. 2 is a perspective view of a document scanning device according to one embodiment of the present invention.

Turning now to FIG. 2, a perspective view of a document scanning device 100 is illustrated. In this particular embodiment, the document scanning device 100 includes an additional control panel 180 (e.g., a customer control panel) for receiving and displaying information. The customer control panel 180 may be used by a depositor who is waiting while their currency bill 135 is being scanned by the document scanning device 100. This may be useful if a customer is willing to wait to ensure that all of the bills are authentic.

Figure 3A:
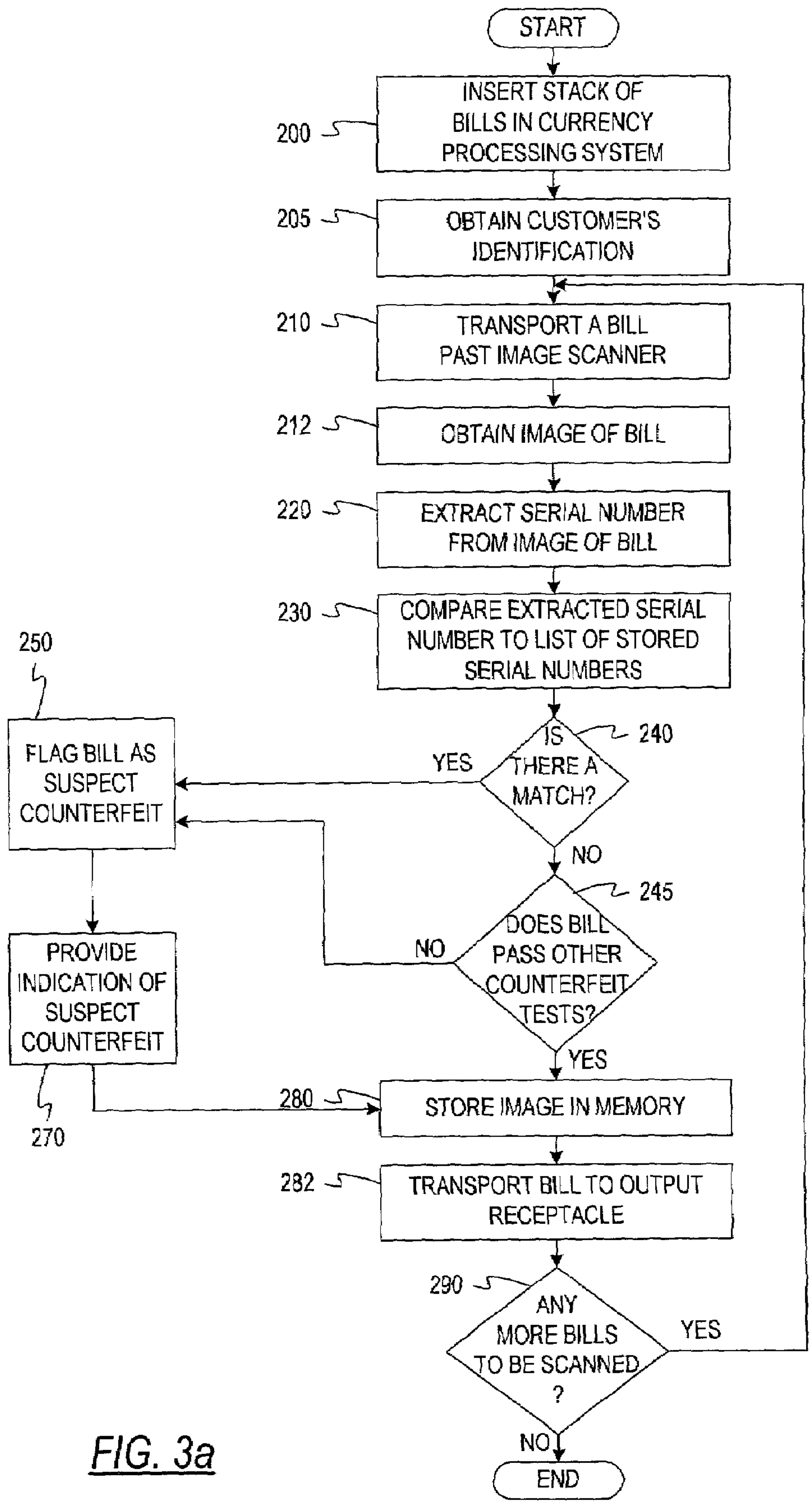
FIG. 3*a* is a flowchart describing the operation of a document scanning device according to one embodiment of the present invention.

FIG. 3*a* is a flowchart describing the operation of a document scanning device, such as the document scanning device 100 of FIGS. 1 and 2. At step 200, a customer or operator inserts a stack of documents, such as currency bills, into the document scanning device. At step 205, the scanning device obtains a customer identification number. The customer identification number is a way to link the customer making the deposit to the items in the deposit. The customer identifier may be any type of unique identifier, such as an account number, PIN, merchant number, social security number, driver's license number, credit/debit/smart card number, and bar coded or other encoded number. The customer identifier may be encoded based on the customer's name or any other identifying number (such as driver's license number or social security number). The customer identifier may also be an alphanumeric code, a fingerprint, or scan. The customer identifier may also be obtained by a video image of the customer or any other known way to identify a person. The customer identification number may be obtained in any number of ways by a customer identification input device, including reading the account number off an encoded sheet, such as a bar encoded slip or a MICR encoded deposit slip, having it input into the device by an operator or by a customer (such as inputting a PIN or an actual account number), or reading it from a debit/credit/smart card that is input into the device, to name a few. The customer identification input device may be any known device capable of receiving commands, such as a keyboard, a keypad, a touch screen, or a mouse. The customer identification input device may also be any type of reader, such as a MICR reader, a bar code reader, an optical reader, or others known in the art.

The currency bills are then transported one at a time past the image scanner by the transport mechanism (step 210). An image is then obtained at step 212. At step 220, data, such as a serial number, is then extracted from the full image of the currency bill using the OCR software. The extracted serial number is then compared to a list of serial numbers stored in the memory (step 230). The stored serial numbers are serial numbers that are known to be associated with counterfeit bills. At step 240, the scanning device then inquires as to whether a match was found. If the serial number of the scanned currency bill matches a serial number stored in the memory, then the process moves to step 250 and the currency bill is flagged.

According to the embodiment illustrated in FIG. 3*a*, the document scanning device continues to run when a match occurs. The controller provides an indication of the suspected counterfeit bill via the control panel to the customer and/or operator of the system (step 270). The controller may also direct that an indication be placed on the image explaining why the currency bill was flagged. The indication may be a blinking light, the image may be depicted on a display screen, or the matching serial number may be displayed. In another embodiment, the controller may direct the suspected counterfeit bill to one output receptacle, while genuine bills are transported to another output receptacle. The process then moves to step 280 and the image of the suspect counterfeit is stored in the memory. This may be done for record keeping purposes or for later analysis by bank personnel and/or government officials.

If the serial number of the currency bill does not match any of the serial numbers stored in the database, the document scanning device moves directly to step 245 and other counterfeit tests are run on the bill. These may include UV tests, infrared tests, thread tests, and magnetic tests. The image itself may be tested by comparing the image to an image of a "genuine" bill. The software can look for distorted images (i.e., lines that run together), missing images, (i.e., a car on a ten dollar bill), and other inaccuracies. If the currency bill fails (answer is no to question of whether the currency bill passed all the other tests), the scanning device proceeds to step 250 and continues as stated above. If the currency bill passes all other tests, it proceeds to step 280 and the image is stored in a memory. In some embodiments, step 245 may be done prior to performing step 240. The currency bill is transported to an output receptacle at step 282. After the image is stored in memory, the device then inquires as to whether any more bills need to be scanned (step 290). If the answer is yes, than the process returns to step 210. Once all of the bills have been scanned and stored, the process ends.

In other embodiments, step 280 may be done before the serial number is extracted at step 220. Also contemplated is an embodiment in which the images of suspect counterfeit bills are not stored in the memory. In that embodiment, the process would move directly from step 270 to step 282.

The scanning device and procedure discussed in FIG. 3*a* may also be used with foreign currency. In some cases, the foreign currency bills may have different security techniques, such as holograms on certain bills. For example, Germany uses holograms on high denomination Deutsche-Marks, but not on many low denominations. If the image scanner sees the hologram (OVD) on a lower note, the note is determined to be counterfeit. Also, the nature of thread may be different depending on the amount of the bill. Oftentimes, the higher the bill, the more sophisticated the security techniques utilized in the thread. Some countries, for example, use plastic sandwiched between paper and there may be a hole with an image on the plastic. The scanning device of the present invention may be modified to read that image and determine its authenticity.

Figure 3B:
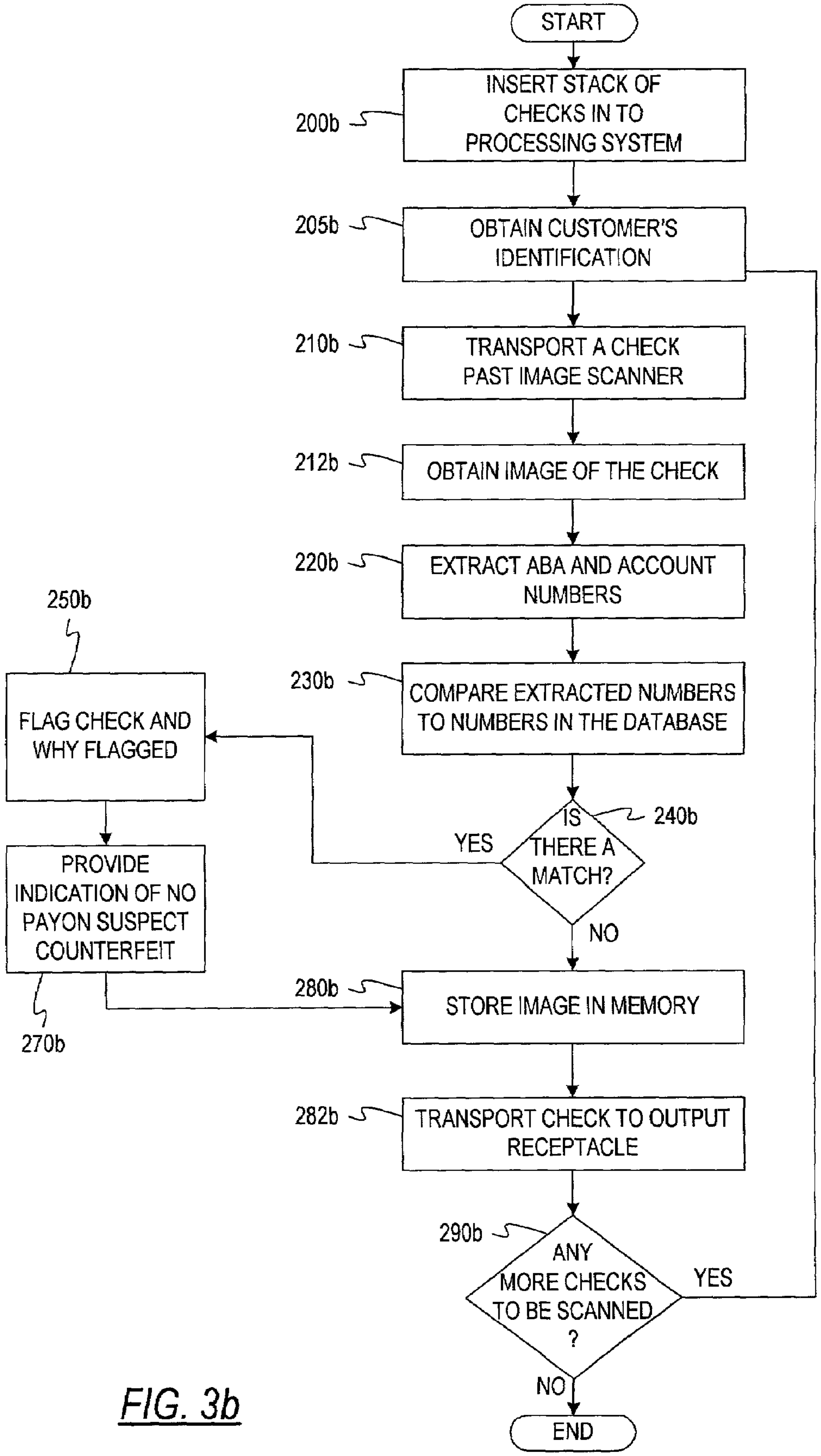
FIG. 3*b* is a flowchart describing the operation of a document scanning device according to another embodiment of the present invention.

Turning now to FIG. 3*b*, an alternative operation of the scanning device will be described. In this embodiment, the scanning device receives checks instead of currency bills. At step 200*b*, a stack of checks is inserted into the input receptacle. In another embodiment, the checks may be inserted one by one into the input receptacle. At step 205, the scanning device obtains a customer identification number. The customer identification number is a way to tie the customer making the deposit to the items in the deposit. The customer identifier may be any type of unique identifier, such as an account number, PIN, merchant number, social security number, driver's license number, credit/debit/smart card number, and bar code or other encoded number. The customer identifier may be encoded based on the customer's name or any other identifying number (such as driver's license number or social security number). The customer identifier may also be a password, an alphanumeric code, a fingerprint, or scan. The customer identifier may also be obtained by a video image of the customer or any other known way to identify a person. The customer identification number may be obtained in any number of ways, including reading the account number off an encoded sheet, such as a bar encoded slip or a MICR encoded deposit slip, having it input into the device by an operator or by a customer (such as inputting a PIN or an actual account number), or reading it from a debit/credit/smart card that is input into the device, to name a few.

The check is then transported via the transport mechanism past an image scanner at step 210*b*. The scanning device obtains an image of the check at step 212*b* and, at step 220*b*, extracts the ABA number, account number, and check number. The extraction may be done using OCR software similar to the procedure described in reference to FIG. 3*a*. Also, the check number, account number, and ABA number may be extracted by a MICR reader. At step 230*b*, a database containing suspect ABA numbers, account numbers, and check numbers will be scanned for matches. In one embodiment, the scanning device will first search for matches in the ABA number, then for matches in account number and, finally, for matches in check number. Alternatively, the scanning device can search for the combination in any order.

The flagged accounts will be transmitted to the database by the banks themselves. It may only be the bank that is receiving the check or other banks may transmit information to the scanners.

At step 240*b*, the scanning device asks if there is a match between the records in the database and the scanned image. If the answer is yes, the check is then flagged at step 250*b*. There could be numerous reasons as to why a check may be flagged. For example, a check could have a stop payment on it. In this example, the specific combination of ABA, account, and check number would be flagged as not to be paid since the customer decided not to pay the item. A check could also be flagged if it is known that someone is forging signatures on this check. The flag could indicate to hold the check until the signature can be verified at the payee bank. In another alternative, the signature from the check could be displayed on a screen for an operator. The operator could also upload the signatures on the account and compare the images. If the signatures are the same, the operator may choose to accept the check and indicate such on the device. Alternatively, the operator may choose not to accept the item and also indicate such. Another alternative would be to give back the check to the customer if there is a hold and the customer does not want to deposit the item. Alternatively, a check may be flagged if it is over a certain dollar amount that either the bank or the customer set for a limit. Other abnormalities may be verified, such as requirements on checks over a certain dollar amount (i.e., checks over $1,000 on a certain account may require two signatures instead of one).

In another embodiment, it may not be the check, but the entire account that has a hold on it. For example, an account could have a hold put on by a government entity or as a result of a judgment against them. An account could have a hold on it because it is new, because it has been overdrawn a number of times or because it is currently overdrawn. These holds would be transmitted by the payee bank to the scanning device, which would update the memory. A bank may choose to not cash checks that are drawn on accounts that have holds on them, but to accept them for deposit, in case the hold is released.

Next, at step 270*b*, the scanning device provides an indication of no pay on suspect image. The image will then be flagged with an indication of the reason(s) for failure, such as a stop payment, fraud suspect, violating a dollar limit, etc. This allows someone to retrieve the image at a later date and know why the check was held or returned. In some embodiments, this step may be omitted from the procedure. The image is then stored in the memory at step 280*b* for later viewing and/or printing. The check is then transported to the output receptacle and the device moves to step 290*b*, asking if there are any more checks to be scanned. If the answer is positive, the procedure returns to step 210*b*. If not, the procedure ends.

If the check does not have a hold on it, the process moves directly to step 280*b* and continues as described above.

Figure 3C:
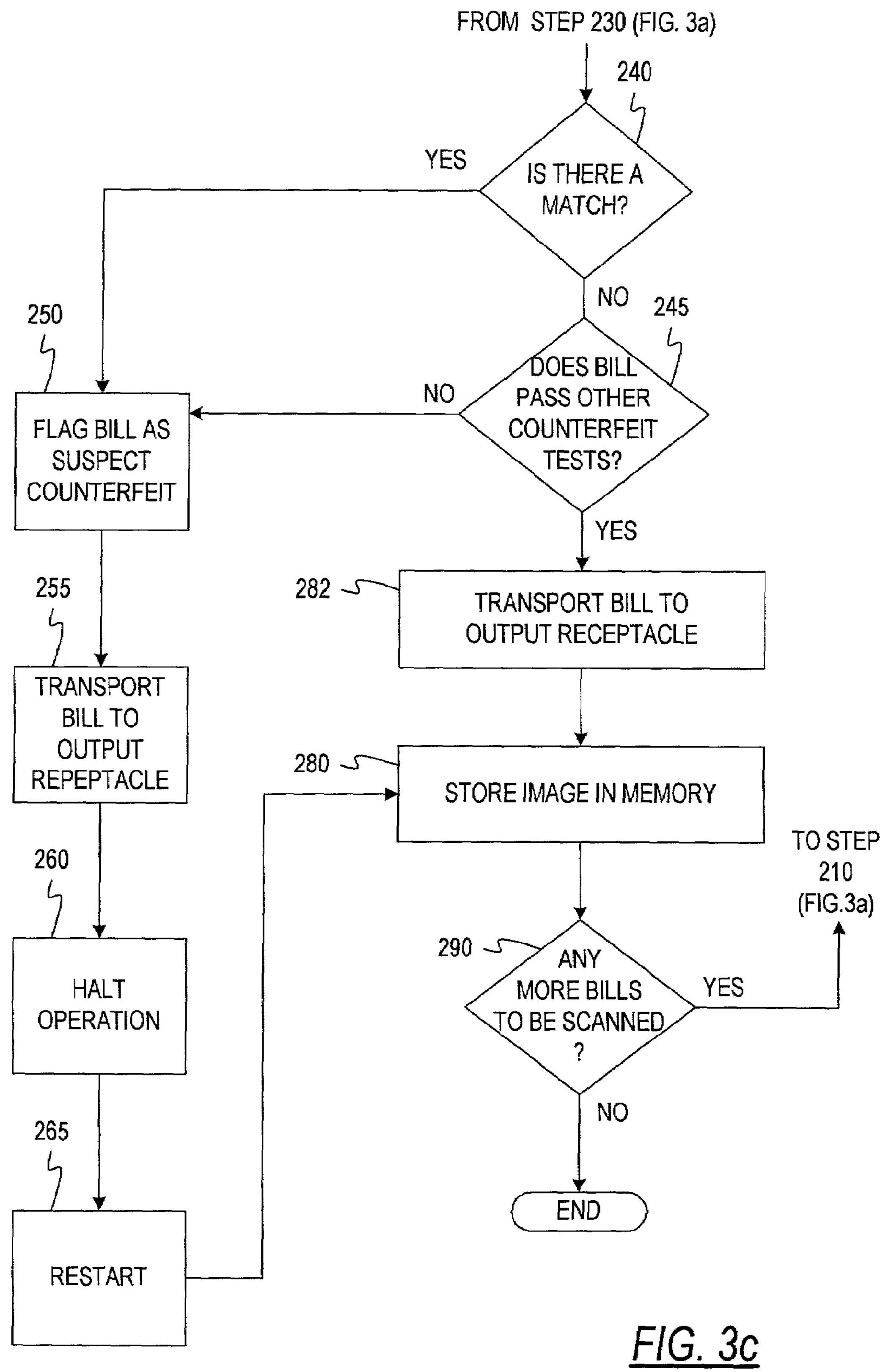
FIG. 3*c* is flowchart describing the operation of a document processing system according to an alternative embodiment of the present invention.

In another embodiment, illustrated in FIG. 3*c*, after a suspect counterfeit bill is flagged at step 250, the controller then transports the suspect counterfeit bill to an output receptacle at step 255. Then, the controller halts the transport mechanism of the document scanning device (step 260) so that the suspect counterfeit is presented in the output receptacle. Then, the operator may inspect the bill and/or remove the bill to separate the suspect counterfeit bills from the authenticated currency bills. Once the operator has examined the bill, the operator may then choose to accept or reject the bill at step 262. The operator may choose to accept the bill by pressing an accept button or by indicating the value of the bill in the scanning device. The operator may choose to reject the bill by merely pressing a continue button or by pressing “reject” on the scanning device. At step 265, the operator restarts the operation once the flagged bill has been inspected and/or removed from the document processing system and the system continues at step 280.

Figure 3D:
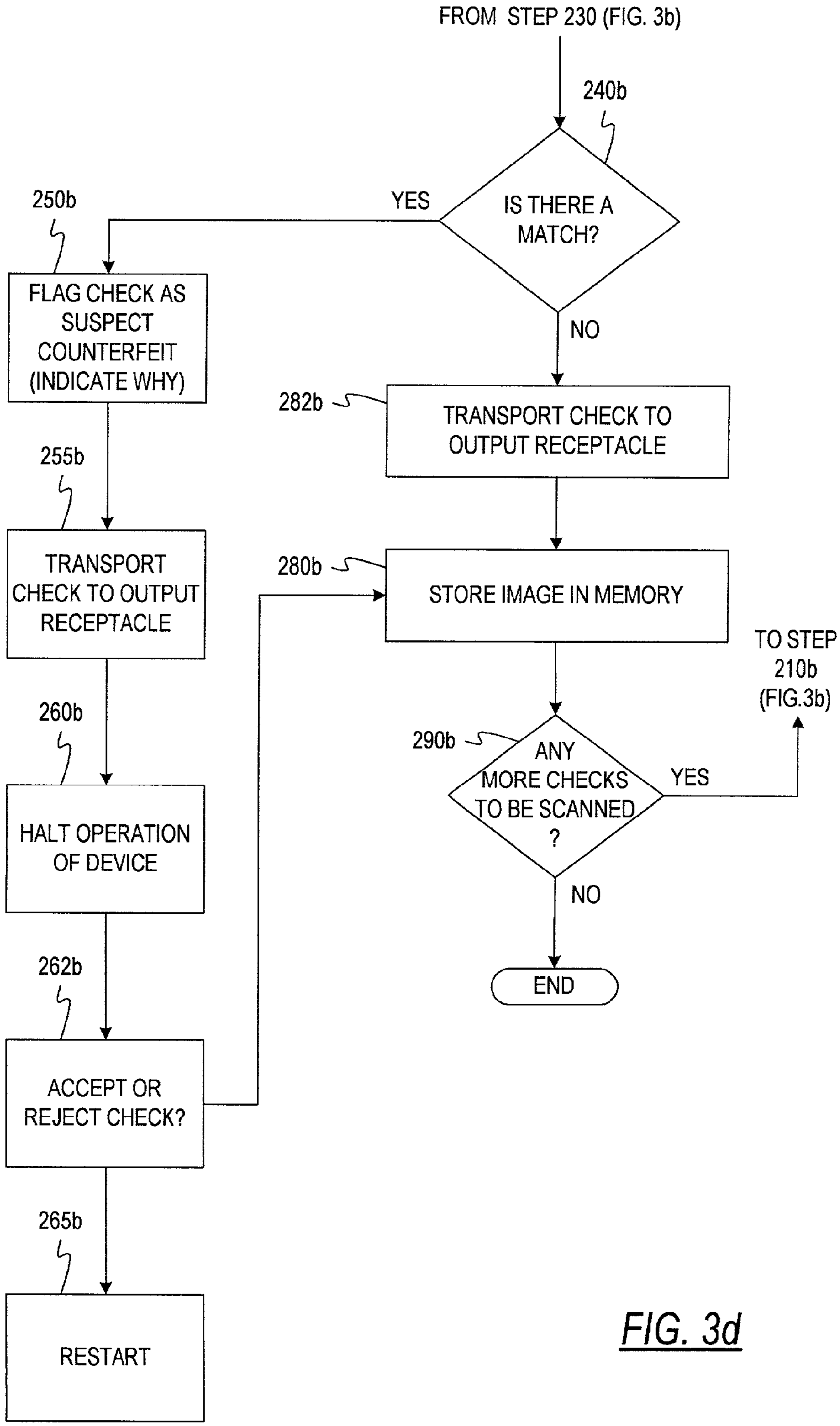
FIG. 3*d* is a flowchart describing the operation of a document scanning device according to another embodiment of the present invention.

Turning now to FIG. 3*d*, a modified flow chart is illustrated depicting how the scanning device performs the above process in relation to checks. This flow chart proceeds from step 230*b* of FIG. 3*b* to step 240*b* where it is asked if the ABA, account, and check numbers on the scanned check match any of those stored in the database. At step 250*b*, a suspect image is flagged. At this step, an indication as to why the check is flagged may be provided to the operator on a screen, along with an image of the check. In some embodiments, the check may then be transported directly to an output receptacle at step 255*b*. In other embodiments, the process may skip directly to step 260*b*. At step 260*b*, the operation of the machine is halted, allowing the operator to view the image on the screen or remove the actual check for verification. The operator may then, at step 262*b*, choose whether to accept or reject the check. Should the operator choose to accept the check, the value of the check may need to be indicated. In some embodiments, the value would have been previously determined. In these cases, the operator only needs to press an accept button and the device adds the value of the check to the totals. Next, at step 270*b*, the scanning device is restarted after the operator makes a decision regarding the check. The operator may simply press a restart button or move to accept or reject the check.

The image is then stored at step 280*b*. This may be done before, after, and/or while the scanning device is halted. Next, the process moves to step 290*b* where it is asked whether there are any more checks to be scanned. If the answer is yes, the scanning device moves to step 210*b* and continues the process. If the answer is no, the process ends.

Figure 3E:
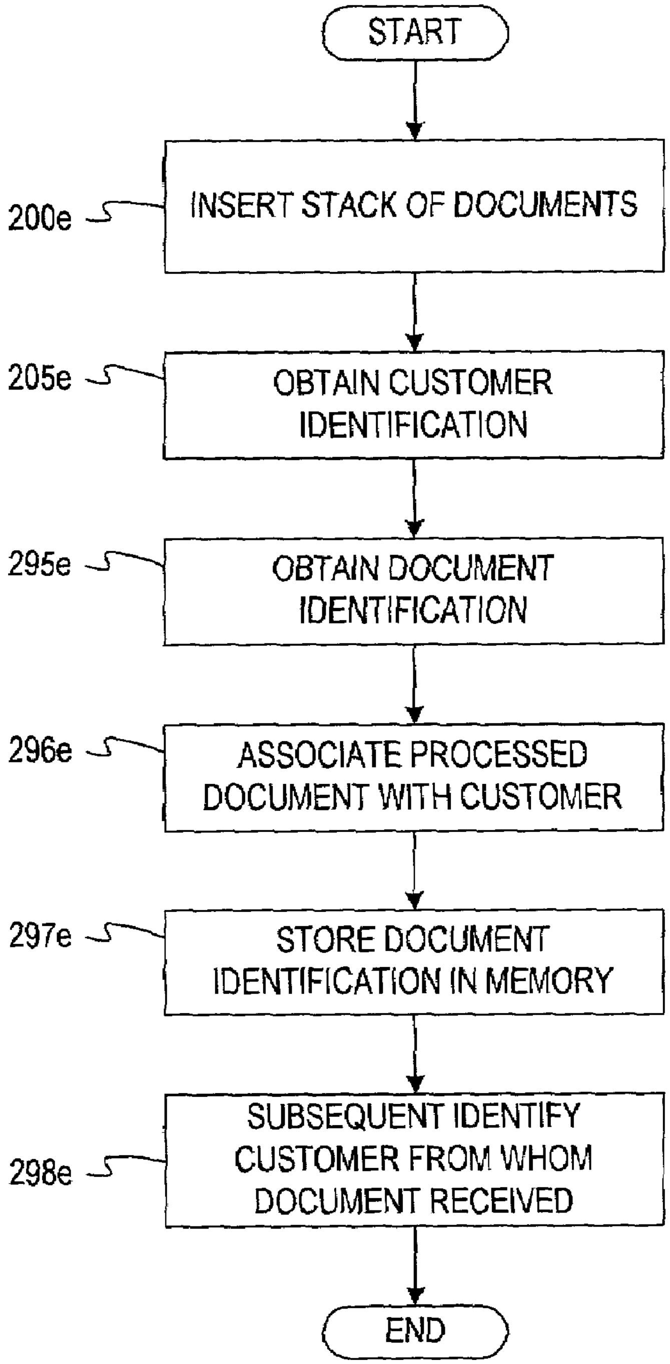
FIG. 3*e* is a flowchart describing the operation of a document scanning device according to another embodiment of the present invention.

Turning now to FIG. 3*e*, a flowchart describing another embodiment of the present invention is now described. As in the prior embodiments, a stack of documents, either checks, currency, or other paper documents, is inserted into the input receptacle at step 200*e*. Next, at step 205*e*, the customer identifier is obtained. The customer identifier may be any of the identifiers described above. Next, at step 295*e*, document identification characteristic information is obtained. The document identification characteristic information is any information that may uniquely identify the document that is being presented, such as a serial number in the case of currency bills, account number, check number in the case of checks, bar code, or another encoded or encrypted identifier. The characteristic information may be encoded information or it may not be. The characteristic information may be in the form of numbers, letters, and/or symbols.

The document identification characteristic information may be obtained by obtaining a full image scan of the document or by scanning only a portion of the document. If a full image scan is obtained, the characteristic information may be obtained by using optical character recognition (OCR) software for identifying the characters printed in the character information fields of the documents. For example, if the character information is the serial number, the OCR may search the full image for a serial number and then extract the serial number once the field is located.

The document identification characteristic information is then used to associate the document being input into the device with the customer depositing the documents. This is done by an associating means, such as a first computer (FIG. 4), a controller, or a memory. The associating means may link the document to the customer by tying the characteristic information to the customer identifier. For example, if the characteristic information is obtained via image scanning, the customer identifier could be tagged onto the image. Alternatively, the characteristic information can be stored in a memory in a file dedicated to the customer. This way, someone searching the memory for the item would see that it is stored under a specific customer's identifier. Other methods for linking the customer and the document being deposited are also contemplated.

For retail customers, the customer identifier may identify a particular store, branch number, or other division, such as checker, cashier, or department number. The customer identifier may be a document that is able to be scanned and used as a divider when the retail customer brings in the deposit. For example, a retail store may have five cashiers and may desire to know if a particular cashier is accepting counterfeits. The dividers, or customer identifiers, would be placed between the deposits of the different cashiers. The dividers would be scanned, triggering the device to tag the following images with certain numbers or identifiers. The scanning device would tag all of the following documents with the identifier until the next divider was encountered. This enables retail stores to pinpoint locations (or even times or people) that are accepting counterfeits.

Next, in some embodiments, the method proceeds to step 297*e*, where the document identification characteristic information is stored in a memory. It may be stored as an image file or as a data file. A processor may also be included that is able to utilize the information stored in the memory to determine the customer who tendered the document for deposit. This may be done in the manner described above in reference to step 296*e*.

Finally, at step 298*e*, the device is able to subsequently identify the customer from whom the document was received. This may also be done by utilizing a tagged image or by sorting the images by customer and storing the information in that manner. Any other method that may link the customer to the document may also be utilized.

Figure 4A:
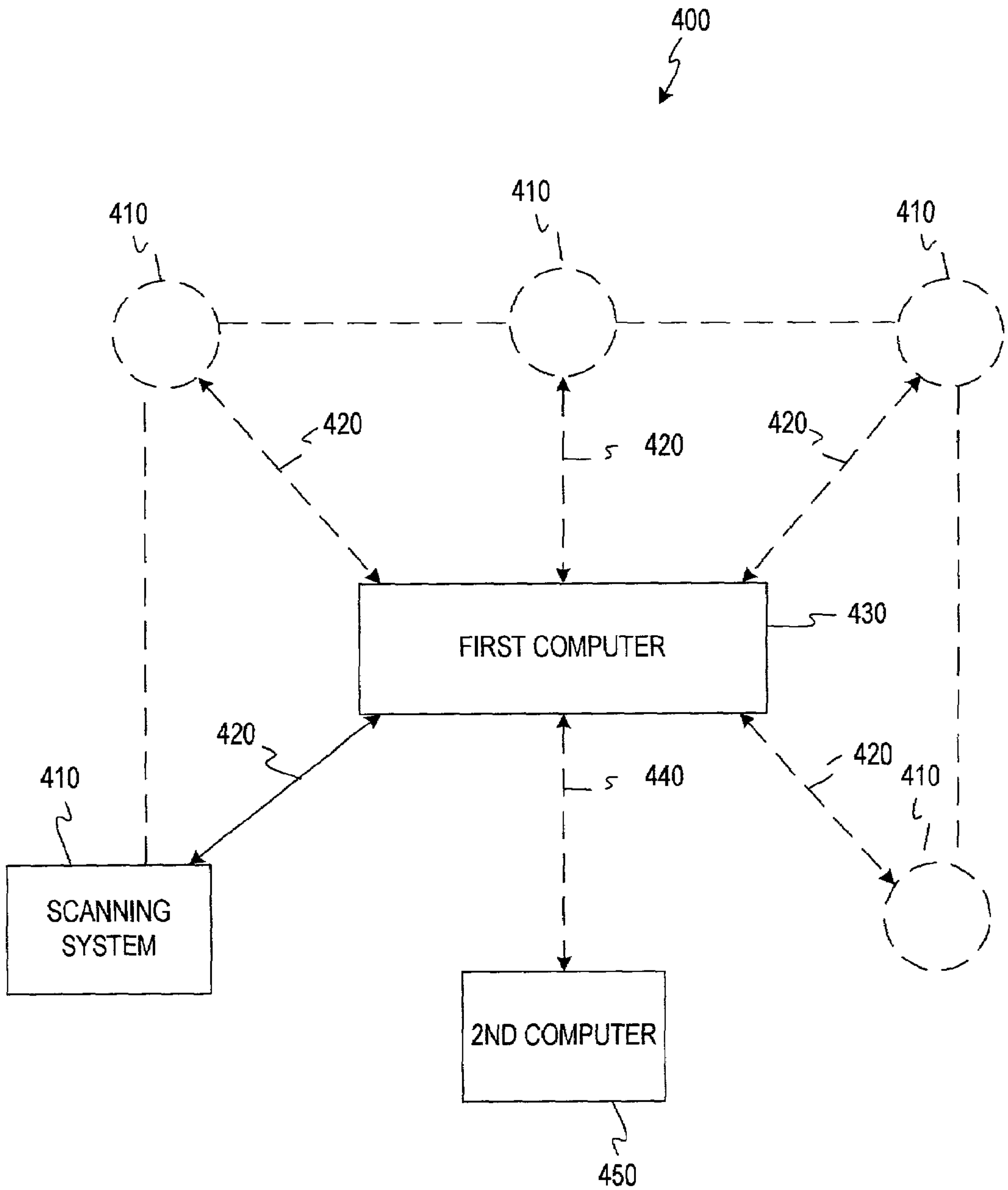
FIG. 4*a* is a block diagram of a document processing system according to one embodiment of the present invention.

FIG. 4*a* is another embodiment of the present invention, and depicts a block diagram of a document processing system 400. The document processing system 400 includes a document scanning device 410, which is capable of receiving currency bills. The document scanning device 410 of FIG. 4*a* may be, for example, the document scanning device 100 of FIGS. 1–3. Likewise, the document scanning device 410 may be a document scanning device 500 described below in connection with FIG. 5.

The document scanning device 410 is connected via a communication link 420 to a first computer 430. The first computer 430 can be any type of computer, such as a personal computer, a server, part of a LAN, or a mainframe. The communication link 420 can be any link used for data, voice, or video communications that is known in the art, such as a telephone line or a wireless network. The communication link 420 may be over a private line or a public line. In some embodiments, the document scanning device 410 may be connected to the first computer 430 via the internet. Alternatively, the communication link 420 may be over another form of media, such as a radio or microwave link. The first computer 430 may be located in the same place as the document scanning device 410 or it may be in a location remote, or separate, from the document scanning device 410. For example, it is contemplated that the document scanning device 410 is located at a branch of the bank, while the first computer 430 is located at the main office or processing center of the bank. In some embodiments, the individual document scanning device 410 may be linked to each other via the communication link 420.

In one embodiment, currency bills or other documents are fed into the document scanning device 410 for deposit into a customer's account. The first computer 430 is a part of the banking system at a financial institution that holds the customer's account. The first computer 430 is adapted to credit the customer's account for the amount of a deposit. Before crediting the account, currency bills are scanned by the document scanning device 410. A full image or an image of a portion of one side of a deposit bill or bills may then be obtained. As illustrated in FIGS. 1–3, the document scanning device 410 may be similar to the document scanning device 100 and, therefore, may be used to check for counterfeit notes.

In another embodiment, the document scanning device 410 merely scans the currency bills and the first computer 430 authenticates the currency bills, as described below. The images may be transferred via the communication link 420 to the first computer 430, which may be located at a bank. The first computer 430 may then use the stored images to process information (e.g., credit the customer's account, update customer's account with the number of counterfeits flagged). The first computer 430 may run the serial number of the currency bills through a database or a memory to check for counterfeit serial numbers. If a match is found, the suspect bill may be rejected and the amount of the suspect bill debited from the customer's account. Alternatively, the bank may not wish to debit the customer's account every time a counterfeit is found, instead only debiting the account for repeat offenders or for bills over a certain dollar amount. The first computer 430 may also create a chart for law enforcement personnel of who attempted to deposit the suspect bills.

In another embodiment, the first computer 430 may store the images of all deposited currency bills to aid in reconciling discrepancies that may arise at a later date. For example, if a deposited currency bill is later found to be counterfeit using any variety of counterfeit detectors, the bank can track that currency bill to the customer that deposited the counterfeit bill. Currently, once a bill is deposited into a financial account (or mixed with any other bills), there is no way for a bank to track the bill. If a bill is later determined to be counterfeit, the bank cannot track the bill to the customer that deposited the counterfeit bill and the bank must, therefore, bear the loss.

According to some embodiments, the system scans and stores the image of all currency bills and/or all documents associated with a transaction. A benefit of such a system is if a customer disputes the amount of a deposit, because of the system, the bank can easily obtain the scanned images of every document deposited to verify whether the amount credited to the customer's account was correct. In these embodiments, it is contemplated that the memory may be located in the scanning device 410, or it may be located in the first computer 430 or at both locations.

In another alternative embodiment, the first computer 430 may be linked via a telephone line or other communication link 440 to a second computer 450, which may be a customer's computer, such as a home computer or a computer located at a retail store or an office. The second computer 450 may also be a computer at another bank or financial institution. The communication link 440 may be over a public line, a private line, or it may be a wireless link. In this embodiment, the images of documents associated with a transaction are forwarded to the customer as a receipt. According to some embodiments, the first and second computers 430, 450 may be linked via the internet. For example, using the internet, a bank may e-mail the information related to a transaction, including, for example, the images of the scanned documents to a customer's computer. In another embodiment, the images are downloaded onto a CD, a disk, a tape, or other storage media by the bank and forwarded to the customer. This may be done at the document scanning device 410 at the time of deposit, or it may be done later at the bank and the CD, disk, tape, or other storage media may be sent to the customer via regular mail. In both of these embodiments, the document scanning device 410 is useful because it provides the customer with a detailed record of the transaction shortly after the transaction occurs. The document scanning device 410 is also beneficial since it stores the serial numbers, which may useful for tracking currency bills as they move through the system. Another benefit of the present invention is the usefulness in locating counterfeit bills throughout a region. The various financial institutions in a given region, for example San Francisco or the United States, may all use the same database having the counterfeit serial numbers and/or other counterfeit bill identifications, such as plate numbers and city codes. This way, the financial institutions within the region benefit whenever one financial institution discovers a new counterfeit.

In an embodiment illustrated in FIG. 4*a*, a plurality of document scanning devices 410 may be connected in a "hub and spokes" network architecture as is known in the art. This is illustrated by a plurality of document scanning devices 410 shown in phantom. All of the document scanning devices 410 are linked via the communication links 420 to the first computer 430. Likewise, other network architectures may be used. In order to prevent congestion, an image buffer (not shown) on each document scanning device may store data until polled by the controller or the first computer.

Figure 4B:
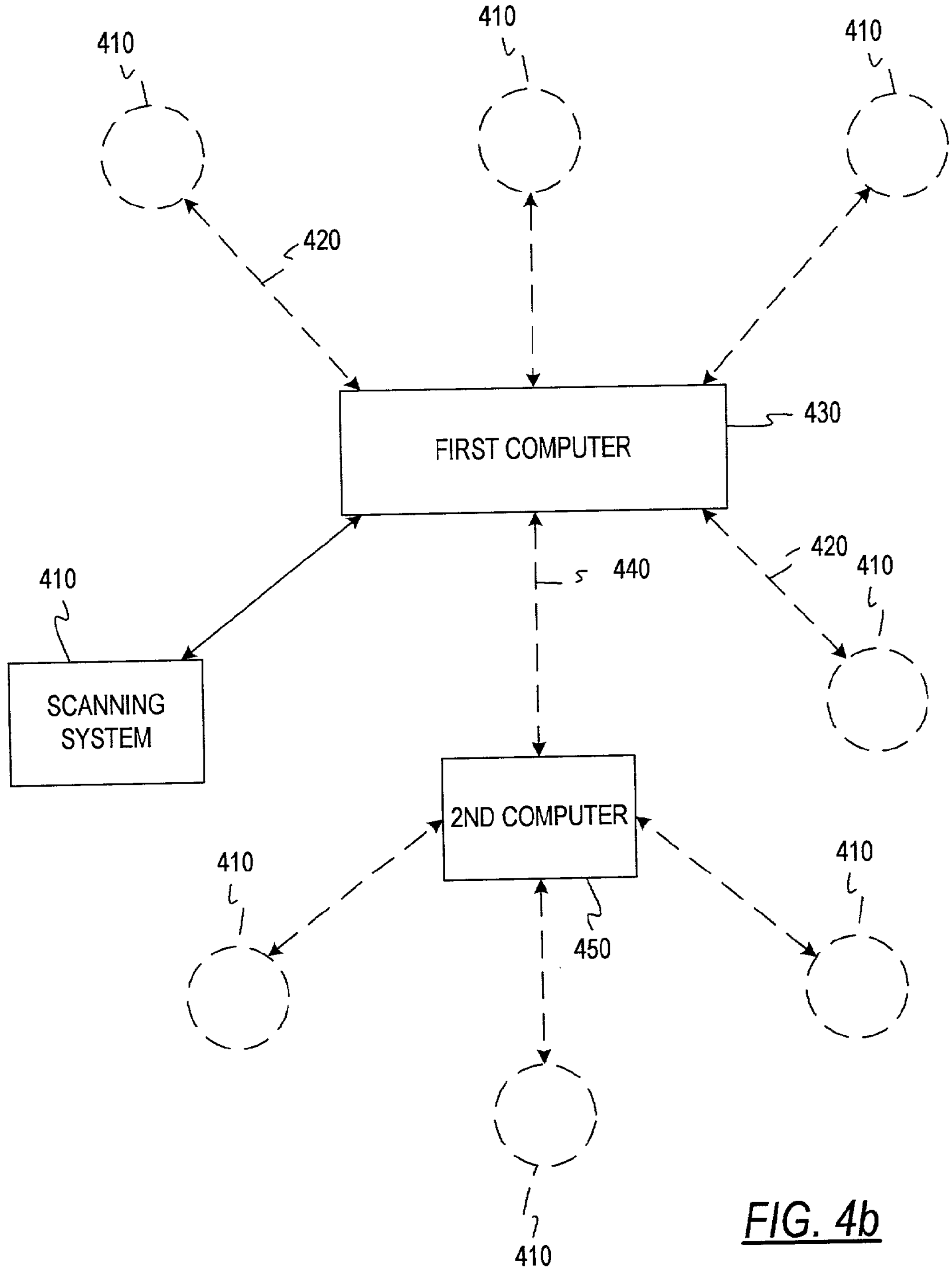
FIG. 4*b* is a block diagram of a document processing system according to an alternative embodiment of the present invention.

Turning now to FIG. 4*b*, an embodiment is illustrated where the second computer 450 is also in communication with a plurality of the document scanning devices 410. In this embodiment, the first and second computers 430, 450, respectively, are also in communication and can share information with each other. In this embodiment, the second computer 450 may be at another bank and may be connected via the communication links 420 to the separate document scanning devices 410. In this embodiment, the second computer 450 would transmit information, such as updated serial numbers, to the document scanning devices 410 and to the first computer 430. The first computer 430 would then transmit the information to the document scanning devices 410 in its network. Alternatively, the second computer 450 could communicate directly with all of the scanning devices and do the updating. Even if the second computer 450 is not a bank computer or server, it may still have access to the scanning devices. Some banks may allow their customers to have access to the memory in the document scanning devices 410 to view images that were deposited to or drawn on the customer's account at the bank.

Figure 4C:
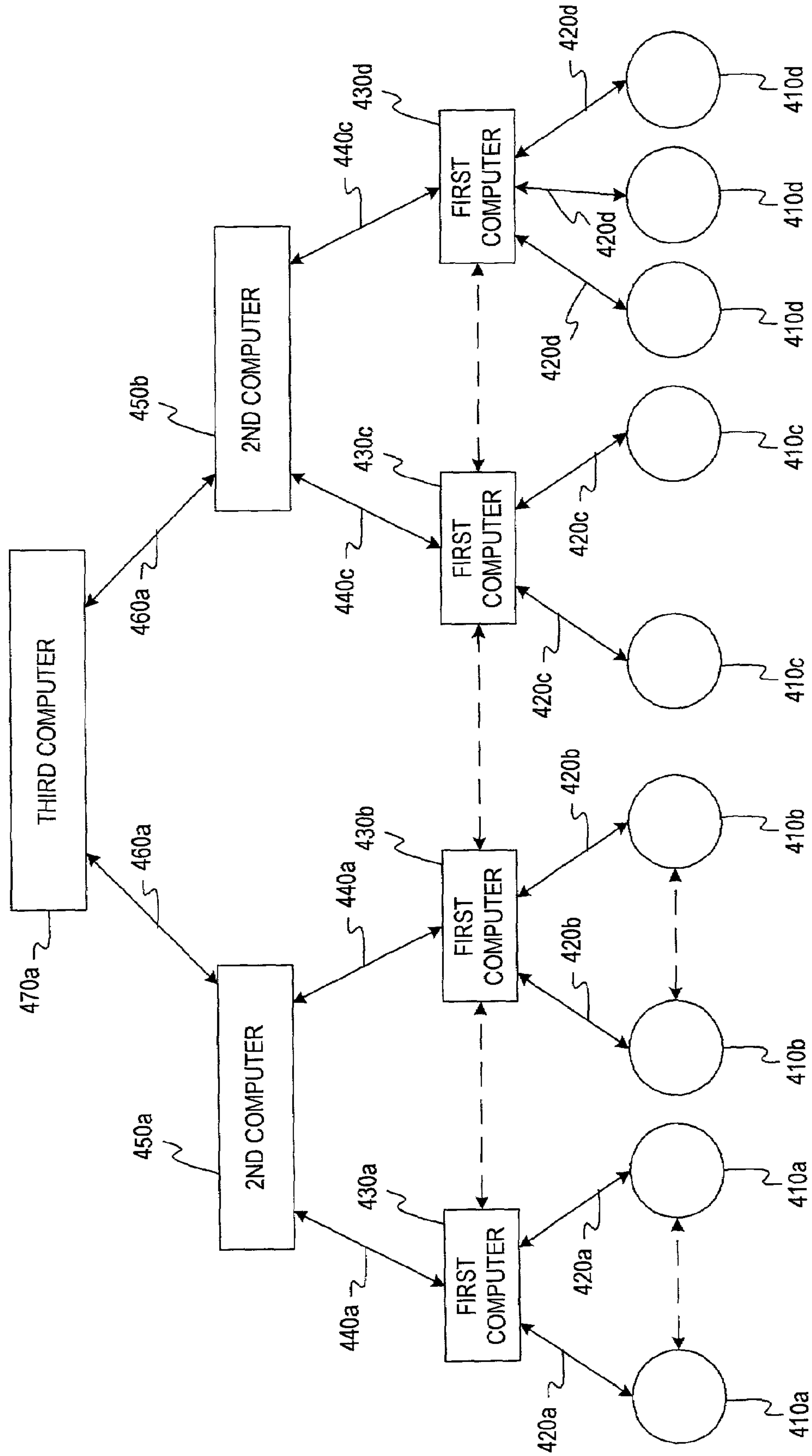
FIG. 4*c* is a block diagram of a document processing system according to another embodiment of the present invention.

Another embodiment is a pyramid structure, depicted in FIG. 4*c*. In this embodiment, document scanning devices 410*a* are connected via communication links 420*a* to a first computer 430*a*. Another set of document scanning devices 410*b* are connected via communication links 420*b* to another first computer 430*b*. The two first computers 430*a*, 430*b* are then each linked via the communication links 440*a* to a second computer 450*a* which is then in direct communication, via another communication link 460*a*, with a third computer 470*a*. Other document scanning devices 410*c*, 410*d*, first computers 430*c*, 430*d*, and second computer 450*b* are arranged in a similar fashion. As in the other embodiments, all of the scanning devices 410*a*, 410*b*, 410*c*, 410*d* may be linked together, or only the scanning devices sharing a same first computer may be linked. Similarly, the first computers may be linked together as may the second computers.

Figure 5:
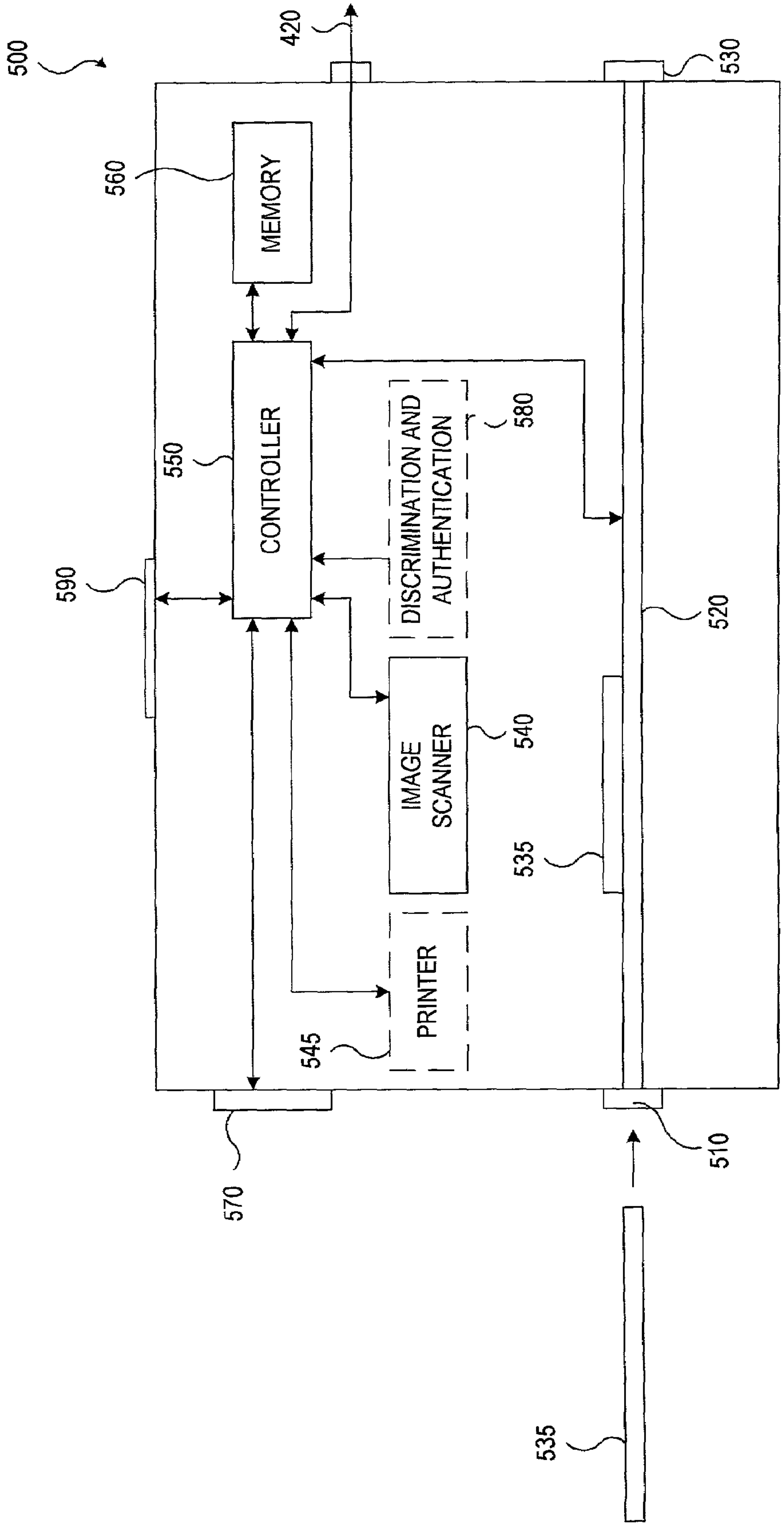
FIG. 5 is a functional block diagram of a document scanning device according to one embodiment of the present invention.

Referring now to FIG. 5, a block diagram of one embodiment of the document scanning device 500, such as the document scanning device 410 of FIG. 4*a* is now described. As discussed earlier, the document scanning device 410 may also operate similar to the document scanning device 100 of FIGS. 1–3. In this embodiment, a currency bill 535 is placed into a document scanning device 500 through an input receptacle 510, which may be a document receiving opening or receptacle of the document scanning device 500. A transport mechanism 520 moves the currency bill 535 past an image scanner 540 and possibly past a discrimination and authentication device 580 (if one is present) to an output receptacle 530.

The image scanner 540 and the transport mechanism 520 are electronically coupled to a controller 550. The controller 550 controls the image scanner 540, creates image files, and controls the transport mechanism 520. Once directed by the controller 550, the transport mechanism 520 transports the currency bill 535 from the input receptacle 510 past the image scanner 540.

Figure 6:
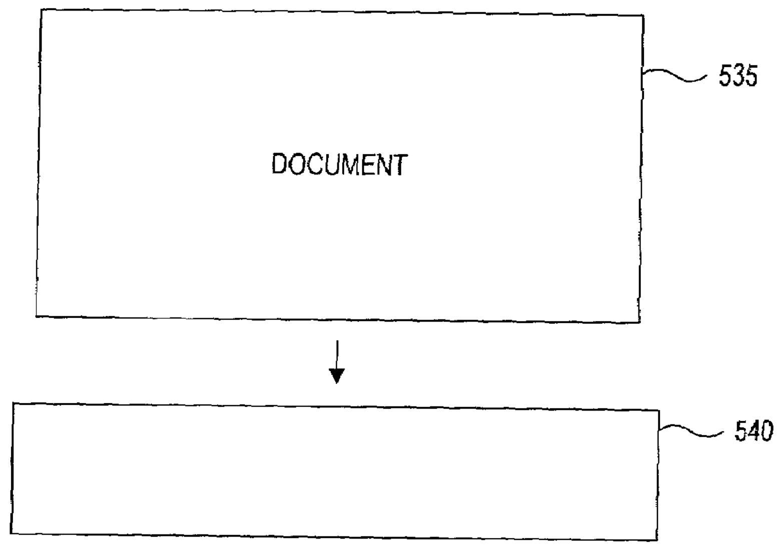
FIG. 6 is a top view of a document being transported past an image scanner so as to permit scanning along the wide dimension of the document.
Figure 7:
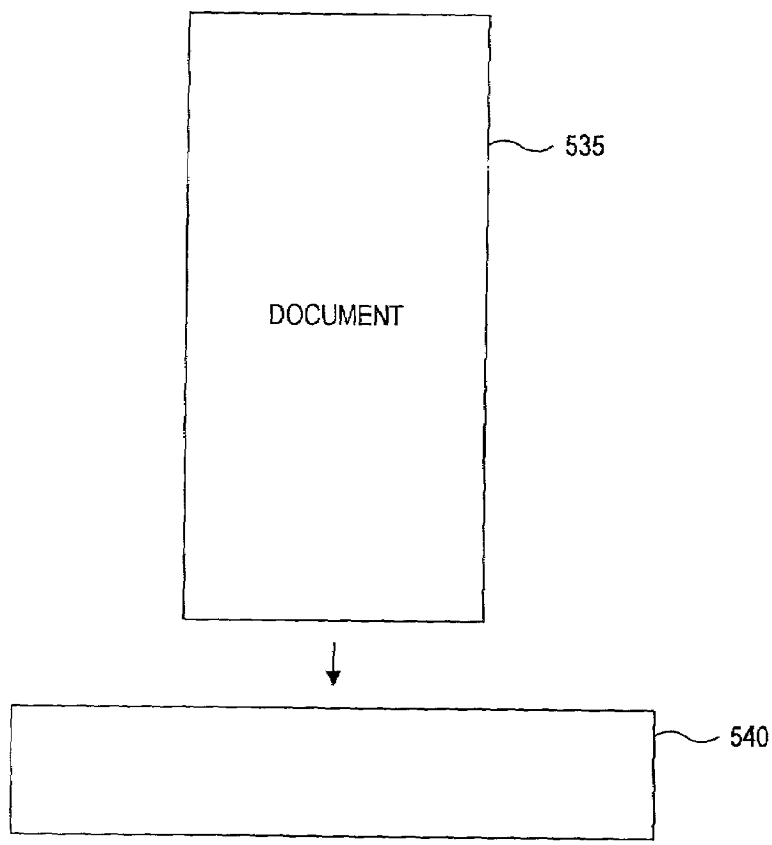
FIG. 7 is a side view of a document being transported past an image scanner so as to permit scanning along the narrow dimension of the document.

Referring now also to FIGS. 6 and 7, the transport mechanism 520 transports the currency bill 535 in a direction that is perpendicular to a longer edge of the currency bill 535, as shown in FIG. 6. Stated differently, a long edge of the currency bill is the leading edge. In other embodiments, the transport mechanism 520 transports the currency bill 535 in a direction that is parallel to a longer edge of the currency bill 535, as shown in FIG. 7. Stated another way, a short edge of the currency bill is the leading edge. In either embodiment, once the transport mechanism 520 moves the currency bill 535 past the image scanner 540, the controller 550 instructs the image scanner 540 to scan the currency bill 535, thereby obtaining an image. The image may be of one or both sides of the currency bill. The image scanner 540 may operate the same as the image scanner discussed in reference to FIGS. 1–3.

Next, the transport mechanism 520 may transport the currency bill 535 past the discrimination and authentication unit 580. The discrimination and authentication unit 580 may be of the type described in U.S. Pat. No. 5,815,592, which is incorporated herein by reference in its entirety. The discrimination and authentication unit 580 authenticates the currency bill 535 and may determine the denomination of the bill. Also, in some embodiments, if the discrimination and authentication unit 580 determines that a currency bill is suspect, the discrimination and authentication unit 580 may transmit the serial number of the suspect bill to a memory 560 so the new serial number is added to the list. With other documents, such as checks, the discrimination and authentication unit 580 may capture information such as the check amount, account number, bank number, or check number. Alternatively, this information may be captured by the image scanner 540.

There are multiple reasons why the discrimination and authentication unit 580 may be included even though the controller 550 and/or the first computer 430 may be authenticating the bills by their serial numbers. First, if the first computer 430 is checking the serial numbers, this may not be done until a later time. Using the discrimination and authentication unit 580 may catch some counterfeit bills before the images are sent to the first computer 430. Second, it is a good double check to ensure the accuracy of the serial number method. Even if a bill passes the serial number test, it may still be a counterfeit. Accordingly, the discrimination and authentication unit 580 may perform alternative authentication tests, such as magnetic, ultraviolet, fluorescent tests, etc., as are described in U.S. Pat. Nos. 5,640,463, 5,790,697, and 5,815,592, which are incorporated herein by reference in their entireties.

In another embodiment, the discrimination and authentication unit 580 may not be included. In such embodiments, the currency bill 535 is transported past the image scanner 540 and to the output receptacle 530.

In another embodiment of the document scanning device 500, a printer 545 may be included in the document scanning device 500. The printer 545 may perform a variety of functions. The printer 545 may be used to print a receipt reflecting the deposit amount for the customer. In other embodiments, the printer 545 may be used to print a copy of the scanned images for the customer's records. The controller 550 controls the operation of the printer 545.

The controller 550 also controls the operation of the memory 560. The memory 560 may be used to store the image files of the scanned currency bill 535. The memory 560 may also be used to store a list of counterfeit serial numbers, as discussed above. In some embodiments, the memory 560 may be located in the first computer 430 or a database coupled to the first computer 430. During operation, the controller 550 may send instructions to the memory 560 to store certain image files. Also, the controller 550 may send instructions to retrieve existing files from the memory 560.

According to some alternative embodiments, two control panels 570, 590 may be connected to the controller 550. The control panels 570, 590 may be used to display information to a customer and/or operator. For example, if a counterfeit bill is discovered, the control panels 570, 590 may alert the customer or operator to the discovery by flashing an alert button. The control panels 570, 590 may also be adapted to display information to the customer or operator, such as the denomination of the bill that was found to be counterfeit. The control panels 570, 590 may also be used to display deposit information if the document processing system is being used to deposit funds. In some embodiments, the control panels 570, 590 could display the whole image of the check or currency bill for decision making purposes. For example, if a check is being determined as a forgery, the operator may wish to view the image and override the determination. Also, in some embodiments, the control panels 570, 590 may only display portions of the image. If a check is determined to have a forged signature, the operator may wish to view only the signature portion of the check and compare the signature on the image with a signature record. In some embodiments, the control panels 570, 590 may allow the operator to view the image of the signature and the signature record side by side for comparison purposes.

In another embodiment, the control panels 570, 590 are used by the customer or operator to input information into the document scanning device 500. For example, if a counterfeit bill is discovered and the document scanning device 500 halts operation, once the counterfeit bill is removed, the customer or operator may press a button on one of the control panels 570, 590 to restart the document scanning device 500. The control panels 570, 590 may also be used to accept instructions on bills whose images are unreadable by the OCR. For example, an image taken of a currency bill may be of such poor quality because the bill is dirty or worn that the serial number is unreadable. In one embodiment, the control panels 570, 590 are able to accept input indicating the serial number and/or denomination of the bill from the customer or operator regarding the unreadable information. The control panels 570, 590 may be input devices such as a numeric keypad, a standard keyboard, a touch screen, and/or denomination keys to allow the customer or operator to enter information into the document scanning device 500 Likewise, the control panels 570, 590 may be used to enter other information regarding a transaction or document such as a customer account number. Alternatively or additionally, other input devices may be employed, such as a card reader. In such embodiments, the identity of the customer making a deposit and/or the number of the account to which a deposit is to be made may be input to the system via the use of a card reader.

Finally, the controller 550 may be linked to the communication link 420, described in FIG. 4*a*, to communicate and receive information from the first computer 430. The controller 550 may transmit, via the communication link 420, information to and/or from the first computer, such as image files of all the scanned documents, the image files of the counterfeit documents, and/or information relating to the amount of the deposit.

Figure 8:
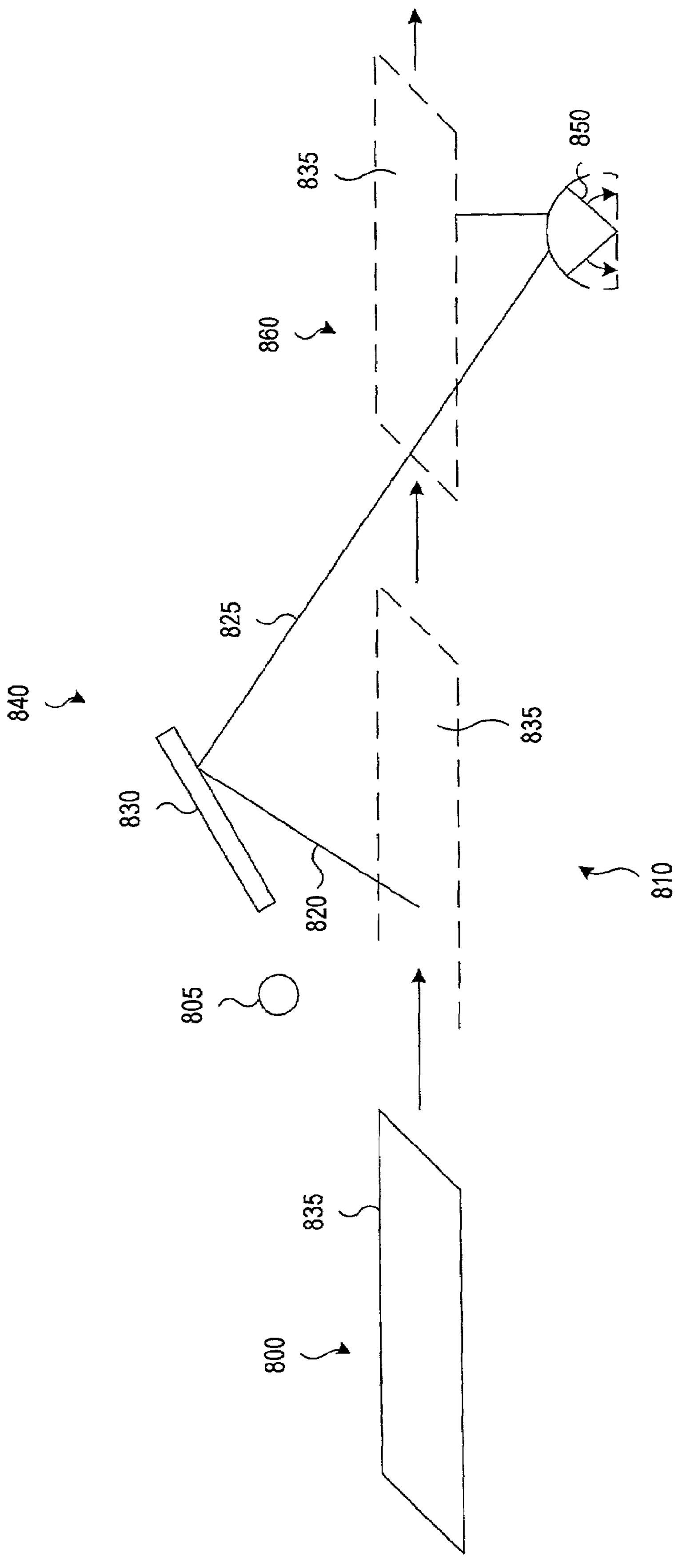
FIG. 8 is a functional block diagram of an image scanner of a document scanning device according to one embodiment of the present invention.

Turning now to FIG. 8, one example of an arrangement of an image scanner 840 for use in the above-described embodiments of the present invention will be described. A currency bill 835 having two sides is inserted into the document scanning device 500 (FIG. 5) at a position 800. In the embodiment of FIG. 8, the image scanner 840 is adapted to scan both sides of the currency bill 835. As will be described, an upper side of the bill 835 is scanned at a position 810, and the second or lower side of the currency bill 835 is scanned at a position 860. Oftentimes, the currency bill 835 may contain valuable information on both sides, thus scanning the image of both sides can be useful. For example, in the case of a U.S. currency bill, the first side may contain a serial number and the second side contains plate information, which may also be useful in determining counterfeits.

After the currency bill 835 is inserted into the document scanning device 500, the currency bill 835 is transported past a scanning arrangement by the transport mechanism 520 (FIG. 5). When the currency bill 835 moves into the position 810, the currency bill 835 is illuminated by a light source 805. The image of one of the first or second sides of the document travels along a first path 820 to a mirror 830. The image is then reflected by the mirror 830 along a second path 825 to a scanhead 850, where the image is stored. The scanhead 850 may be rotatable, as shown, or it may be fixed in position. Thus, one side of the currency bill 835 is imaged using reflection techniques. The currency bill 835 then moves into the position 860 where the image of the other of the first and second sides of the currency bill 835 is scanned by the scanhead 850. Since this embodiment only utilizes one scanhead, it is more cost efficient than other scanning devices which use two or more scanheads.

Figure 9:
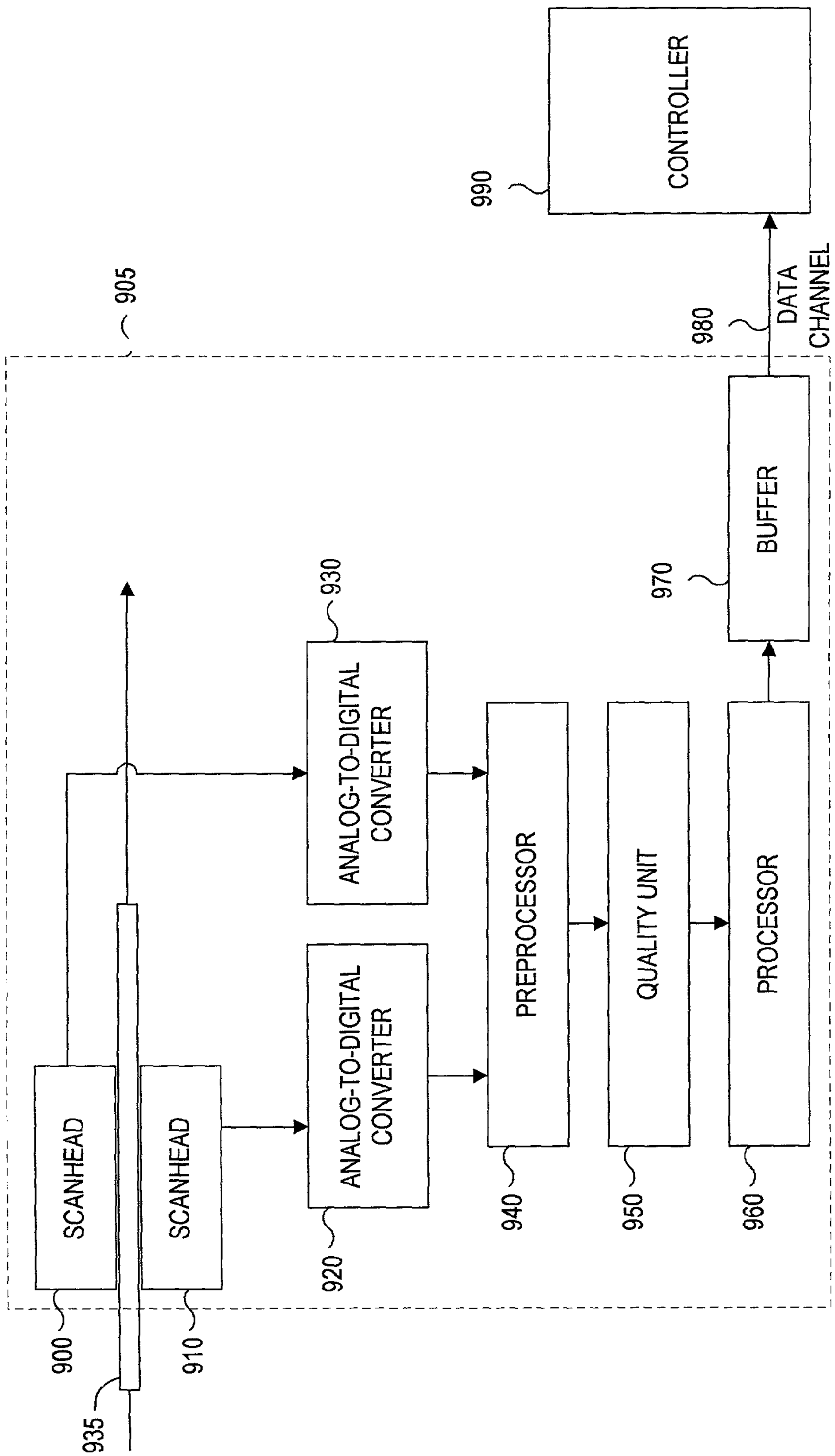
FIG. 9 is a functional block diagram of a document scanning device according to one embodiment of the present invention.

Referring now to FIG. 9, an image scanner 905 according to another embodiment of the present invention is shown.

According to the embodiment of FIG. 9, the front and back surfaces of a currency bill 935 are scanned by scanheads 900, 910 and the images may be processed into video image data by electronic circuitry. The scanheads 900, 910 may be charge coupled scanner arrays and generate a sequence of analog signals representing light and dark images defining the image on the currency bill 935. The scanheads 900, 910 may be arranged for simultaneously scanning both the front and back of the currency bill 935 and are connected respectively to analog-to-digital converters 920, 930 which convert the analog values into discrete binary gray scale values of, for example, 256 gray scale levels. Alternatively, the scanheads 900, 910 may be arranged in an offset or non-overlapping manner. For example, a non-overlapping arrangement may be useful in isolating light detected by each scanhead. The scanheads 900, 910 may be capable of obtaining images of varying resolutions. The particular resolution chosen, which can be varied by the operator, is selected based on the type of document being scanned, as is known in the art.

According to an embodiment, the high resolution gray scale image data from the analog-to-digital converters 920, 930 is directed to an image data preprocessor 940 in which the data may be enhanced and smoothed and which serves to locate the edges of successive documents. Irrelevant data between documents may then be discarded. If the documents are slightly skewed, the image data preprocessor 940 can also perform rotation on the image data to facilitate subsequent processing.

The image data may be monitored for unacceptable image quality by an image quality unit 950. For example, the image quality unit 950 may monitor the distribution of gray scale values in the image data and create a histogram. As is well known in the art, acceptable quality images have a distribution of gray scale values within certain prescribed limits. If the gray scale distribution of the histogram falls outside these limits, this is indicative of poor image quality and an error condition may be generated.

The image data is transmitted from the image quality unit 950 to an image processor 960. The image processor 960 may add items to the image or to the image file. For example, if a document bearing only a signature is scanned, the image processor 960 may add a transaction amount, a payee, and/or other information as needed to the image. In one embodiment, the image processor 960 may add a deposit date and account number to the image file. As is known in the art, OCR software can be used to scan specified fields on the faces of the document. For example, when processing currency bills, the OCR software may locate the serial number or the number printed in each of the corners. If checks are being scanned, the OCR software may locate the ABA number, account number, and check number. The OCR then exports that information in a specified manner. As is known in the art, a straight coordinate system or dimension system is used where known dimensions of the box are used to locate the field.

The image processor 960 may be programmed to locate fields for various types of documents. In scanning currency, the image processor 960 first identifies the type of currency, for example, U.S. bank notes, by scanning specified portions of the currency. Then, based on the outcome of the previous step, certain fields of interest are located, and the information is stored for use by the system. For U.S. currency bills, the fields of interest may include the dollar amount, serial number, issuing Federal Reserve Bank, and signatories. In processing checks, the fields of interest may be the ABA number, account number, check number, amount, signature, and payee. The image processor 960 may also compress the image data, as is known in the art, in preparation for transmission to an outside location and/or storage.

The amount of image data per document may vary depending on the efficiency of the data compression and reduction for that particular document. To insure that no data is lost in the event that the volume of image data temporarily exceeds the transfer capacity of a data channel 980, such as a high-speed data channel, a prechannel buffer 970 is interposed prior to the data channel 980, which is connected to a controller 990. The capacity of the prechannel buffer 970 is continually monitored by the controller 990 so that appropriate action may be taken if the buffer becomes overloaded. The compressed video image data is received by the controller 990 over, for example, the high-speed data channel 980 and is initially routed to temporary storage. The prechannel buffer 970 is preferably of a size capable of storing image data from at least several batches or runs of currency bills, each batch or run containing several currency bills. The number of batches the prechannel buffer 970 can handle is dependent on the size and memory of the buffer. The size of the buffer can be changed to suit the needs of the operator of the scanning device The prechannel buffer 970 may also be a memory storage device that holds the images of the scanned documents until the controller is ready to transmit them. The controller 990 in the document scanning device 410 directs the image data preprocessor 940 to perform the functions of analyzing the data. Alternatively, as discussed above, analysis of the data can occur at an office computer or at a personal computer attached to the system.

Other scanning modules and methods can be used in place of or in addition to the ones described above. These include CCD array systems, multi-cell arrays, contact image sensing, CMOS image sensors, and other well-known scanning techniques. Examples of these techniques and devices are described in U.S. Pat. Nos. 5,023,782, 5,237,158, 5,187,750, and 4,205,780, all of which are incorporated herein by reference in their entireties. The scanning module can also be a color image scanner such as the type described in U.S. Pat. No. 5,335,292, which is incorporated herein by reference in its entirety.

Figure 10A:
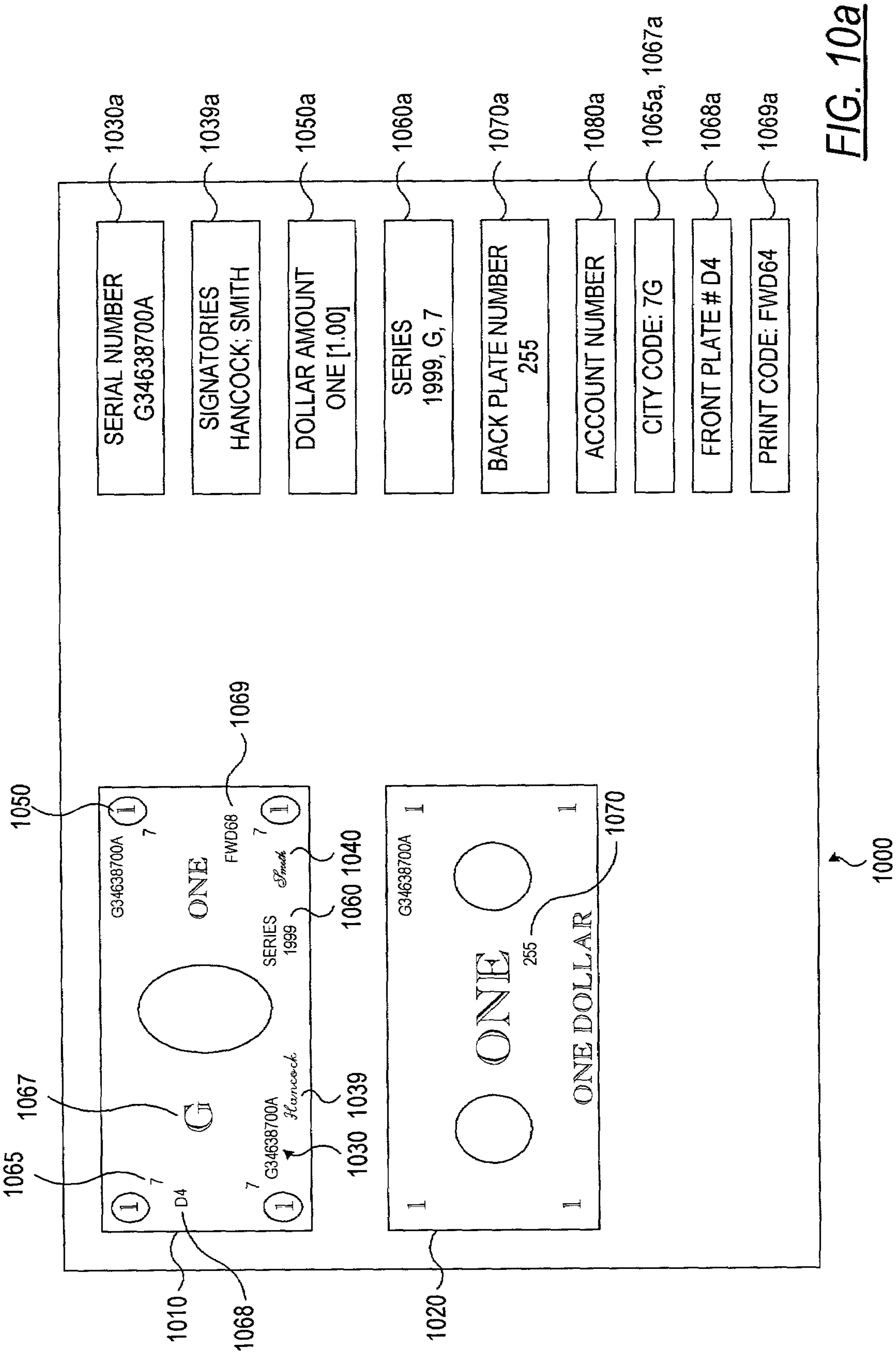
FIG. 10*a* is a representation of an image file of a currency bill according to an embodiment of the present invention.

Referring now to FIG. 10*a*, an image file 1000 according to one embodiment is shown. The image file 1000 comprises several parts. A first image section 1010 represents one side of the document scanned. The image is a collection of data and is represented here pictorially so as to be more easily explained and understood. In the currency bill sample shown in FIG. 10, the first image section 1010 is the front side of the document scanned, namely, a one dollar bill. Similarly, a second image section 1020 comprises data representing the reverse side of the document, in this case, the back side of the currency bill. On both the first and second image sections 1010, 1020 of the currency bill, there is information that may be important to have stored separately in the image file for cross-referencing or tracking purposes. For example, the front side of the one dollar bill includes the serial number and the back side includes a plate number. Both of these may be important to include in the image file and may be cross-referenced for sorting purposes.

As discussed above, for reasons related to bill tracking and counterfeit detection, it may be important to know the serial number of the currency bill. Therefore, a serial number 1030 is extracted from the bill and stored in a data portion 1030*a* of the image file. Once the serial number of a bill is obtained, the serial number can be useful in tracking the distribution of the counterfeit bill. It may also be used to help a government official track the whereabouts of criminals and follow currency bills that are being laundered.

The image file 1000 may also include an account number field 1080*a* that is associated with the currency bill. The account number may be added to the image file by the document scanning system 410 or by the first computer 430 (FIG. 4*a*). The account number field 1080*a* refers to the account into which the currency bill is deposited. This allows someone viewing the image file to know what account obtained credit for the bill. For example, if the bill was deposited and later discovered to be counterfeit, by viewing the image file, the user could see what account was credited and could then take the appropriate action against the account (flag the account or debit the account for the funds).

In some embodiments, it may also be desired to extract signatory information such as a Treasurer's signature 1039 and a signature of the Secretary of Treasury 1040. Likewise, in some embodiments, a dollar amount information 1050, a series information 1060, and the Federal Reserve bank number, a number portion 1065, a letter portion 1067, and a plate number 1070 on the backside of a currency bill 1020, may be extracted. All of these fields may be used for cross-referencing the serial number with the currency bill for purposes of determining counterfeit bills. For example, the serial number of the bill may be related to the series. If these items do not match, then the bill is a counterfeit. Also, in certain series, the Federal Reserve bank number 1065, 1067 may be in different locations. In some series, the letter portion 1067 is in a seal. In other series, the number portion 1065 is right next to the letter portion 1067, with neither being in the seal. The signatory information 1039, 1040, the dollar amount information 1050, the series information 1060, the Federal Reserve Bank number 1065, 1067, a front plate number 1068, a print order code 1069, and the back plate number 1070 may all be extracted and inserted into the appropriate fields 1039*a*, 1040*a*, 1050*a*, 1060*a*, 1065*a*, 1067*a*, 1068*a*, 1069*a*, 1070*a*, respectively, in the image file. The software is able to be updated to handle these changes in any fields that change over time.

Other fields may also be included in alternative embodiments, such as a field relating to the issuing federal reserve bank, the country of origin (if multiple country currencies are accepted), and others. It is also contemplated that foreign currency may have other useful information on the bill such as other security measures which it may be useful to extract from the image of the bill. One example would be the size of the currency bill. In many foreign countries, the size of the currency bill varies with denomination. As a preliminary measure, the size of the currency bill may be measured to ensure that the bill is the appropriate size.

In other embodiments, the locations of certain items may be different. For example, in the new U.S. series, the picture may be larger or off-center. Also, some of the extracted information may be located in a different position.

Figure 10B:
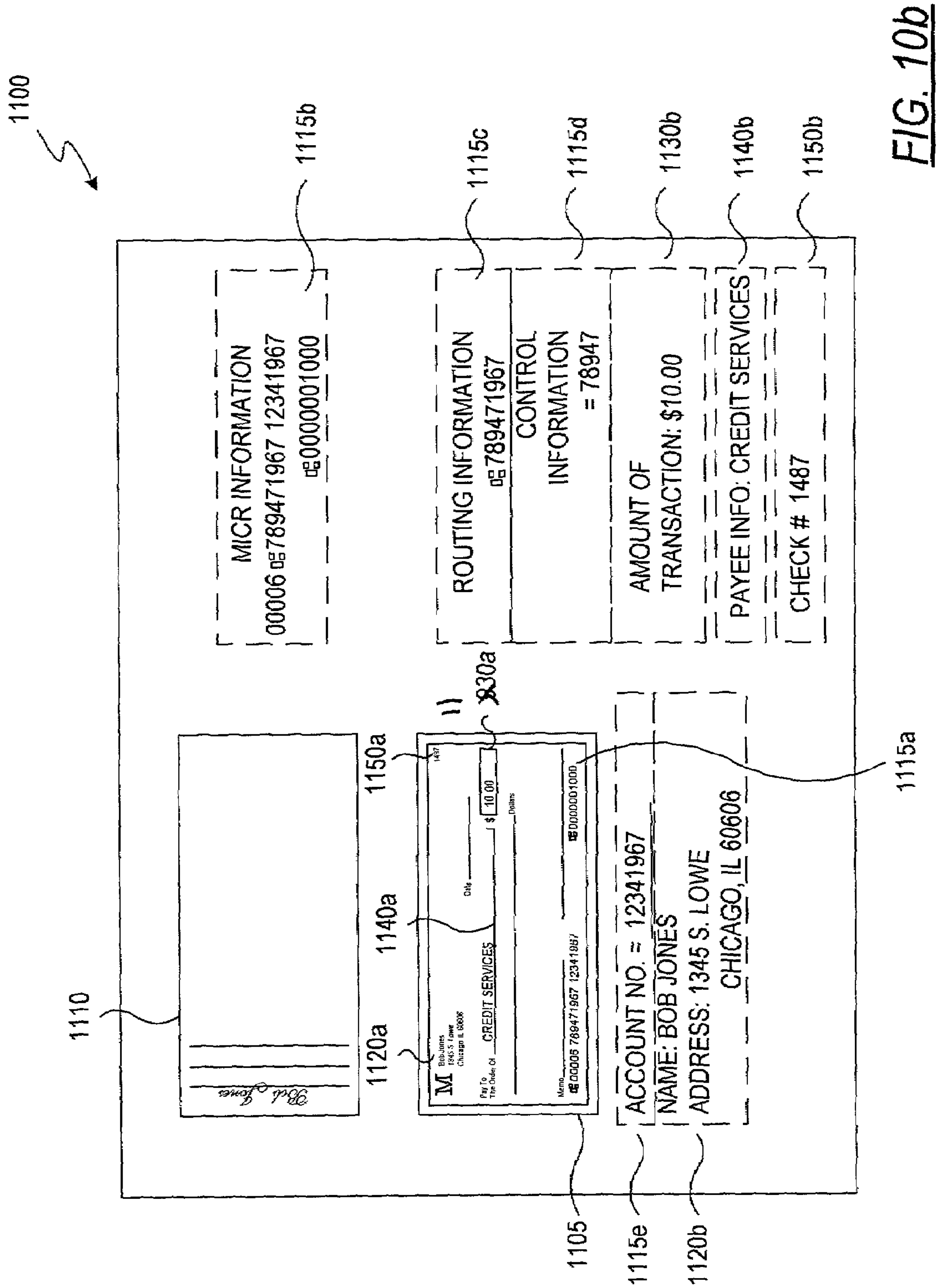
FIG. 10*b* is a representation of an image file of a check according to an embodiment of the present invention.

Turning now to FIG. 10*b*, an image of a check is depicted. A first image section 1105 represents one side of a scanned check. The image is a collection of encoded data and is represented here pictorially so as to be readily understandable to those skilled in the art. In the check sample shown in FIG. 10*b*, both sides of the check have been scanned. In other embodiments, it may be desired to scan only one side. In the embodiment illustrated, the first image section 1105 is the front side of the scanned check. Similarly, a second image section 1110 comprises data representing the reverse side of the document, in this case, the back side of the check. An area 1115*a* is the MICR data scanned and is extracted from the full image scan and inserted into a MICR field 1115*b*. The MICR information on the check includes the ABA number, payor's checking account number, check number, and may include the dollar amount of the check.

Areas 1115*c*, 1115*d* represent, respectively, the ABA number and control information. The ABA number and control information is needed so that the image file can be transmitted among financial institutions. The ABA number is a number that corresponds to the bank that issued the check. In other words, the bank to which the image file belongs can easily be recognized by an operator. The areas 1115*c*, 1115*d* may be extracted from the area 1115*a* or from the MICR encoding on the check. The numbers illustrated are used as examples and are not meant to represent the exact digits or number of digits used.

Also taken from the MICR encoding line on the check is a field 1115*e*, which contains the account number for the check extracted from the image of the check. The account number allows an operator to know which account was debited for the funds.

To further aid the operator in recognizing the account, an identification field 1120*b* may be included in the image file and may contain data indicating the name and address of the owner of the account. This information is taken from the identification field 1120*a* on the image file. Normally, this information is on the upper left side of the check and usually includes at least the name of the owner of the account, and may include address and telephone information.

On the written portion of the check, an amount of transaction is indicated in an amount box 1130*a*. This information may be read from the image and inserted into an amount field 1130*b*. Other written information, such as a payee name 1140*a*, may also be extracted from the full image and added into a field 1140*b*. A check number 1150*a* may be extracted and added into a field 1150*b* to provide a clearer indication of the check number. It should be recognized that the fields illustrated are not inclusive of all possible fields and types of information which can be stored in an image file 1100. Indeed, other types of information can be stored as can pointers to other files having, for example, further information relating to the customer. In some cases, it may also be useful to read the memo line of the check. In addition, it is contemplated that an operator may fill in some of these fields. For example, in an embodiment of the present invention that only requires the customer to sign the document, the payee field and amount field may be added to the image before it is processed. The format of the file is standardized for ease of processing, i.e., using .tif, .bmp, .pdf, .gif, or .jpg. This allows other software to process the information in image files for use by the merchant or financial institution.

Figure 11:
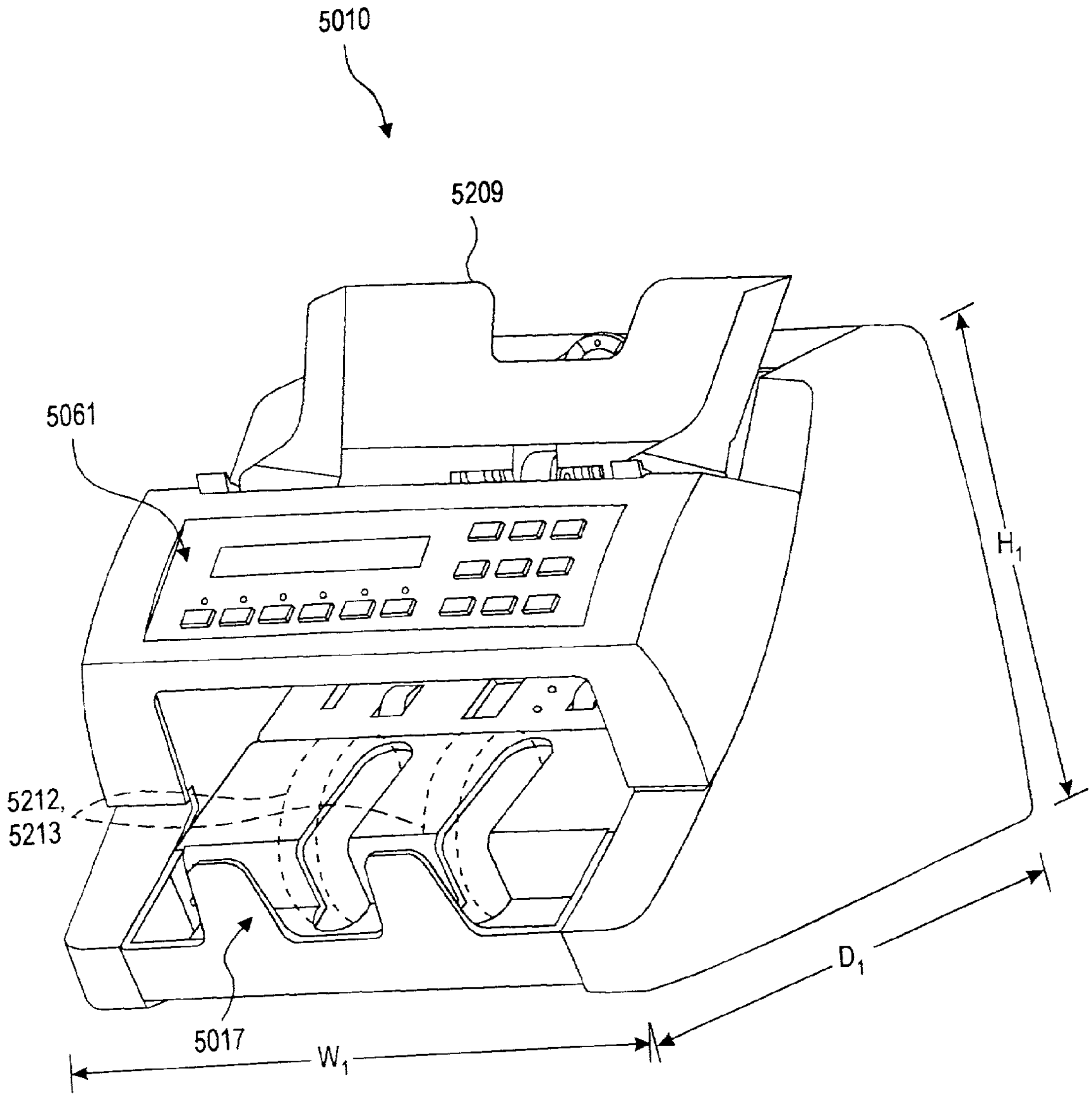
FIG. 11 is a perspective view of a compact document scanning device embodying the present invention.
Figure 12:
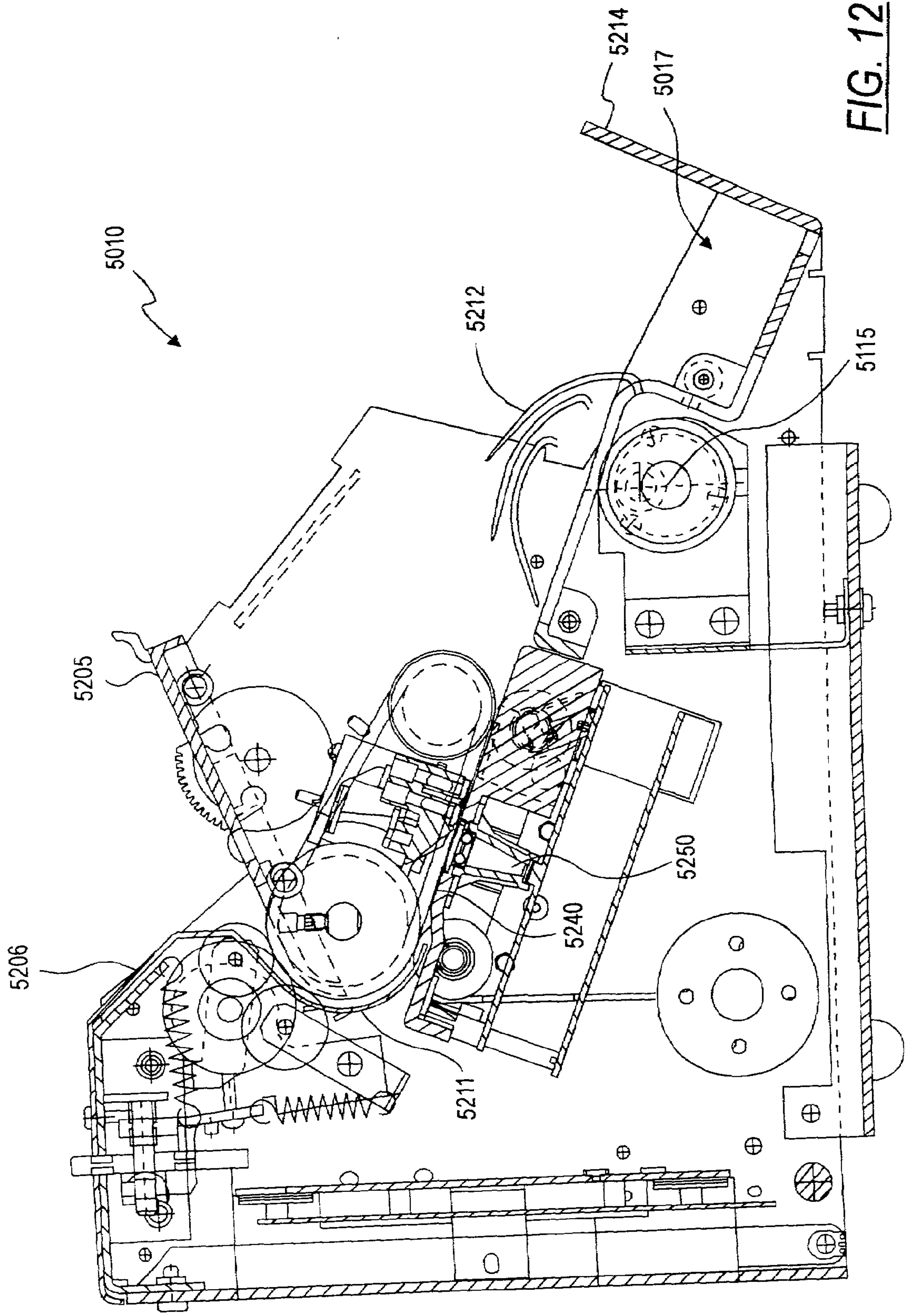
FIG. 12 is a side cross-sectional view of the device shown in FIG. 11.

FIGS. 11 and 12 depict a compact document scanning device 5010 according to one embodiment of the present invention. The compact document scanning device 5010 illustrated in FIGS. 11 and 12 is described and illustrated in more detail in U.S. Pat. No. 5,687,963, which is incorporated herein by reference in its entirety. The device of this patent is modified to include an image scanner as described in FIGS. 8 and 9. Documents are fed one by one from a stack of documents placed in an input receptacle 5309 onto a transport mechanism. The transport mechanism includes a transport plate or guide plate 5240 for guiding a document to an output receptacle 5017. Before reaching the output receptacle 5017, the document can be, for example, evaluated, analyzed, counted, and/or otherwise processed by a full image scanning module 5250. In one embodiment of the compact document scanning device 5010, documents are transported, scanned, and identified at a rate of between about 300 to about 400 documents per minute. In one embodiment of the compact document scanning device 5010, documents are transported, scanned, and identified at a rate in excess of 600 documents per minute. In another embodiment, documents such as checks or currency bills are transported, scanned, and identified at a rate in excess of 800 bills or documents per minute. In yet another embodiment, documents such as checks or currency bills are transported, scanned, and identified at a rate in excess of 1000 bills or documents per minute. In another embodiment, documents are transported, scanned, and identified at a rate in excess of 1200 bills per minute. A scanning device of another embodiment transports documents at a rate in excess of 1500 bills per minute.

The compact document scanning device 5010 in FIG. 11 has a touch panel display 5061 in one embodiment of the present invention which displays "functional" keys when appropriate. The touch panel display 5061 simplifies the operation of the compact document processing system 5010. Alternatively or additionally, physical keys or buttons may be employed. For example, a ten key keypad may be utilized.

A pair of driven stacking wheels 5212, 5213 are located in the output receptacle 5017 and come into contact with the documents as the documents are transported into the output receptacle 5017. The stacking wheels 5212, 5213 are supported for rotational movement about respective shafts 5115 journalled on a rigid frame and driven by a motor (not shown). Flexible blades of the driven stacking wheels 5212, 5213 deliver the documents onto a forward end of a stacker plate 5214.

According to one embodiment, the compact document scanning device 5010 is compact, having a height ($H_1$) of about 9½ to 12½ inches, a width ($W_1$) of about 11 to 15 inches, and a depth ($D_1$) of about 12 to 16 inches.

Figure 13:
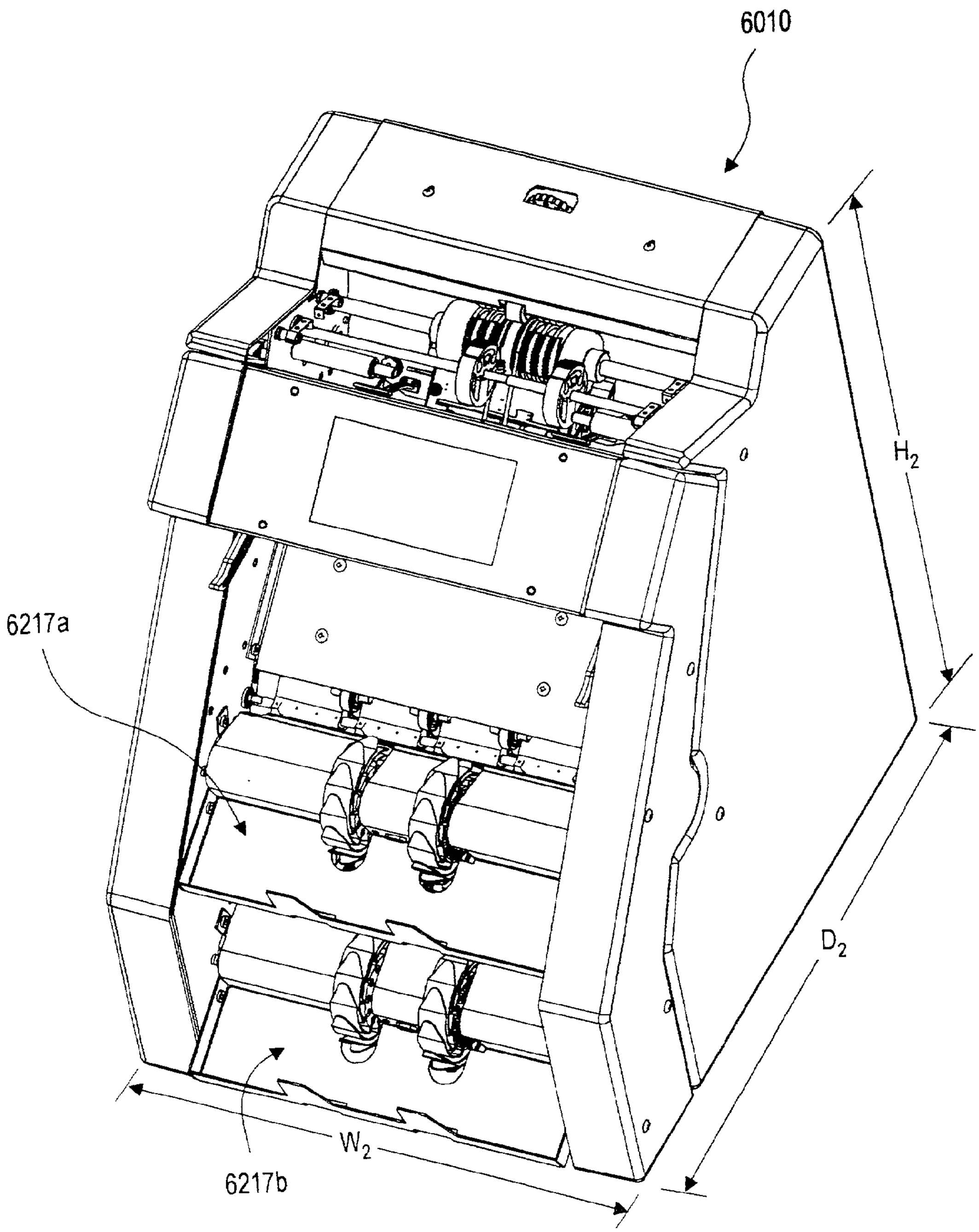
FIG. 13 is a perspective view of a compact document scanning device having multiple pockets according to one embodiment of the present invention.
Figure 14:
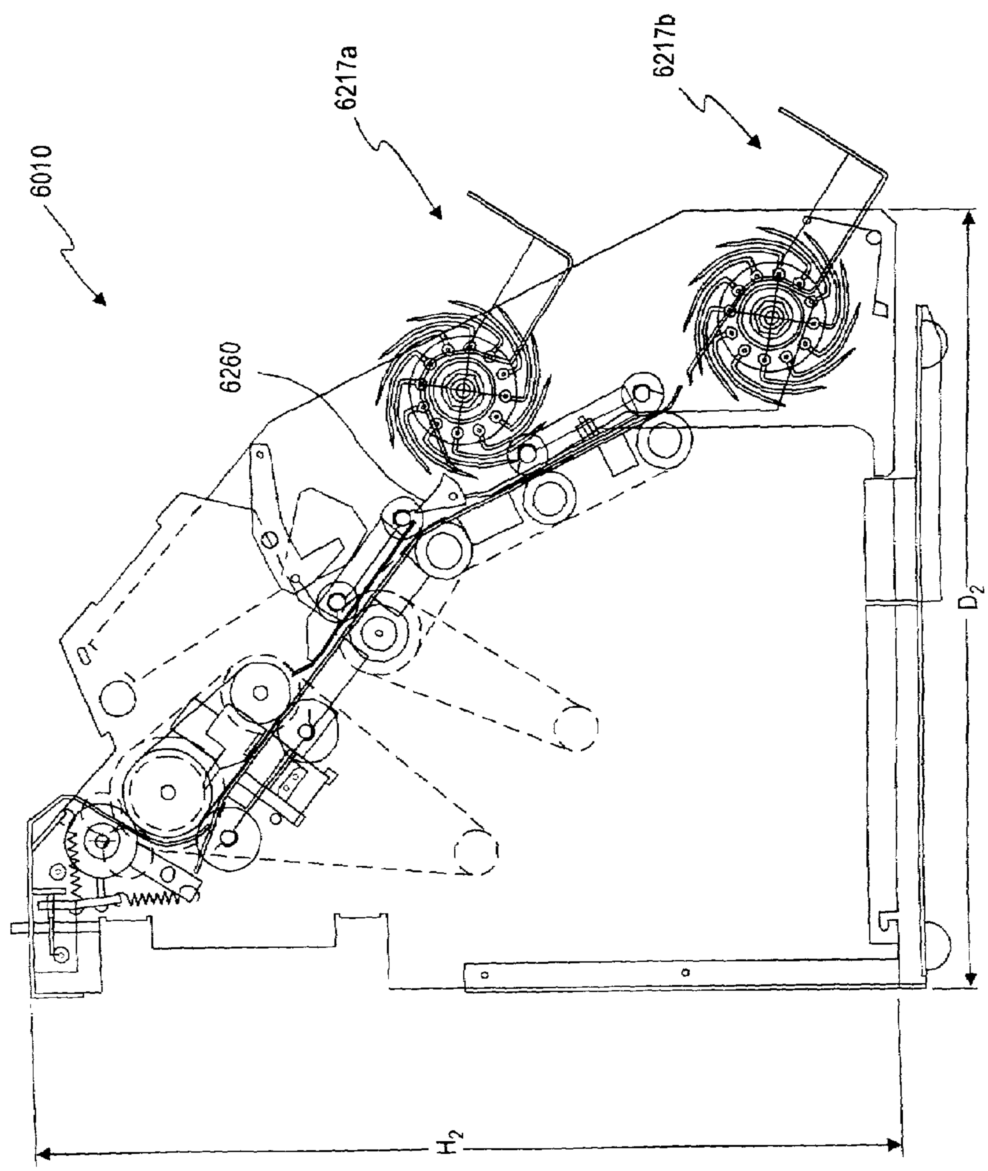
FIG. 14 is a side cross-sectional view of the device shown in FIG. 13.

FIGS. 13 and 14 depict an exterior perspective view and a side cross-sectional view of a multi-pocket compact document scanning device 6010. The process for carrying documents through the system is the same as discussed above, except that the processing system has two output receptacles 6217*a*, 6217*b*. In this embodiment, a diverter 6260 directs the documents to either the first or second output receptacle 6217*a*, 6217*b*. When the diverter 6260 is in a lower position, documents are directed to the first output receptacle 6217*a*. When the diverter 6260 is in an upper position, documents proceed in the direction of the second output receptacle 6217*b*. Details of multiple output receptacles and devices are described in International Publication No. WO 97/45810, which is incorporated herein by reference in its entirety.

According to one embodiment, the document scanning device 6010 is compact, having a height ($H_2$) of about 17½ inches, a width ($W_2$) of about 13½ inches, and a depth ($D_2$) of about 15 inches. According to another embodiment, the document scanning device has dimensions of a height ($H_2$) of about 20 inches, a width ($W_2$) of about 15 inches, and a depth ($D_2$) of about 18 inches. The document scanning device 6010 may be rested on a tabletop. According to some two pocket embodiments, counterfeit documents may be off-sorted without having to stop the device. Also, they may be used in sorting between different types of documents, denominations, or series.

Figure 15:
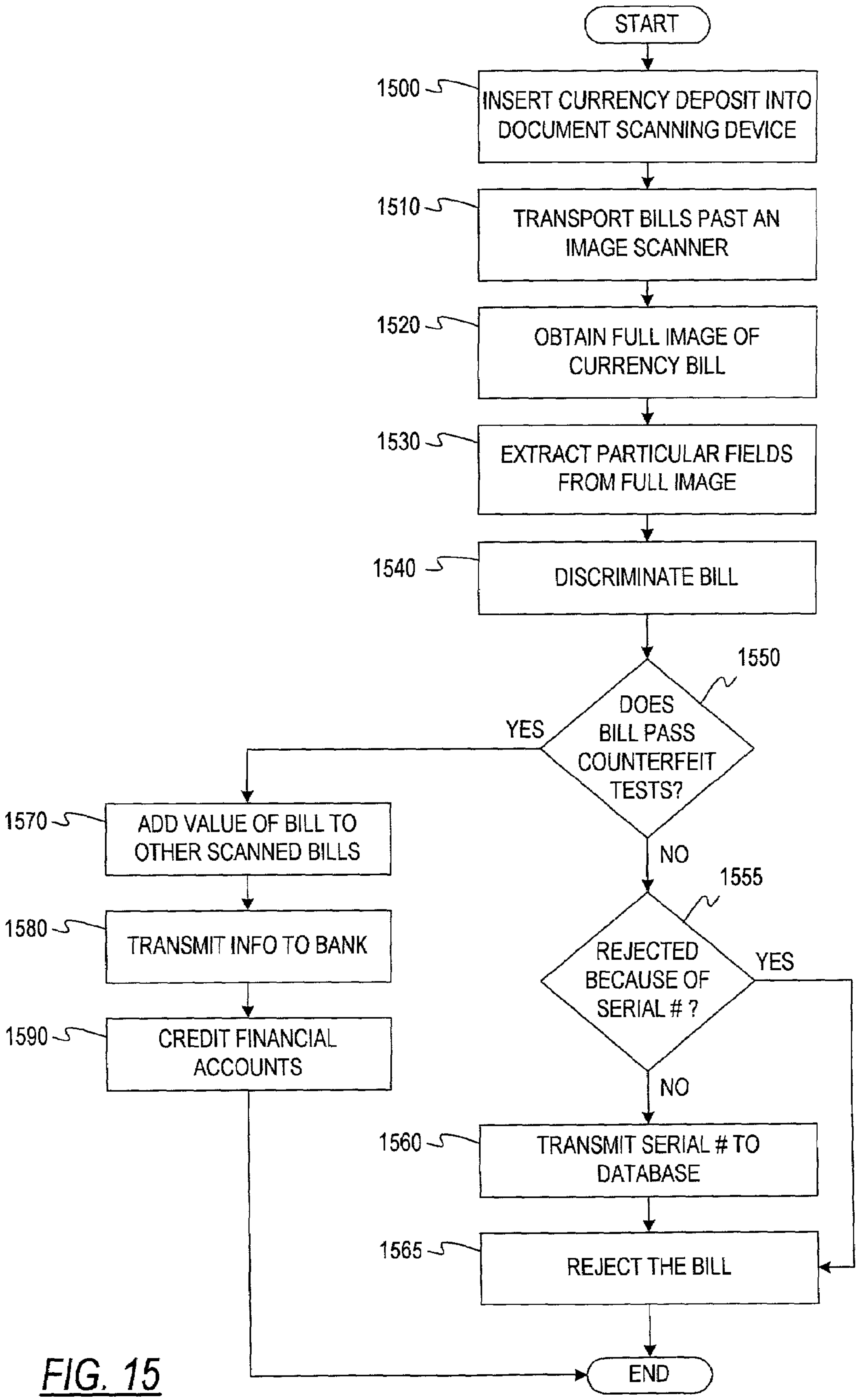
FIG. 15 is a flow chart illustrating the operation of a document processing system according to one embodiment of the present invention.

Referring now to FIG. 15, the operation of a document processing system will be described. First, at step 1500, a customer or operator inserts a currency deposit into a document scanning device of the document processing system. The currency deposit may be inserted one at a time or it may be in a stack. Next, at step 1510, the currency bills are transported one by one, either parallel to a long dimension or perpendicular to a long dimension, past an image scanner as described above. The image scanner then obtains a full image of the currency bill at step 1520.

Once the full image of the currency bill is obtained, the method proceeds to step 1530 where particular fields may be extracted from the image of the currency bill. The particular fields extracted may include the serial number, signatories, denomination of the currency bill, series and/or issuing Federal Reserve Bank, to name a few. At step 1540, the currency bill is then discriminated. This may be done by a discrimination and authentication unit as described in FIG. 5, or the amount of the bill may be determined from fields that are extracted from the image of the bill at step 1530.

In this embodiment, after denomination occurs, the bill is then tested at step 1550 to determine whether the bill is genuine or a counterfeit. Some counterfeiting tests include measuring light emitted from the bill (visible, ultraviolet, and infrared), testing for watermarks, holograms, magnetics, and security threads, and testing image quality. Another method is to compare the serial number that is extracted from the image of the currency bill to a list of serial numbers stored in a memory. The serial numbers stored in the memory are serial numbers which have been used on counterfeit currency bills. Since counterfeiters often use the same serial numbers repeatedly, a currency bill having a serial number that matches the counterfeit list, may be a counterfeit bill.

If the serial number of the scanned bill matches a serial number on the list and/or the currency bill does not pass the other authenticity tests, then, at step 1555, the scanning device determines if the bill was rejected because of a counterfeit serial number. If this is the case, the process next moves to step 1565 and the bill is rejected, ending the process. If it was not, the scanning device, at step 1560, transmits the serial number of the currency bill to the database to update the database. For example, if the currency bill was determined to be counterfeit based on UV tests, it is possible that the serial number may be used with other counterfeits. Therefore, the serial number is added to the counterfeit database. The bill is then rejected at step 1565 and the process ends.

After the scanned currency bill is determined to be counterfeit, it is then rejected by the document processing system at step 1560. The image of the rejected bill may be tagged with the reason for the rejection. By utilizing tagging, a person viewing an image at a later date would know why the currency bill was rejected. The currency bill may be off-sorted by being sorted into a second output receptacle. In other embodiments, the document processing system may halt operation while an operator removes the suspect bill from an output receptacle. It is also contemplated that the operator may be informed via the display of the presence of a suspect bill and its characteristics (i.e., the serial number, whole image of bill). In another embodiment, the presence of a counterfeit bill may also cause the document processing system to signal the proper authorities. The operator may decide, upon inspection of the bill, that the bill is genuine and should be accepted. The operator may then override the decision of the scanning device to reject the bill. Alternatively, the operator may decide that further testing is required and may accept the bill temporarily or on a "hold" basis. If the currency bill is accepted as a "hold," the funds would not become available for withdrawal until the bill was verified as genuine.

If the serial number of the scanned bill does not match the serial numbers on the list and it passes all other counterfeit tests, the document processing system proceeds to step 1570. The value of the currency bill is then added to the value of the other non-suspect currency bills. Next, the document processing system may then transmit the image file (which may contain the images, image data, or both) to the bank where the customer's account is held (step 1580). The bank then credits the customer's account for the amount of the deposit at step 1590. This process is then repeated until all of the bills inserted at step 1500 have been processed. In another embodiment, the scanning device may store the images until all the currency bills have been scanned and transmit all the images obtained during a single transaction. Alternatively, the images may be stored for a predetermined amount of time or until a memory in the processing system is full. The images would then be transmitted in batches to the bank.

Figure 16:
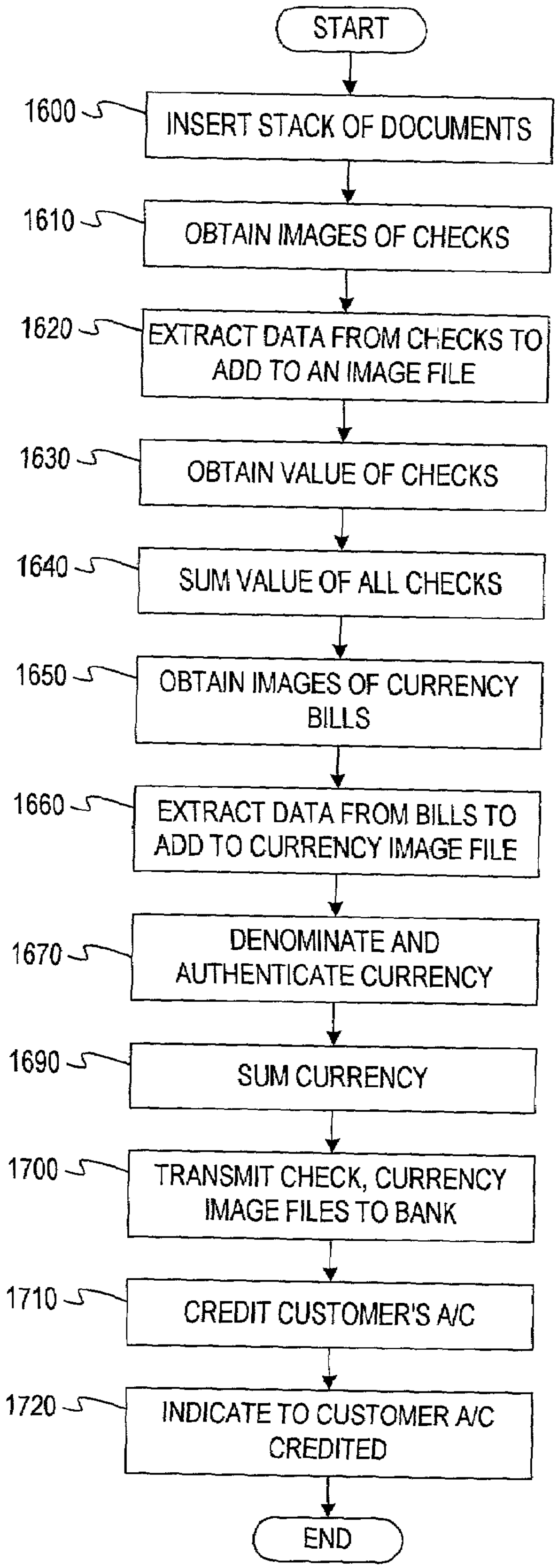
FIG. 16 is a flow chart illustrating the operation of a document processing system according to an alternative embodiment of the present invention.

In FIG. 16, a method of how another embodiment of the present invention works is functionally illustrated. First, at step 1600, a customer or operator inserts a stack of documents into the document scanning device for deposit into a customer's financial account. In one embodiment, the document scanning device has two input receptacles, one for currency and one for other documents, such as checks. In another embodiment, the document scanning device has only one input receptacle for all documents. If the document scanning device has only one input receptacle, as a preliminary step, the document scanning device may sort the checks from the currency.

Next, at step 1610, images of the checks are obtained. These may be full images or images of only relevant portions of the checks (e.g., account number, routing number, courtesy amount field, legal amount field). The document scanning device next extracts data to add to an image file at step 1620. The image file may contain the image of the document (if a full image is obtained) and any of the extracted data. At step 1630, the denomination of the scanned check is then obtained. The denomination may be obtained by an authentication and denomination unit or by other denominating means discussed above. The document scanning device then sums the value of all the checks imaged (step 1640).

Next, the currency bills are imaged and data is extracted (steps 1650 and 1660). The images may be full images of the currency bills or they may be only images of parts of the currency bills. For example, the images may only be of half a bill if that would provide adequate information to the bank and the customer. An image of half the currency bill would depict the serial number and the dollar amount. Alternatively, the image may be of any patch or a thin stripe of the currency bill. The image may also be a couple of parts put together, such as the serial number and the dollar amount. In some embodiments, the currency bills are denominated and then imaged while, in others, the currency bills may be imaged first and then denominated. The images and extracted data may be added to an image file as was done with checks. In FIG. 16, at step 1670, the currency bills are discriminated and authenticated. This may be done by comparing the serial number of the imaged currency to a list of counterfeit serial numbers. The authenticating may be accomplished by other known methods, such as UV reflection techniques, infrared techniques, image quality, color shifting ink, watermarks, holograms, magnetics, and security thread location.

The sum of the values of all the currency scanned is then obtained at step 1690. Next, the document scanning device then transmits the sum of the imaged documents along with the check and the currency images to a first computer at a bank where the customer's account is held (step 1700). At step 1710, the computer then credits the customer's account for the amount of the deposit that is verified by the scanning device. Finally, at step 1720, the customer or person depositing the documents is given an indication that the customer's account has been credited. The indication may be, for example, a printed, electronically transmitted, or downloaded receipt. The indication may also be a notice on a screen of the document scanning device. Also, the indication may include only the dollar amount or it may also include copies of the images obtained. The images may be downloaded onto a disk or CD-ROM coupled to the scanning device.

In another embodiment, the checks and currency bills are imaged as they enter the device. Also, in some embodiments, the currency bills may be denominated before the currency bills are imaged or before the currency is authenticated.

Figure 17A:
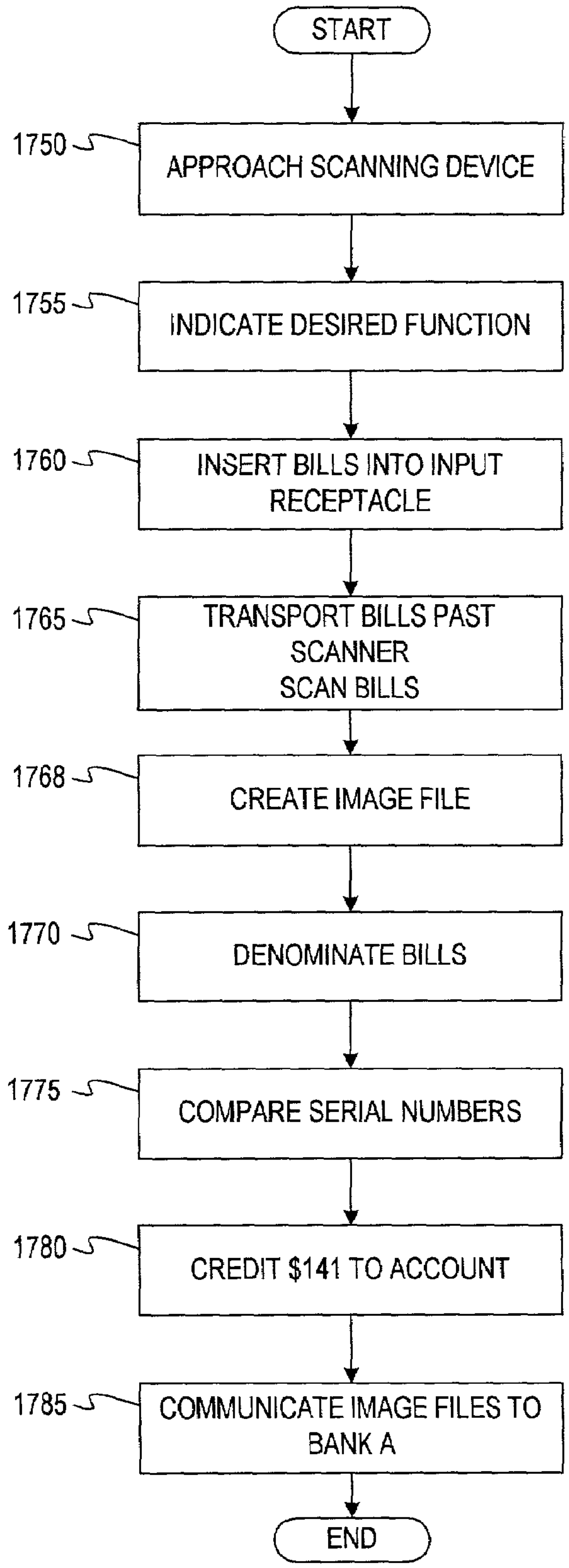
FIG. 17*a* is a flowchart describing the operation of the document processing system according to one embodiment of the present invention.

To further aid in the understanding of the invention, three additional specific examples of the document scanning devices will be described with reference to FIGS. 17*a*–19*b*. FIG. 17*a* is a flow chart for the first example depicted. At step 1750, a person approaches a scanning device. The person wants to deposit currency bills into a checking account at Bank A. Next, at step 1755, the person indicates on the scanning device what he wants to do (deposit money) and where (account number at Bank A). This may be similar to how a person would use a standard ATM, with the machine reading a card for certain information (bank name and account number) and the customer inputting other information (what they want done and how much money).

Once the machine has the information, it may instruct the person to insert the bills into an input receptacle (step 1760). In this example, the person has deposited ten currency bills totaling $141 (one fifty, three twenties, one ten, four fives, and one single). At step 1765, the bills are then transported one by one past an image scanner which scans each bill as described above. An image file is created containing the image of each currency bill and its serial number (step 1768). The bills are then denominated at step 1770. Serial numbers of the bills are then compared to counterfeit serial numbers in a list (step 1775). In this example, none of the bills contain serial numbers that match the list of counterfeit serial numbers. Therefore, the $141 is credited to the person's account at Bank A (step 1780). At step 1785, the image files of the currency bills are communicated to Bank A for storage. It is also contemplated that the denomination of the currency bills may be determined prior to or concurrently with the counterfeit testing.

Figure 17B:
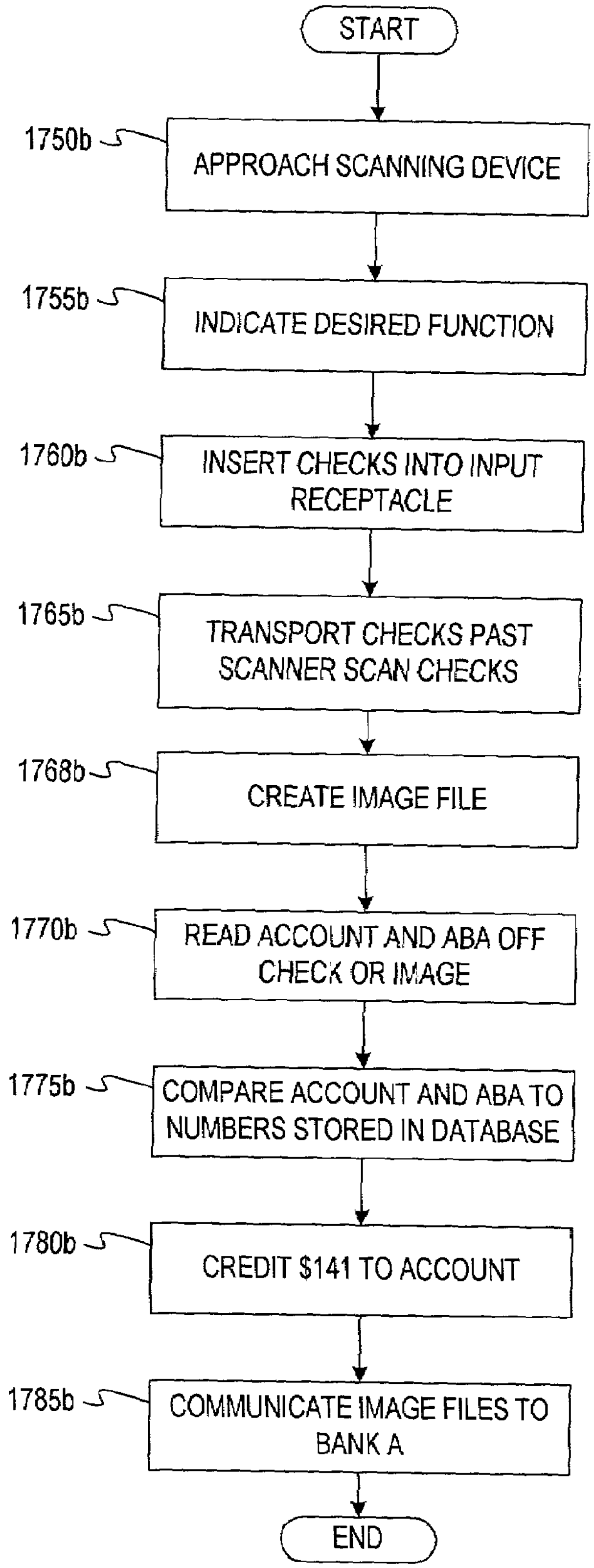
FIG. 17*b* is a flowchart describing the operation of the document processing system according to another embodiment of the present invention.

Turning now to FIG. 17*b*, an example depicting how a check may be deposited is described. At step 1750*b*, a customer approaches the scanning device. The person wants to deposit checks into a checking account at Bank A. Next, at step 1755*b*, the person indicates on the scanning device what he wants to do (deposit checks) and where (account number at Bank A). This may be similar to how a person would use a standard ATM, with the machine reading a card for certain information (bank name and account number) and the customer inputting other information (what they want done and how much).

Once the machine has the information, it may instruct the person to insert the checks into an input receptacle (step 1760*b*). In this example, the person has deposited four checks totaling $141 (one for sixty six dollars, one for fifty dollars, one for twenty dollars, and one for five dollars). At step 1765*b*, the checks are then transported one by one past an image scanner which scans each check as described above. An image file is created containing the image of each check (step 1768*b*). The amounts of the checks are then obtained by reading the courtesy amount (CAR) and/or the legal amount at step 1770*b*. The ABA, account and/or check numbers of the checks are then compared to the flagged numbers in the memory (step 1775*b*). In this example, none of the data matches data in the memory. Therefore, the $141 is credited to the person's account at Bank A (step 1780*b*). At step 1785*b*, the image files of the checks are communicated to Bank A for storage. It is also contemplated that the denomination of the checks may be determined prior to or concurrently with the counterfeit testing.

Figure 18A:
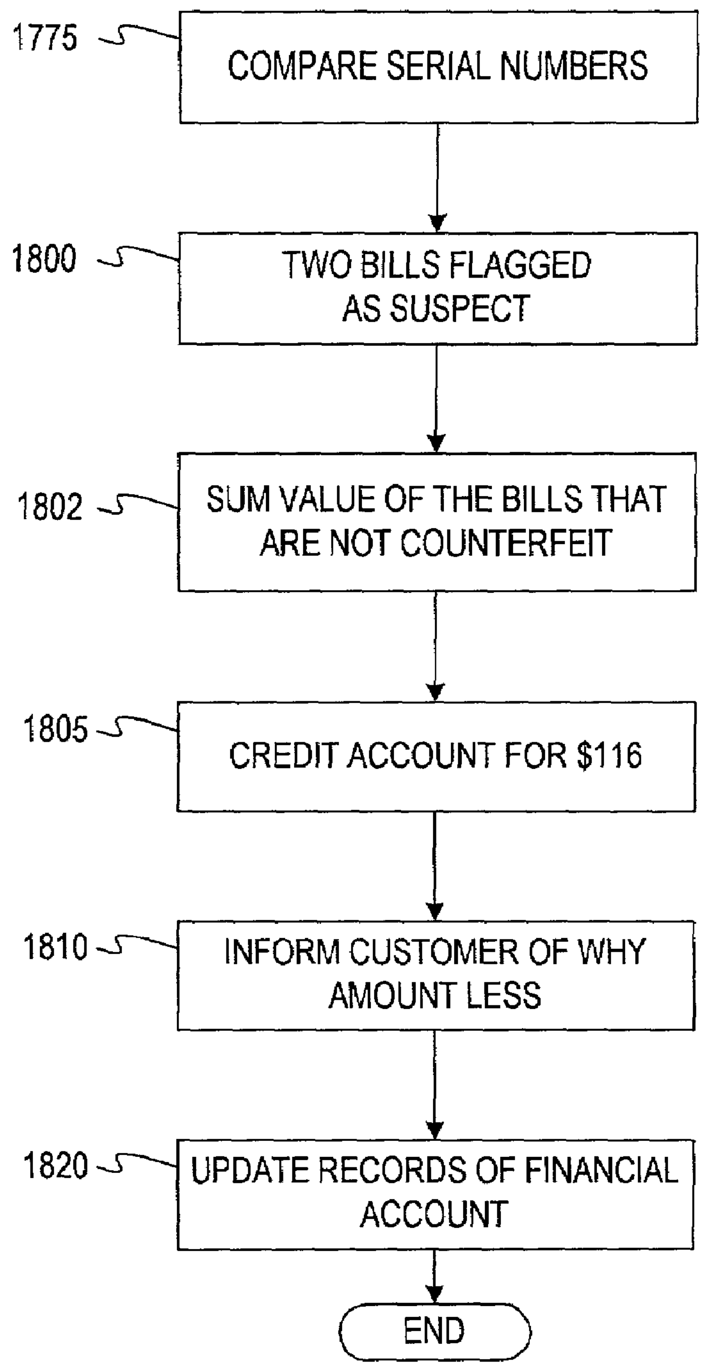
FIG. 18*a* is a flowchart describing the operation of the document processing system according to one embodiment of the present invention.

FIG. 18*a* illustrates a second example of how an embodiment of the present invention may work. The embodiment works the same as in FIG. 17*a* up to step 1770 but, in this example, two of the bills, a twenty and a five, have serial numbers that match serial numbers on the list of counterfeit serial numbers. In another embodiment, the two bills may be flagged as suspect because of failing other counterfeit tests, such as a magnetic or a thread test. In that scenario, the serial number of the counterfeit bills may be extracted and forwarded to the database to be added to the database (see, e.g., FIG. 18*b*). At step 1800, the twenty dollar bill and the five dollar bill are flagged or rejected as suspect. In this case, the scanning device, at step 1802, sums the value of the bills that do not match the counterfeit serial numbers, arriving at a value of $116. In another embodiment, where the currency is denominated first, the amount of the counterfeit bills may be subtracted from the amount already denominated. The account at Bank A is then credited in the amount of $116 at step 1805. At step 1810, the person making the deposit is told of the amount deposited and the reason why the amount was less than indicated by the person. At step 1820, the scanning device updates a counterfeit record of the person's account to indicate that counterfeit funds were detected. This allows Bank A to track the attempted deposit of counterfeit bills. Bank A may use this information to more closely verify deposits by people who have attempted to deposit numerous counterfeit bills or they may use it to charge fees for the detection and processing of counterfeit bills. The information may also be used to alert police to potential counterfeiters.

Figure 18B:
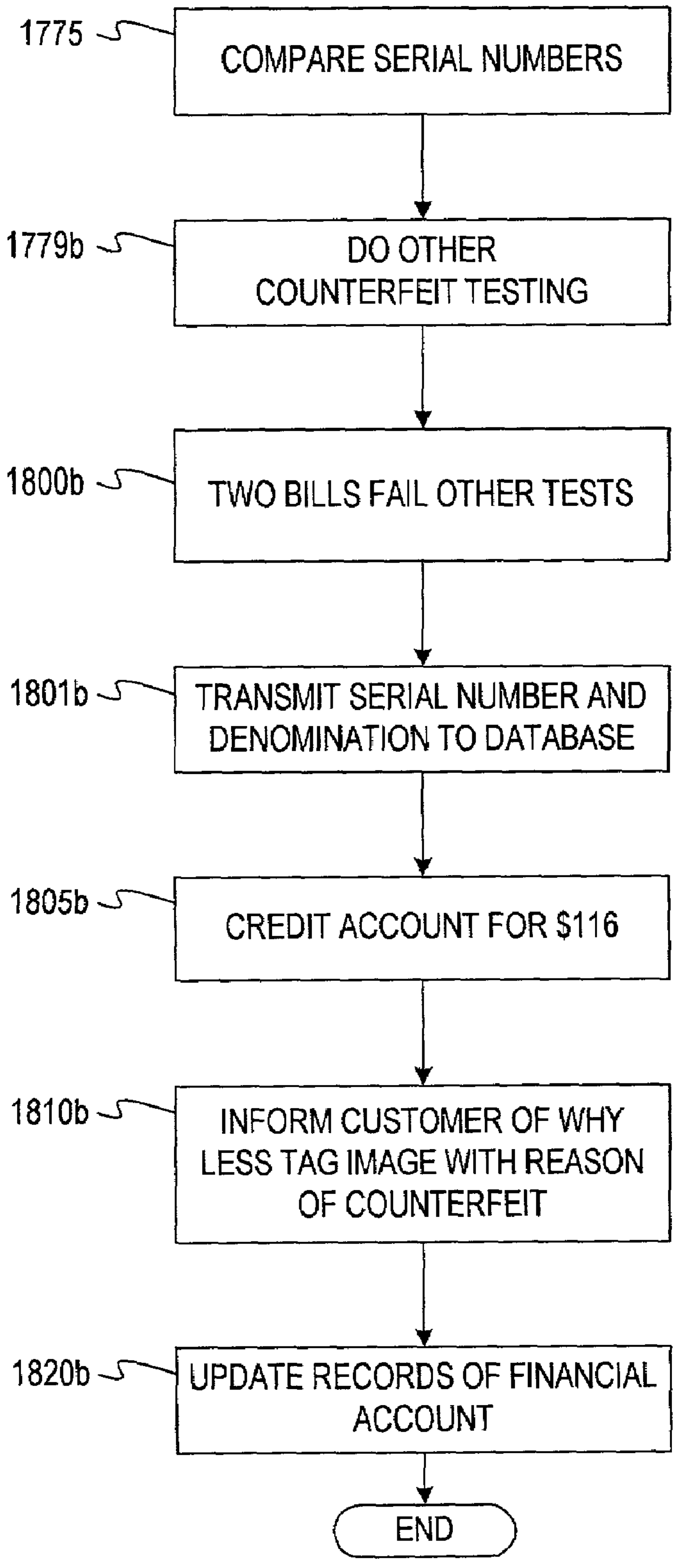
FIG. 18*b* is a flowchart describing the operation of the document processing system according to another embodiment of the present invention.

Turning now to FIG. 18*b*, an alternative embodiment of the present invention is illustrated. At step 1775, the two serial numbers of the deposited currency bills are compared to the serial numbers stored in the memory. None of the currency bills have serial numbers that match the serial numbers stored in the memory. Next, at step 1799*b*, other counterfeit testing is performed, such as ultraviolet testing, infrared testing, magnetic testing, thread testing, and/or image comparison testing. Two of the bills fail this test, one of the twenty dollar bills and one of the five dollar bills. The two bills that failed the test are flagged as suspect at step 1800*b*. The serial numbers of these bills are then extracted and transmitted to the database at step 1801*b*. These serial numbers will then be added to the database as serial numbers relating to counterfeit bills and will be used in later testing. The customer's account is then credited at step 1805*b* for $116. Next, at step 1810*b*, the customer is informed as to the reason why the amount was less. During this step, the image may also be tagged with the reason for the counterfeit label, i.e., the exact test the currency bill failed may be indicated. Finally, at step 1820*b*, the customer's records may be updated for the reasons cited above.

Figure 18C:
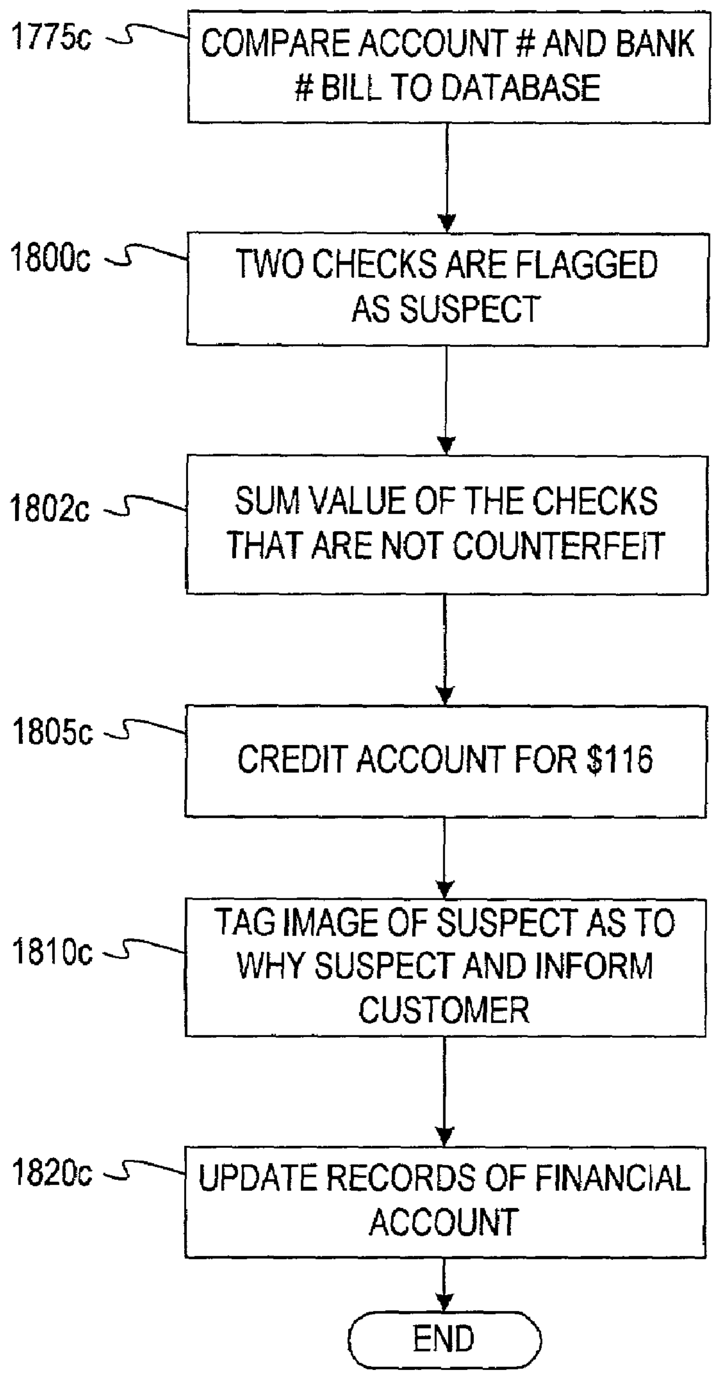
FIG. 18*c* is a flowchart describing the operation of the document processing system according to an alternative embodiment of the present invention.

FIG. 18*c* illustrates another example of how an embodiment of the present invention may work when checks are deposited. Up until step 1775*b*, the process operates the same as in FIG. 17*b* but, in this example, two of the checks, one worth twenty dollars and one worth five dollars, have check numbers that match check numbers on the list of suspect check numbers. At step 1800*c*, the check for twenty dollars and the check for five dollars are flagged or rejected as suspect. In this case, the scanning device at step 1802*c* sums the value of the checks that are not flagged, arriving at a value of $116. In another embodiment, where the amount of the checks are determined and summed first, the amount of the flagged checks may be subtracted from the amount already summed. The account at Bank A is then credited in the amount of $116 at step 1805*c*. At step 1810*c*, the person making the deposit is told of the amount deposited and the reason why the amount was less than indicated by the person. At step 1820*c*, the scanning device updates a suspect record of the person's account to indicate that suspect checks were detected. This allows Bank A to track the attempted deposit of bad checks. Bank A may use this information to more closely verify deposits by people who have attempted to deposit numerous bad checks or they may use it to charge fees for the detection and processing of bad checks. The information may also be used to alert police to potential check kiters or forgerers.

Figure 19A:
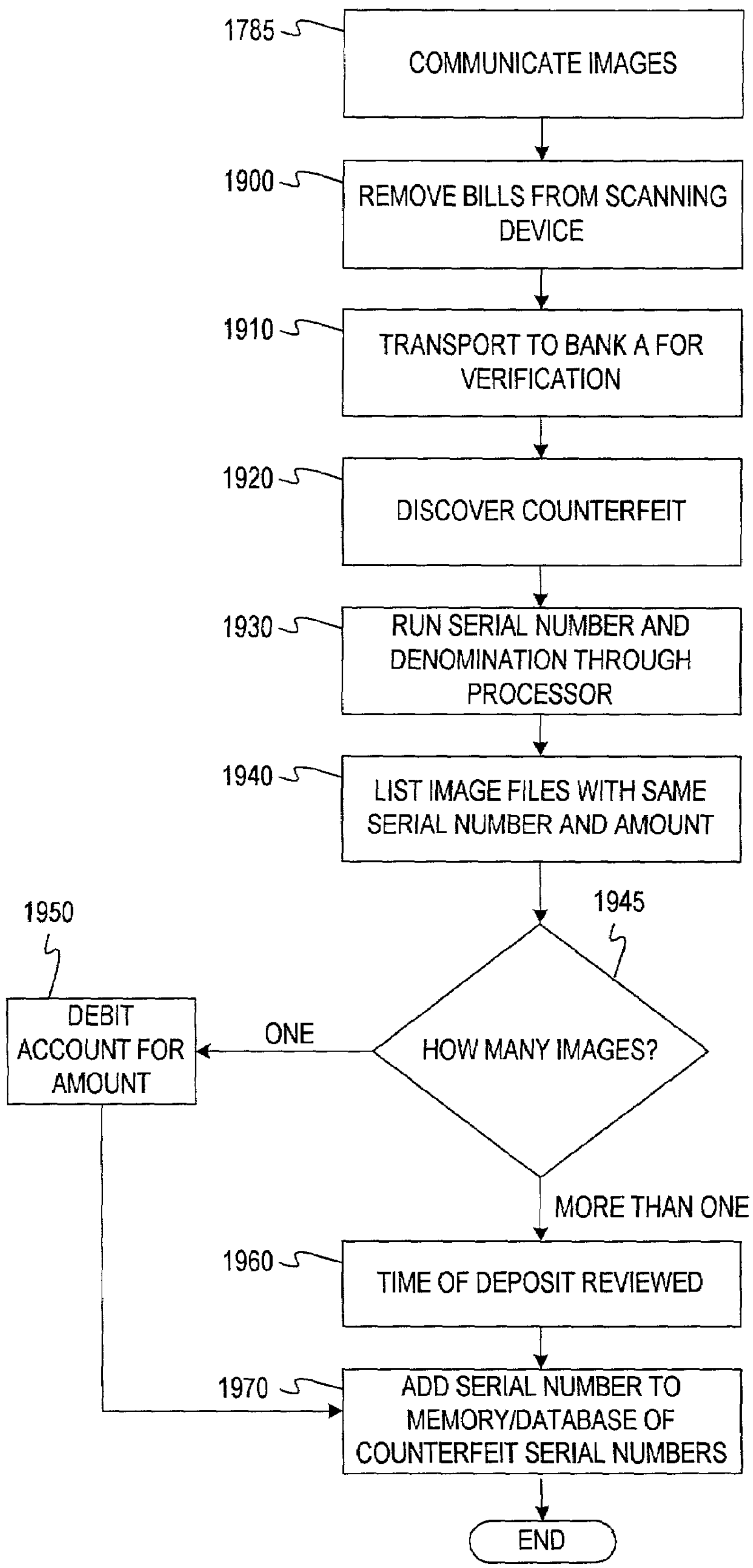
FIG. 19*a* is a flowchart describing the operation of the document processing system according to one embodiment of the present invention.

FIG. 19*a* is a flow chart of a third scenario demonstrating how the scanning system operates. In this example, the steps follow FIG. 17*a* through step 1785. As in the example of FIG. 17*a*, the person deposits ten bills for a total deposit of $141. None of the bills have a serial number matching a counterfeit number and the entire $141 is credited to the person's account. After step 1785, the currency bills are removed from the document scanning device at step 1900. They are now transported to Bank A for further verification and routing through the Federal Reserve Bank system (step 1910).

During the further verification, the fifty dollar bill is discovered to be a counterfeit (step 1920). At step 1930, Bank A runs the serial number and/or the denomination of the fifty dollar bill through a processor so as to discover who deposited the counterfeit bill. The processor stores all the image files obtained by the scanning device. All fifty dollar bills containing the serial number are listed for review by Bank A at step 1940. The files contain the image of the currency bill, serial number, denomination, date of deposit, and deposit account. At step 1945, the processor inquires how many matches have been made. If only one image file is found, that customer's account is debited for the amount of the counterfeit bill at step 1950. The processor then proceeds to step 1970 described below.

If numerous images are found, the process proceeds to step 1960, where the time of deposit of the images are reviewed. Since banks often process the bills within a certain time frame, it may be known roughly as to when the counterfeit bill was deposited into an account at Bank A. If Bank A can narrow the image files down to one account, they then deduct the fifty dollar bill from the balance in the account. In other embodiments, other data that is extracted from the currency bill may be used to find a match (see FIG. 10*a*).

Next, at step 1970, Bank A then adds the serial number of the fifty dollar bill to the list of serial numbers that are associated with counterfeit bills. In alternative embodiments, Bank A may choose not to deduct the amount of the counterfeit bill from the account. Bank A may choose to bear the loss and instead put a watch on the account to check for other counterfeit bills. Bank A may also choose to only debit accounts for counterfeit bills over a certain amount or after a certain number of occurrences.

Figure 19B:
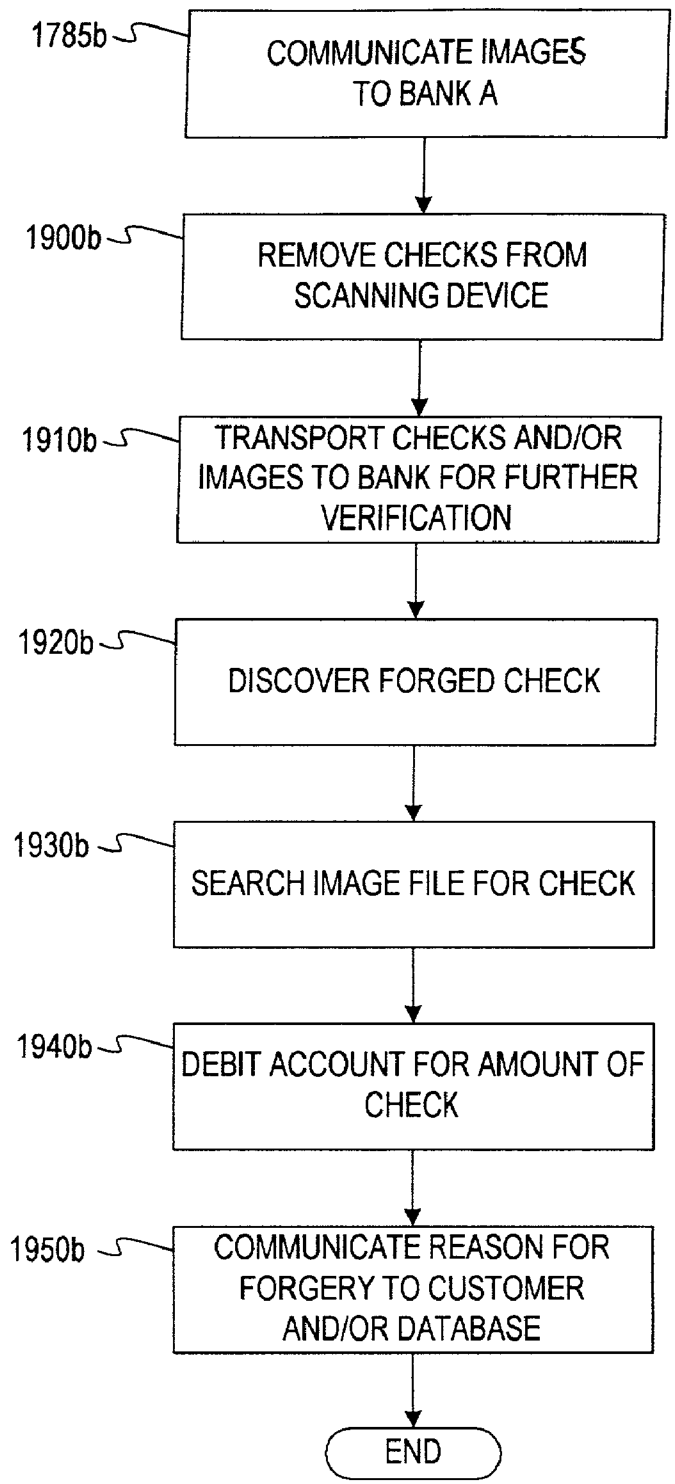
FIG. 19*b* is a flowchart describing the operation of the document processing system according to an alternative embodiment of the present invention.

Turning now to the depositing of checks, FIG. 19*b* is a flow chart of a third scenario demonstrating how the scanning system operates in relation to checks. In this example, the steps follow FIG. 17*b* through step 1785*b*. As in the example of FIG. 17*b*, the person deposits four checks for a total deposit of $141. None of the checks were flagged as potential forgeries or holds, and the entire $141 is credited to the person's account. After step 1785*b*, the checks are removed from the document scanning device at step 1900*b*. They are now transported to Bank A for further verification and routing through the Federal Reserve Bank system (step 1910*b*).

During the further verification, the fifty dollar check is discovered to be a bad check (i.e., has a stop payment on it or is forged) (step 1920). At step 1930*b*, Bank A runs the ABA, account number, and/or check number of the check through a processor so as to discover who deposited the counterfeit bill. The processor stores all the image files obtained by the scanning device. The account to which the check was debited is found and can be debited for the amount of the check (step 1940*b*). At step 1950*b*, the reason the check was bounced or returned may be communicated to the database to update the files. This enables the system to flag similar checks for closer perusal when being deposited. The reason for the return may be noted in the database, so that if it was a forgery, an operator may know to take a close look at the signature.

Figure 20:
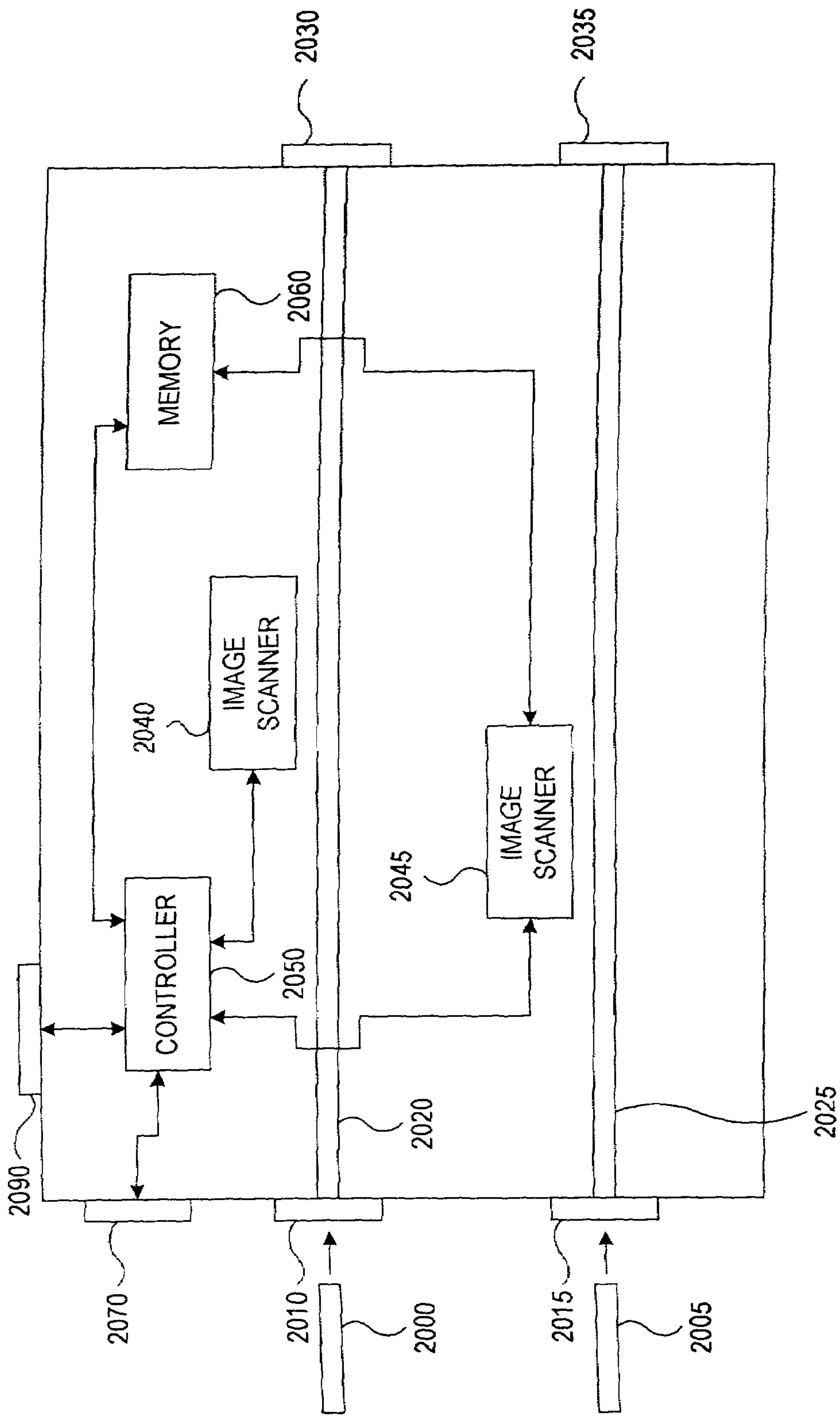
FIG. 20 is a functional block diagram of a document scanning device according to one embodiment of the present invention.

Turning now to FIG. 20, an alternative embodiment of a document scanning device will be described. In this embodiment, a currency bill 2000 (or a stack of currency bills 2000) is placed into a scanning system through an input receptacle 2010, which may be a document receiving opening or receptacle of the scanning system. A transport mechanism 2020 moves the currency bill 2000 past an image scanner 2040 and to an output receptacle 2030. In other embodiments, the output receptacle 2030 may include exactly two output receptacles or a plurality of output receptacles. In the embodiments having two or a plurality of output receptacles 2030, one output receptacle may be used as an off-sort. In other embodiments, one of the output receptacles may be used for a specific kind of currency. If checks are run through this portion of the scanner, the output receptacles may be used to sort "on-us" from "transit" checks.

The image scanner 2040 and the transport mechanism 2020 are electronically coupled to a controller 2050. The controller 2050 controls the image scanner 2040, creates image files, and controls the transport mechanism 2020. The image scanner 2040 operates the same as the image scanner 540 described in FIG. 5. Images of the currency bill 2000 are transmitted from the image scanner 2040 to a memory 2060.

In this embodiment, the scanning system also includes a second input receptacle 2015 adapted to receive checks. This is useful for situations where a customer is depositing both checks and currency bills. In this system, a second transport mechanism 2025 transports checks 2005 past a second image scanner 2045 and to an output receptacle 2035. In other embodiments, the output receptacle 2035 may include exactly two output receptacles or a plurality of output receptacles. In the embodiments having two or a plurality of output receptacles 2035, one output receptacle may be used as an off-sort. In other embodiments, one of the output receptacles may be used for a specific kind of currency. If checks are run through this portion of the scanner, the output receptacles may be used to sort "on-us" from "transit" checks.

The second image scanner 2045 is controlled by the controller 2050 and obtains full images of the checks. An image file is then created having the full image of the check, as well as any extracted data. The controller 2050 may extract certain fields from the image of the check to add to the image file, such as the payee, the account number, the amount in the courtesy amount field (CAR), and/or the amount in the legal amount field (LAR). The image file is then transmitted to a memory 2060 that operates as described with reference to FIG. 16.

The controller 2050 also controls two control panels 2070, 2090. The control panels operate in the same manner as the control panels 570, 590 in FIG. 5.

Figure 21:
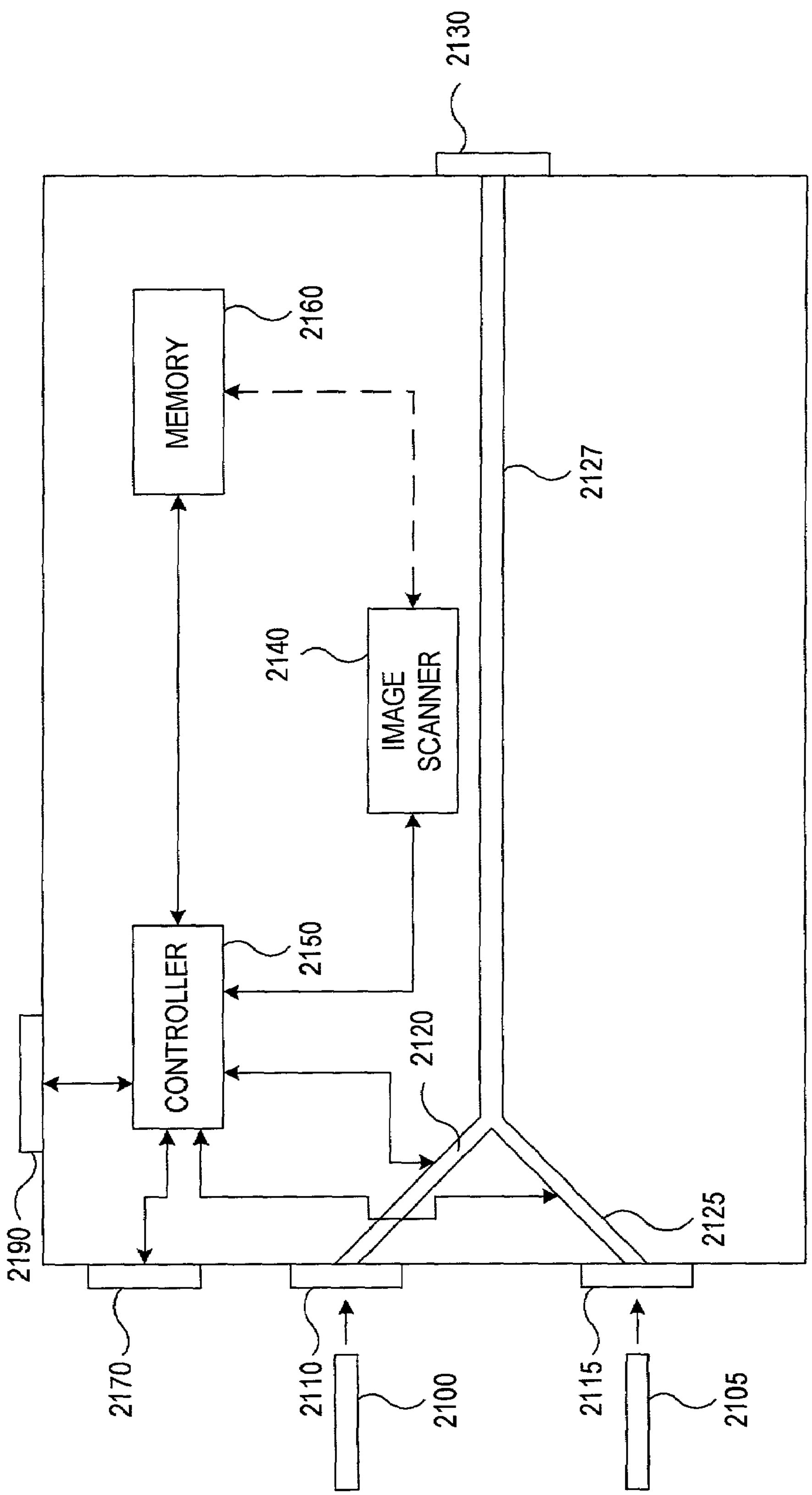
FIG. 21 is a functional block diagram of a document scanning device according to one embodiment of the present invention.

Turning now to FIG. 21, another embodiment of a document scanning device having two input receptacles is illustrated. In this embodiment, a currency bill 2100 (or a stack of currency bills) is inserted into a first input receptacle 2110. A first transport mechanism 2120 transports the currency bill 2100 from the first input receptacle 2110 to a second transport mechanism 2127. The second transport mechanism 2127 transports the currency bill 2100 past an image scanner 2140 and to an output receptacle 2130. A second input receptacle 2115 is also included in the scanning system and is adapted to receive a check 2105 or a stack of checks 2105. A third transport mechanism 2125 transports the check 2105 from the second input receptacle 2115 to the second transport mechanism 2127. The second transport mechanism 2127 transports the check 2105 past the image scanner 2140 and to the output receptacle 2130. It is also contemplated that there may be two output receptacles 2130. If there are two output receptacles, one may be used for checks and the other for currency bills. Alternatively, one may be an off-sort output receptacle. One of the output receptacles could be used to receive transit checks and another output receptacle could be used to receive on-us checks. It is also contemplated that there may be a plurality of output receptacles 2130 and one of the plurality may be an off-sort receptacle.

The image scanner 2140 is adapted to obtain images of the currency bill 2100 and check 2105 as discussed above in relation to FIG. 16. The images of the currency bill 2100 and the check 2105 are transmitted from the image scanner 2140 to a memory 2160, which operates the same as the memory 560 in FIG. 5. Also included in this scanning system are two control panels 2170, 2190 which operate like the control panels 570, 590 in FIG. 5. The two control panels 2170, 2190 are also controlled by a controller 2150.

Figure 22:
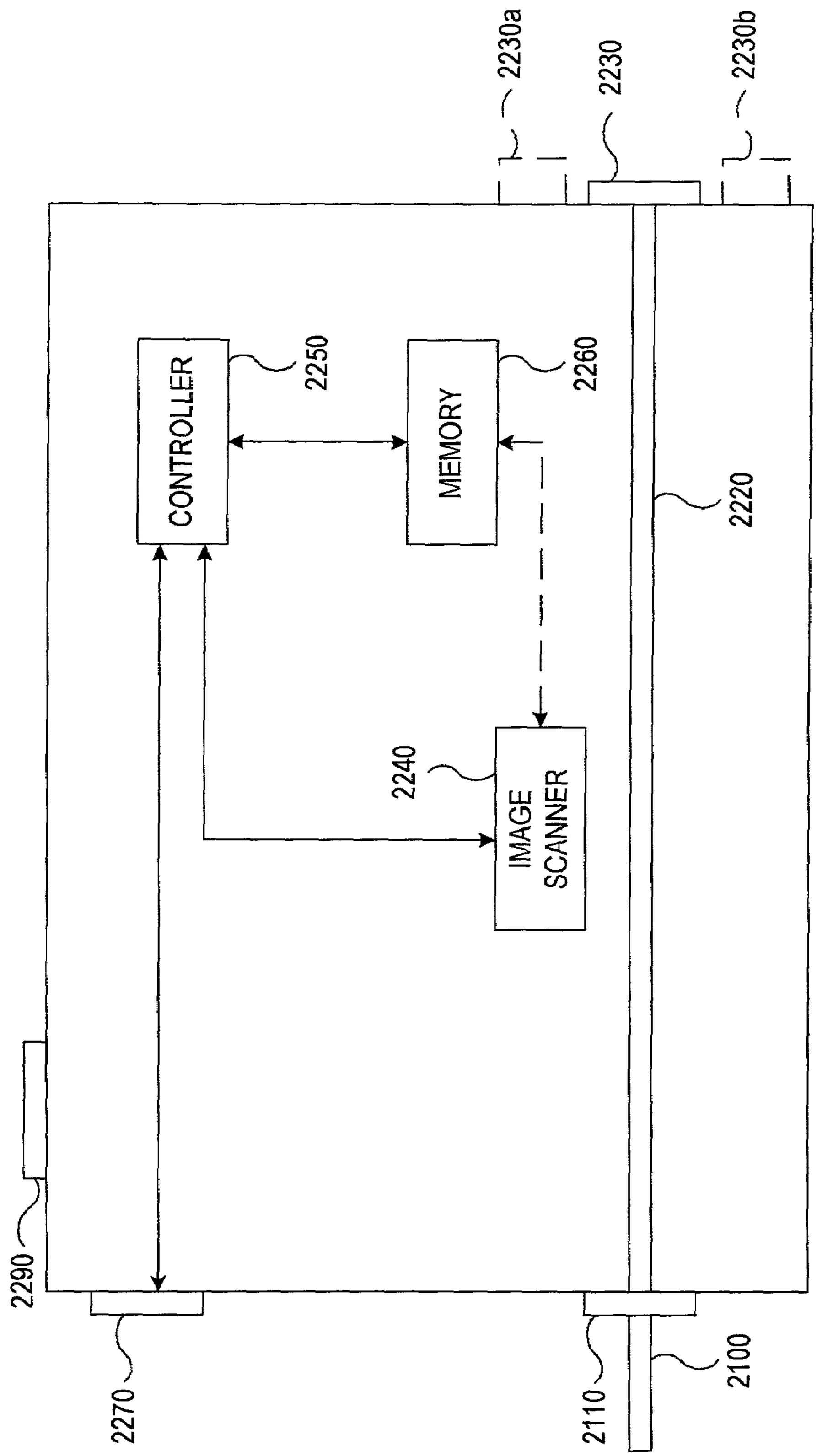
FIG. 22 is a functional block diagram of a document scanning device according to one embodiment of the present invention.

Turning now to FIG. 22, another embodiment of a document scanning device will be described. In this embodiment, a document 2200, or a stack of documents, is inserted into an input receptacle 2210. The document 2200 may be a currency bill or a check. In one embodiment, all of the checks are input separate from the currency bills. In another embodiment, the checks and currency bills may be intermingled. A transport mechanism 2220 transports the document 2200 from the input receptacle 2210 past an image scanner 2240 and to an output receptacle 2230. In some embodiments, there is only a single input receptacle 2210 and a single output receptacle 2230. In other embodiments, however, multiple output receptacles 2230*a*, 2230*b* may be added. If the scanning device has two output receptacles 2230, 2230*a*, when currency bills are being denominated, the operator may have the scanning device send one denomination to one pocket and all other denominations to another pocket. When checks are denominated, the operator may route all "on-us" checks, or checks drawn on that bank, to one output receptacle and all transit checks, or checks drawn on other banks, to a different output receptacle. The scanning device may be customized by the operator as to how the checks and currency bills are to be sorted.

The scanning device also includes a memory 2260, a controller 2250, and control panels 2270, 2290 that all operate as described above. The full image scanner 2240 also operates as described above in FIGS. 20 and 21.

Figure 23:
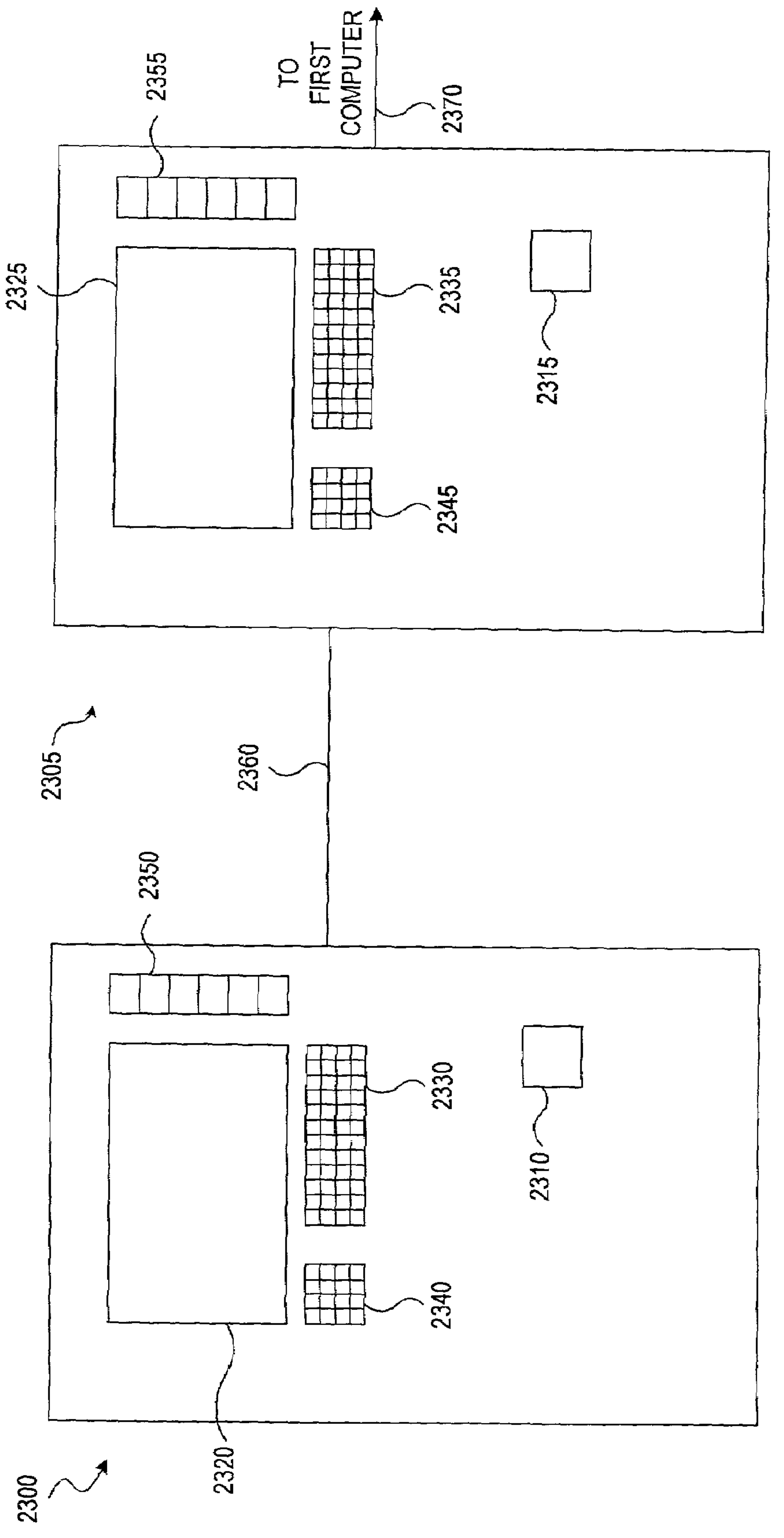
FIG. 23 is a perspective view of a document scanning device according to one embodiment of the present invention.

Turning now to FIG. 23, another embodiment of a document scanning device will be described. In this embodiment, two scanning systems 2300, 2305 are linked via a communication link 2360, such as discussed in connection with FIG. 4*a*. The first scanning system 2300 includes a first input receptacle 2310 for receiving currency bills. The first scanning system may also include a display 2320, a keyboard 2330, denomination keys 2350, and/or a ten key keypad 2340. The display 2320 may be a video display screen, a touch screen or other known display. The display 2320 may be used to display an image of questionable currency bill or one that cannot be read by the image scanner. The customer or operator may then utilize the keypad 2340, the keyboard 2330, and/or denomination keys 2350 to enter information into the image file. Alternatively, if the display 2320 is a touch screen, the customer may enter information on the touch screen.

The second scanning system 2305 includes many of the same features as the first scanning system 2300, such as an input receptacle 2315, a display 2325, a keypad 2345, denomination keys 2355, and a keyboard 2335. The second scanning system 2305, however, is adapted to receive checks into the input receptacle. The checks are then scanned by the scanning system 2305.

In this embodiment, the currency and checks are scanned by image scanners in the respective systems 2300, 2305, such as described in connection with prior embodiments. The images obtained from both the first and second scanning systems 2300, 2305 are then transmitted via a communication link 2370 to the first computer 430 as depicted in FIG. 4*a*.

In another embodiment, the first and second systems 2300, 2305 are linked via the communication link 2370 to a teller station. The teller station has a keyboard, keypad, and/or denomination keys to allow an operator to input information into the teller station. This embodiment allows the systems 2300, 2305 to be connected to standard teller stations.

Some additional embodiments contemplated by the device will now be described. For ease of understanding, the embodiments will be labeled A through AW.

Alternative Embodiment A

In this embodiment, a currency processing and authentication system comprises an input receptacle adapted to receive a plurality of currency bills and an image scanner adapted to obtain an image of a currency bill and to extract a serial number from the image of the currency bill. Coupled to the input receptacle is a transport mechanism adapted to transport each of the currency bills one at a time from the input receptacle past the image scanner to at least one output receptacle. A memory storage is adapted to store the obtained image of each of the currency bills. Also stored in the memory is at least one serial number associated with known counterfeit currency bills. A controller is adapted to compare the extracted serial number to the at least one stored serial number.

Alternative Embodiment B

Another embodiment is a method for depositing currency bills in a financial account belonging to a customer by the use of a currency processing and authentication system. The method comprises inserting a plurality of currency bills into an input receptacle of the document processing system. Each of the plurality of currency bills is transported one at a time from the input receptacle past an image scanner. An image of a currency bill is obtained as the currency bill is transported past the image scanner. A serial number is extracted from the image of the currency bill. The image and extracted serial number are stored in a memory, and the extracted serial number is compared to at least one serial number associated with known counterfeit currency bills.

Alternative Embodiment C

Another embodiment is a document processing system for depositing currency bills in a financial account of a customer. The currency processing system comprises a scanning device that includes an input receptacle adapted to receive a plurality of currency bills. The scanning device also has an image scanner adapted to obtain full images of a currency bill and to extract a serial number filed from the full image. The image scanner is further able to create an image file containing the full image of the currency bill and the serial number field. A transport mechanism is also included in the scanning device and is adapted to transport each of the plurality of currency bills one at a time from the input receptacle past the image scanner to at least one output receptacle. Coupled to the transport mechanism and the image scanner is a controller that is adapted to control the movement of the transport mechanism and the operation of the image scanner. A discriminator is coupled to the controller and adapted to obtain denominations of the currency bills that are inserted into the scanning device.

A database is communicatively coupled to the controller, and is housed outside the scanning device. The database includes at least one serial number associated with counterfeit currency bills and is adapted to compare the extracted serial number from the full currency image to the at least one serial number associated with known counterfeit currency bills. In the present embodiment, the scanning device is adapted to reject any currency bills having a serial number matching a serial number in the database. A memory storage is also communicatively coupled to the scanning device and stores the image file. Coupled to the controller is an interface that is adapted to automatically communicate with an outside accounting system. The outside accounting system credits the financial account belonging to the customer for the amount of the discriminated currency bills substantially immediately.

Alternative Embodiment D

In another alternative embodiment, a method is provided for depositing currency bills in a financial account belonging to a customer through the use of a scanning device having an image scanner. The method comprises inserting a stack of currency bills into the scanning device. Each of the stack of currency bills is imaged, and a serial number from each of the stack of currency bills is extracted. An image file containing the full image and the extracted serial number is created. The serial number from each of the stack of currency bills is compared to a list of counterfeit serial numbers. Any currency bills with a serial number that matches a serial number on the list is transported to an output receptacle and the denomination of the other currency bills is discriminated. A memory stores the image file, and the financial account of the customer is credited based on the denominations of the currency bills.

Alternative Embodiment E

Another alternative embodiment is for a document processing system for depositing currency bills in a financial account of a customer. In this embodiment, the document processing system comprises a plurality of scanning devices. Each of the plurality of scanning devices has an input receptacle adapted to accept a currency bill and an image scanner adapted to obtain full images of the currency bill and to extract information from the currency bill. The individual scanning devices also have a transport mechanism coupled to the input receptacle and adapted to transport the currency bill from the input receptacle past the image scanner and a controller coupled to the image scanner and the transport mechanism and adapted to control the operation of the image scanner and the transport mechanism.

The currency imaging device also has a memory device communicatively coupled to each of the plurality of scanning devices. The memory includes a list of information, and the controller in each of the plurality of scanning devices is adapted to compare the list of information to the extracted information. The memory device then stores the image and the extracted information for later use. An interface coupled to each of the plurality of scanning devices is also included in the currency imaging device. The interface communicates with an outside accounting system. The outside accounting system is able to credit the financial account belonging to the customer substantially immediately.

Alternative Embodiment F

Another embodiment is for a currency scanning device for accepting currency bills from a customer. The currency scanning device comprises a scanning device having an input receptacle adapted to receive a plurality of currency bills and an image scanner adapted to obtain full images of a currency bill and to extract a serial number filed from the full image. The image scanner creates an image file containing the full image of the currency bill, the serial number field, and an account number. The scanning device further includes a transport mechanism adapted to transport each of the plurality of currency bills one at a time from the input receptacle past the image scanner to at least one output receptacle. Also included in the scanning device is a controller coupled to the transport mechanism and the image scanner and adapted to control the movement of the transport mechanism and the operation of the image scanner, and a discriminator coupled to the controller and adapted to obtain denominations of the currency bills.

The currency scanning device further contains a memory storage that is communicatively coupled to the scanning device to store the image file. The memory storage stores the image files by serial number so that when a serial number is found to be associated with a counterfeit bill, the memory can be searched for an image file containing the serial number of the counterfeit bill. An interface coupled to the memory storage and to an outside accounting system is also included in the scanning device. The interface reads an account number from the image file containing the counterfeit serial number and communicates the account number to the outside accounting system. The outside accounting system is adapted to debit a financial account associated with the account number for the amount of the counterfeit bill.

Alternative Embodiment G

Another embodiment is a method for processing currency, comprising a first step of providing a scanning device having an image scanner. Next, a stack of currency bills is inserted into the scanning device. The full image of each of the stack of currency bills is then obtained and a serial number from each of the stack of currency bills is extracted. After creating an image file containing the full image, the extracted serial number, and an account number associated with a financial account that will be credited with the currency bill, the image file is stored in a memory. Next, the financial account of the customer, based on the denominations of the currency bills, is credited and the bills are authenticated. Finally, the financial account is debited for any counterfeit bills that are later found.

Alternative Embodiment H

In this embodiment, a currency processing and authentication system comprises an input receptacle adapted to receive a plurality of currency bills and an image scanner adapted to obtain an image of a currency bill and to extract a serial number from the image of the currency bill. An authentication and discrimination unit is also included to perform counterfeit testing on the currency bill. Coupled to the input receptacle is a transport mechanism adapted to transport each of the currency bills one at a time from the input receptacle past the image scanner and the authentication and discrimination unit to at least one output receptacle. A memory storage is adapted to store the obtained image of each of the currency bills. The memory is also adapted to store at least one serial number of counterfeit currency bills. A controller is adapted to update the memory with a serial number of a currency bill determined to be counterfeit by the authentication and discrimination unit.

Alternative Embodiment I

In this embodiment, a currency processing and authentication system comprises an input receptacle adapted to receive a plurality of currency bills and an image scanner adapted to obtain an image of a currency bill and to extract a serial number from the image of the currency bill. Coupled to the input receptacle is a transport mechanism adapted to transport each of the currency bills one at a time from the input receptacle past the image scanner and the authentication and discrimination unit to at least one output receptacle. A memory storage is adapted to store the obtained image of each of the currency bills. The memory is also adapted to store at least one serial number of counterfeit currency bills. A controller is adapted to update the memory with a serial number of a currency bill determined to be counterfeit by other means.

Alternative Embodiment J

In this embodiment, a method for processing currency bills to be deposited in a financial account belonging to a customer using a document scanning device having an image scanner comprises the step of receiving a stack of currency bills into an input receptacle. Next, each of the bills are transported one at a time from the input receptacle past the image scanner to at least one output receptacle. An image of each of the currency bills with the image scanner is then obtained and the serial number from each of the images is then extracted. Counterfeit testing is then performed on the currency bills. The serial number of any currency bills that do not pass the counterfeit tests are transmitted to a memory for updating a list of counterfeit serial numbers to be used in future counterfeit tests.

Alternative Embodiment K

In this embodiment, a memory includes full images of currency bills that have been scanned by an image scanner. The memory may be searchable by extracted fields of the images.

Alternative Embodiment L

In this embodiment, a document processing system for processing a plurality of currency bills to be deposited in a financial account of a customer includes a currency scanning device. The scanning device has an input receptacle adapted to receive a plurality of currency bills. An image scanner is also included and is adapted to obtain an image of a side of a currency bill to extract a predetermined field from the image. Furthermore, the image scanner is adapted to create an image file containing the image of the currency bill. Also included is a transport mechanism adapted to transport each of the plurality of currency bills one at a time from the input receptacle past the image scanner to at least one output receptacle. A controller is coupled to the transport mechanism and the image scanner, and the controller is adapted to control the operation of the transport mechanism and the image scanner. The scanning device also includes a discrimination and authentication unit adapted to determine the denomination of each of the currency bills and to perform counterfeit testing on the currency bills. The discrimination and authentication unit is coupled to the controller. A memory is communicatively coupled to the controller, and the memory is adapted to store at least one predetermined field associated with counterfeit currency bills, wherein the controller is adapted to retrieve the at least one predetermined field from the memory and compare extracted predetermined fields to the at least one stored predetermined field, wherein the scanning device is adapted to reject any currency bills having a predetermined field matching a predetermined field in the database.

Alternative Embodiment M

In this embodiment, a document processing system for processing a plurality of currency bills to be deposited in a financial account of a customer includes a currency scanning device. The scanning device has an input receptacle adapted to receive a plurality of currency bills. An image scanner is also included and is adapted to obtain an image of a side of a currency bill to extract encoded data from the image. Furthermore, the image scanner is adapted to create an image file containing the image of the currency bill. Also included is a transport mechanism adapted to transport each of the plurality of currency bills one at a time from the input receptacle past the image scanner to at least one output receptacle. A controller is coupled to the transport mechanism and the image scanner, and the controller is adapted to control the operation of the transport mechanism and the image scanner. The scanning device also includes a discrimination and authentication unit adapted to determine the denomination of each of the currency bills and to perform counterfeit testing on the currency bills. The discrimination and authentication unit is coupled to the controller. A memory is communicatively coupled to the controller, and the memory is adapted to store at least one encoded data having stored therein at least one encoded data field associated with counterfeit currency bills, wherein the controller is adapted to retrieve the at least one encoded data field from the memory and to compare extracted encoded data fields to the at least one stored encoded data field, wherein the scanning device is adapted to reject any currency bills having an encoded data field matching an encoded data field in the database.

Alternative Embodiment N

In any of the embodiments A–M, a plurality of currency bills are inserted into the device and the plurality of currency bills are a stack of currency bills.

Alternative Embodiment O

In any of the embodiments A–N, the output receptacle is a single output receptacle.

Alternative Embodiment P

In any of the embodiments A–M, the output receptacle includes a first output receptacle and a second output receptacle.

Alternative Embodiment Q

In the embodiment P, one of the first and second output receptacles is an off-sort receptacle.

Alternative Embodiment R

In any of the embodiments A–M, the output receptacle is a plurality of output receptacles.

Alternative Embodiment S

In the embodiment R, the plurality of output receptacles include one off-sort receptacle.

Alternative Embodiment T

In any of the embodiments A–S, the system further comprises a stacker wheel comprising flexible blades positioned to restack documents in the output receptacle.

Alternative Embodiment U

In any of the embodiments A–T, the image scanned is a full image of the entire currency bill.

Alternative Embodiment V

In any of the embodiments A–U, the system further comprises a control panel communicatively coupled to the memory and adapted to provide a signal if the extracted serial number of the currency bill matches a serial number on the list.

Alternative Embodiment W

In the embodiment V, the control panel comprises a display screen.

Alternative Embodiment X

In the embodiment V, the control panel comprises a blinking light.

Alternative Embodiment Y

In any of the embodiments A–X, the controller is adapted to flag a currency bill having a serial number matching a serial number stored in the memory.

Alternative Embodiment Z

In the embodiment Y, the controller is further adapted to halt the operation of the system if a currency bill is flagged.

Alternative Embodiment AA

In the embodiment Z, the controller is further adapted to continue the operation of the system if a currency bill is flagged.

Alternative Embodiment AB

In any of the embodiments A–AA, the system further comprises an interface coupled to the controller and adapted to automatically communicate with an outside accounting system, the outside accounting system being adapted to credit the financial account belonging to the customer substantially immediately.

Alternative Embodiment AC

In any of the embodiments A–AB, the transport mechanism feeds the currency bill in a direction that is perpendicular to a longer edge of the currency bill.

Alternative Embodiment AD

In any of the embodiments A–AC, the transport mechanism feeds the currency bill in a direction that is parallel to a longer edge of the currency bill.

Alternative Embodiment AE

In any of the embodiments A–AD, the transport mechanism is adapted to transport the currency bills at a rate of from about 300 to 400 currency bills per minute.

Alternative Embodiment AF

In any of the embodiments A–AE, the transport mechanism is adapted to transport the currency bills at a rate in excess of 800 currency bills per minute.

Alternative Embodiment AG

In any of the embodiments A–AF, the image scanner is further adapted to extract and store a denomination of the currency bill.

Alternative Embodiment AH

In any of the embodiments A–AG, the image scanner is further adapted to extract and store a Federal Reserve Bank number on the currency bill.

Alternative Embodiment AI

In any of the embodiments A–AG, the image scanner is further adapted to extract and store a signatory on the currency bill.

Alternative Embodiment AJ

In any of the embodiments A–AI, the controller is further adapted to add a date of deposit onto the image file.

Alternative Embodiment AK

In any of the embodiments A–AJ, the system further comprises a second input receptacle adapted to receive a plurality of checks.

Alternative Embodiment AL

In the embodiment AK, the system further comprises a second image scanner adapted to obtain an image of a side of each of the checks and to extract an amount from each of the checks. The second image scanner is also adapted to create an image file containing the image of the side of the check and the amount. A transport mechanism is also included and is adapted to transport each of the checks one at a time from the second input receptacle and past the image scanner to a second output receptacle. The memory is further adapted to store the image file of each of the checks. The controller is adapted to transmit the image file to a processor at a financial institution, the processor adapted to credit an account with the amount on the image file of the check.

Alternative Embodiment AM

In any of the embodiments A–AL, the input receptacle, the image scanner, the transport mechanism, the memory, and the controller are in a first housing. The system further includes a second housing having a second image scanner. The second image scanner is adapted to obtain an image of a side of each of a check and to extract an amount from the check. The second image scanner is also further adapted to create a check image file containing the image of the side of the check and the amount. A second transport mechanism is also included and is adapted to transport each of the checks one at a time from the second input receptacle past the second image scanner to a second output receptacle. The memory is further adapted to store the image file of each of the checks. The controller is adapted to transmit the image file to a processor at a financial institution, while the processor is adapted to credit an account with the amount on the image file of the check.

Alternative Embodiment AN

In the embodiment AM, the first housing further comprises a value entry means adapted to receive an input from a customer indicating the amount of a currency bill being imaged by the image scanner.

Alternative Embodiment AO

In the embodiment AN, the value entry means is a plurality of denomination keys.

Alternative Embodiment AP

In the embodiment AN, the value entry means is a keyboard.

Alternative Embodiment AQ

In the embodiment AN, the value entry means is a numeric keypad. ps Alternative Embodiment AR In the embodiment AM, the second housing further comprises a display adapted to display a check when the amount of the check is unable to be scanned by the second image scanner.

Alternative Embodiment AS

In the embodiment AR, the value entry means is a plurality of denomination keys.

Alternative Embodiment AT

In the embodiment AR, the value entry means is a keyboard.

Alternative Embodiment AU

In the embodiment AR, the value entry means is a numeric keypad.

Alternative Embodiment AV

In any of the embodiments A–AU, counterfeit testing is performed.

Alternative Embodiment AW

In the embodiment AV, the counterfeit testing is at least one of ultraviolet testing, infrared testing, magnetic testing, thread testing, and image comparison testing.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A system for processing documents, the system comprising:

at least one input receptacle that receives a stack of documents;

at least one output receptacle that receives the stack of documents;

an image scanning system that obtains an image of at least a portion of at least one side of each document in the stack and extracts, from the document image, an amount of information which uniquely identifies the document;

a transport mechanism that transports each of the documents in the stack, one at a time, from the at least one input receptacle, past the image scanning system, to the at least one output receptacle;

a memory that stores an amount of information which identifies at least one counterfeit document; and a processor operating to compare the extracted amount of information which uniquely identifies each document in the stack to the stored amount of information which identifies at least one counterfeit document, and to identify, as a suspected counterfeit document, any document in the stack with matching information.

2. The system according to claim 1, wherein the amount of information which uniquely identifies each document is character information contained in a predetermined field of a document image, and wherein the amount of information which identifies a counterfeit document is character information contained in a predetermined field of a counterfeit document image, the processor identifying the document as a suspected counterfeit document if the character information matches.

3. The system according to claim 1, wherein the amount of information which uniquely identifies each document is an encoded data contained in a field of a document image, and wherein the amount of information which identifies a counterfeit document is an encoded data contained in a field of a counterfeit document image.

4. The system according to claim 1, wherein the processor is a portion of the image scanner and is linked to the memory.

5. The system according to claim 1, wherein the processor is a controller that is linked to the image scanner and the memory.

6. The system according to claim 1, wherein the image scanning system locates a field of the document image and extracts the amount of information from the field.

7. The system according to claim 1, wherein the image scanning system comprises optical character recognition capability to extract characters as the amount of information from the document image.

8. The system according to claim 1, wherein the image scanning system comprises optical character recognition capability to locate a field in the document image and to extract characters as the amount of information from the field.

9. The system according to claim 1, wherein the transport mechanism transports the documents in a direction that is perpendicular to a longer edge of the document.

10. The system according to claim 1, wherein the image scanning system obtains an image of at least a portion of each side of each document and extracts the amount of information which uniquely identifies the document from either document image.

11. The system according to claim 1, wherein the memory is remotely located from the at least one input receptacle and the image scanner.

12. The system according to claim 11, wherein the memory is further linked to a network.

13. The system according to claim 12, further comprising a plurality of systems linked to the network and each of the plurality of systems adapted to communicate with the memory via the network in comparing the extracted amount of information which uniquely identifies each document to the stored amount of information which identifies at least one counterfeit document, and identifying, as a suspect document, any document with matching information.

14. The system according to claim 13, wherein the plurality of systems are located at more than one financial institution.

15. The system according to claim 1, further comprising a discrimination and authentication unit that tests each of the documents using one or more tests for detecting counterfeit documents; wherein:

the transport mechanism further transports each of the documents, one at a time, past the discrimination and authentication unit; and the processor further updates the counterfeit document information stored in the memory with the extracted amount of information which uniquely identifies each document that fails one or more tests for detecting counterfeit documents.

16. The system according to claim 15, wherein the memory is remotely located from the at least one input receptacle, the image scanner and the discrimination and authentication unit.

17. The system according to claim 16, wherein the memory is further linked to a network.

18. The system according to claim 17, further comprising a plurality of systems linked to the network and each of the plurality of systems adapted to communicate with the memory via the network in comparing the extracted amount of information which uniquely identifies each document to the stored amount of information which identifies at least one counterfeit document, and identifying, as a suspect document, any document with matching information.

19. The system according to claim 18, wherein the plurality of systems are located at more than one financial institution.

20. The system according to claim 1, wherein:

the documents are currency bills;

the amount of information which uniquely identifies the documents are currency bill serial numbers; and the amount of information which identifies at least one counterfeit document is at least one counterfeit currency bill serial number.

21. The system according to claim 20, wherein:

the image scanning system obtains an image of at least a portion of each side of each currency bill and extracts the currency bill serial number from either currency bill image;

the image scanning system further extracts, from either currency bill image, at least one of a series number, a signatory name, a back plate number, a city code, a front plate number, a print code and a dollar amount.

22. The system according to claim 1, wherein:

the documents are checks;

the amount of information which uniquely identifies the documents is at least one of an ABA number, an account number and a check number; and the amount of information which identifies at least one counterfeit document is at least one of a flagged ABA number, a flagged account number, and a flagged check number.

23. The system according to claim 22, wherein the at least one flagged ABA number, the at least one flagged account number, and/or the at least one flagged check number are associated with counterfeit checks, accounts with insufficient funds, checks with stop payment orders, accounts with holds, overdrawn accounts, and/or closed accounts.

24. The system according to claim 1, wherein:

the documents are currency bills and checks;

the amount of information which uniquely identifies the documents, that are currency bills, are currency bill serial numbers;

the amount of information which uniquely identifies the documents, that are checks, is at least one of an ABA number, an account number and a check number;

the amount of information which identifies at least one counterfeit document, that is a currency bill, is at least one counterfeit currency bill serial number; and the amount of information which identifies at least one counterfeit document, that is a check, is at least one of a flagged ABA number, a flagged account number, and a flagged check number.

25. The system according to claim 24, wherein the at least one flagged ABA number, the at least one flagged account number, and/or the at least one flagged check number are associated with counterfeit checks, accounts with insufficient funds, checks with stop payment orders, accounts with holds, overdrawn accounts, and/or closed accounts.

26. A method for processing documents, the method comprising:

obtaining an image of at least a portion of at least one side of each of a plurality of documents transported from a stack of document;

extracting, from the image of each of the plurality of documents, an amount of information which uniquely identifies the document;

storing an amount of information which identifies at least one counterfeit document;

comparing the extracted amount of information which uniquely identifies each of the plurality of documents to the stored amount of information which identifies at least one counterfeit document; and identifying, as a suspected counterfeit document, the documents from the stack with matching information.

27. The method of claim 26, further comprising:

receiving the plurality of documents into at least one input receptacle; and transporting each of the plurality of documents, one at a time, from the at least one input receptacle to at least one output receptacle.

28. The method of claim 26, further comprising rejecting any document identified as suspect.

29. The method of claim 26, further comprising halting processing of the plurality of documents if any of the documents are identified as suspect documents.

30. The method of claim 26, further comprising alerting an operator if any of the documents are identified as suspect documents.

31. The method of claim 26, further comprising indicating if any of the documents are identified as suspect documents.

32. The method of claim 26, further comprising:

obtaining an image of at least a portion of each side of each of the plurality of documents; and extracting from either image of each of the plurality of documents, the amount of information which uniquely identifies the document.

33. The method of claim 26, further comprising:

accessing the information which identifies at least one counterfeit document via a network;

comparing, via the network, the extracted information uniquely identifying each of the plurality of documents to the stored counterfeit document information.

34. The method of claim 33, further comprising comparing, at a plurality of locations at more than one financial institution, the extracted amount of information which uniquely identifies each of the plurality of documents to the stored amount of information which identifies at least one counterfeit document.

35. The method of claim 26, further comprising:

testing each of the plurality of documents with one or more tests for detecting counterfeit documents; and updating the stored information which identifies at least one counterfeit document with the extracted amount of information which uniquely identifies each document that fails the one or more tests for detecting counterfeit documents.

36. The method of claim 35, further comprising:

accessing, via a network, the stored amount of information which identifies at least one counterfeit document;

comparing, via the network, the extracted amount of information which uniquely identifies each of the plurality of documents to the stored amount of information which identifies at least one counterfeit document; and updating, via the network, the stored amount of information which identifies at least one counterfeit document with the extracted amount of information which uniquely identifies each of the plurality of documents that fail any of the one or more tests for detecting counterfeit documents.

37. The method of claim 36, further comprising comparing, via the network, at a plurality of locations at more than one financial institution, the extracted amount of information which uniquely identifies each of the plurality of documents to the stored amount of information which identifies at least one counterfeit document.

38. The method according to claim 26, wherein:

the documents are currency bills;

the amount of information which uniquely identifies the documents are currency bill serial numbers; and the amount of information which identifies at least one counterfeit document is at least one counterfeit currency bill serial number.

39. The method according to claim 38, further comprising:

obtaining an image of at least a portion of each side of each currency bill and extracting the currency bill serial number from either currency bill image;

obtaining, from either currency bill image, at least one of a series number, a signatory name, a back plate number, a city code, a front plate number, a print code and a dollar amount.

40. The method according to claim 26, wherein:

the documents are checks;

the amount of information which uniquely identifies the documents is at least one of an ABA number, an account number and a check number; and the amount of information which identifies at least one counterfeit document is at least one of a flagged ABA number, a flagged account number, and a flagged check number.

41. The method according to claim 40, wherein the at least one flagged ABA number, the at least one flagged account number, and/or the at least one flagged check number are associated with counterfeit checks, accounts with insufficient funds, checks with stop payment orders, accounts with holds, overdrawn accounts, and/or closed accounts.

42. The method according to claim 26, wherein:

the documents are currency bills and checks;

the amount of information which uniquely identifies the documents, that are currency bills, are currency bill serial numbers;

the amount of information which uniquely identifies the documents, that are checks, is at least one of an ABA number, an account number and a check number;

the amount of information which identifies at least one counterfeit document, that is a currency bill, is at least one counterfeit currency bill serial number; and the amount of information which identifies at least one counterfeit document, that is a check, is at least one of a flagged ABA number, a flagged account number, and a flagged check number.

43. The method according to claim 42, wherein the at least one flagged ABA number, the at least one flagged account number, and/or the at least one flagged check number are associated with counterfeit checks, accounts with insufficient funds, checks with stop payment orders, accounts with holds, overdrawn accounts, and/or closed accounts.

44. A system for processing documents, the system comprising:

at least one input receptacle that receives a stack of documents;

at least one output receptacle that receives the stack of documents;

an image scanning system that obtains an image of at least a portion of at least one side of each document in the stack and extracts, from the document image, an amount of information which uniquely identifies the document;

an authentication unit that tests each document using one or more tests for detecting counterfeit documents;

a transport mechanism that transports each of the documents in the stack, one at a time, from the at least one input receptacle, past the image scanning system and authentication unit, to the at least one output receptacle;

a memory that stores an amount of information which identifies at least one counterfeit document; and a processor operating to compare the extracted amount of information which uniquely identifies each document in the stack to the stored amount of information which identifies at least one counterfeit document, and to identify, as a suspect document, any document in the stack with matching information, the processor further updates the amount of information stored in the memory with the extracted amount of information from any document that fails any of the one or more tests for detecting counterfeit documents.

45. A method for processing documents, the method comprising:

obtaining an image of at least a portion of at least one side of each of a plurality of documents transported from a stack of document;

extracting, from the image of each of the plurality of documents, an amount of information which uniquely identifies the document;

storing an amount of information which identifies at least one counterfeit document;

comparing the extracted amount of information which uniquely identifies each of the plurality of documents to the stored amount of information which identifies at least one counterfeit document;

identifying, as a suspect document, the documents from the stack with matching information;

testing each of the documents with one or more tests for detecting counterfeit documents; and updating the stored amount of information with the extracted amount of information from any document that fails any of the one or more tests for detecting counterfeit documents.

* * * * *